(12) United States Patent
Song

(10) Patent No.: US 11,983,508 B2
(45) Date of Patent: May 14, 2024

(54) PROCESSING-IN-MEMORY (PIM) SYSTEM AND OPERATING METHODS OF THE PIM SYSTEM

(71) Applicant: SK hynix Inc., Icheon-si (KR)

(72) Inventor: Choung Ki Song, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 10 days.

(21) Appl. No.: 17/694,220

(22) Filed: Mar. 14, 2022

(65) Prior Publication Data
US 2022/0197596 A1   Jun. 23, 2022

Related U.S. Application Data

(63) Continuation-in-part of application No. 17/027,276, filed on Sep. 21, 2020, now Pat. No. 11,513,733.

(60) Provisional application No. 62/958,226, filed on Jan. 7, 2020.

(30) Foreign Application Priority Data

Jan. 17, 2020   (KR) .......................... 10-2020-0006903

(51) Int. Cl.
   *G06F 7/544*   (2006.01)

(52) U.S. Cl.
   CPC .................................. *G06F 7/5443* (2013.01)

(58) Field of Classification Search
   CPC .................................................... G06F 7/5443
   See application file for complete search history.

(56) References Cited

U.S. PATENT DOCUMENTS

| | | | |
|---|---|---|---|
| 10,042,639 | B2 | 8/2018 | Gopal et al. |
| 2019/0114265 | A1 | 4/2019 | Chang et al. |
| 2020/0089472 | A1 | 3/2020 | Pareek et al. |
| 2020/0174749 | A1 | 6/2020 | Kang et al. |
| 2020/0293867 | A1 | 9/2020 | Shao et al. |
| 2021/0072986 | A1* | 3/2021 | Yudanov .............. G11C 7/1006 |

* cited by examiner

*Primary Examiner* — David E Martinez
(74) *Attorney, Agent, or Firm* — WILLIAM PARK & ASSOCIATES LTD.

(57) ABSTRACT

A processing-in-memory (PIM) device includes a plurality of memory banks and a plurality of multiplication and accumulation (MAC) operators. The plurality of memory banks include a plurality of even memory banks and a plurality of odd memory banks. The plurality of MAC operators include a first MAC operator configured to be shared by a first even memory bank among the plurality of even memory banks and a first odd memory bank among the plurality of odd memory banks. The first MAC operator is configured to alternately perform an even MAC operation and an odd MAC operation.

20 Claims, 65 Drawing Sheets

FIG. 33

$$\begin{bmatrix} W1.1 & W1.2 & W1.3 & \cdots & W1.32 \\ W2.1 & W2.2 & W2.3 & \cdots & W2.32 \\ \vdots & \vdots & \vdots & \cdots & \vdots \\ W32.1 & W32.2 & W32.3 & \cdots & W32.32 \end{bmatrix} \times \begin{bmatrix} V1.1 \\ V2.1 \\ \vdots \\ V32.1 \end{bmatrix} = \begin{bmatrix} RST1.1 \\ RST2.1 \\ \vdots \\ RST32.1 \end{bmatrix}$$

WEIGHT MATRIX × VECTOR MATRIX = RESULT MATRIX

FIG. 34

PROCESSING-IN-MEMORY (PIM) SYSTEM AND OPERATING METHODS OF THE PIM SYSTEM

CROSS-REFERENCE TO RELATED APPLICATIONS

This application is a continuation-in-part of U.S. patent application Ser. No. 17/027,276, filed Sep. 21, 2020, which claims the benefit of U.S. Provisional Application No. 62/958,226, filed on Jan. 7, 2020, and claims priority to Korean Application No. 10-2020-0006903, filed on Jan. 17, 2020, which are incorporated herein by reference in their entirety.

BACKGROUND

1. Technical Field

Various embodiments of the present disclosure relate to processing-in-memory (PIM) systems and, more particularly, to PIM systems including a PIM device and a controller and methods of operating the PIM systems.

2. Related Art

Recently, interest in artificial intelligence (AI) has been increasing not only in the information technology industry but also in the financial and medical industries. Accordingly, in various fields, artificial intelligence, more precisely, the introduction of deep learning, is considered and prototyped. In general, techniques for effectively learning deep neural networks (DNNs) or deep networks having increased layers as compared with general neural networks to utilize the deep neural networks (DNNs) or the deep networks in pattern recognition or inference are commonly referred to as deep learning.

One cause of this widespread interest may be the improved performance of processors performing arithmetic operations. To improve the performance of artificial intelligence, it may be necessary to increase the number of layers constituting a neural network in the artificial intelligence to educate the artificial intelligence. This trend has continued in recent years, which has led to an exponential increase in the amount of computation required for the hardware that actually does the computation. Moreover, if the artificial intelligence employs a general hardware system including memory and a processor which are separated from each other, the performance of the artificial intelligence may be degraded due to limitation of the amount of data communication between the memory and the processor. In order to solve this problem, a PIM device in which a processor and memory are integrated in one semiconductor chip has been used as a neural network computing device. Because the PIM device directly performs arithmetic operations internally, data processing speed in the neural network may be improved.

SUMMARY

A PIM device according to an embodiment of the present disclosure may include a plurality of memory banks and a plurality of multiplication and accumulation (MAC) operators. The plurality of memory banks may include a plurality of even memory banks and a plurality of odd memory banks. The plurality of MAC operators may include a first MAC operator configured to be shared by a first even memory bank among the plurality of even memory banks and a first odd memory bank among the plurality of odd memory banks. The first MAC operator may be configured to alternately perform an even MAC operation and an odd MAC operation.

A PIM device according to another embodiment of the present disclosure may include an even memory bank, an odd memory bank, a global buffer, and a multiplication and accumulation (MAC) operator. The even memory bank may be configured to store even weight data. The odd memory bank may be configured to store odd weight data. The global buffer may be configured to store vector data. The MAC operator may be configured to be shared by the even memory bank and the odd memory bank to alternately perform an even MAC operation and an odd MAC operation. The even MAC operation may be performed using the even weight data and the vector data while performing a pre-charge operation and an active operation on the odd memory bank. The odd MAC operation may be started after the even MAC operation is completed, and may be performed using the odd weight data and the vector data while the pre-charge operation and the active operation of the even memory bank are performed.

BRIEF DESCRIPTION OF THE DRAWINGS

Certain features of the disclosed technology are illustrated in various embodiments with reference to the attached drawings.

FIG. 33 is a diagram illustrating an example of matrix multiplication performed by a MAC operation of the PIM device of FIG. 31.

FIG. 34 is a diagram illustrating a method of storing weight data of a weight matrix of FIG. 33 in first to sixteenth memory banks.

DETAILED DESCRIPTION

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean a relative positional relationship, but not used to limit certain cases in which the element directly contacts the other element, or at least one intervening element is present therebetween. Accordingly, the terms such as "on," "over," "above," "under," "beneath," "below," and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other element indirectly with one or more additional elements therebetween.

Various embodiments are directed to PIM systems and methods of operating the PIM systems.

Figure 1:
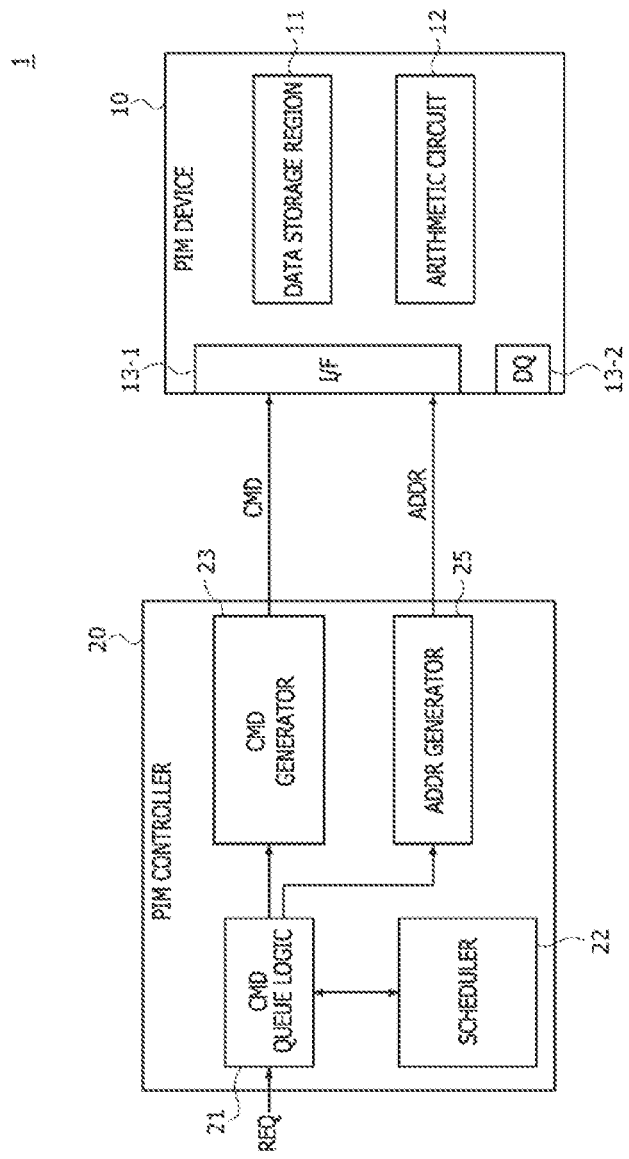
FIG. 1 is a block diagram illustrating a PIM system according to an embodiment of the present disclosure.

FIG. 1 is a block diagram illustrating a PIM system according to an embodiment of the present disclosure. As illustrated in FIG. 1, the PIM system 1 may include a PIM device 10 and a PIM controller 20. The PIM device 10 may include a data storage region 11, an arithmetic circuit 12, an interface (I/F) 13-1, and a data (DQ) input/output (I/O) pad 13-2. The data storage region 11 may include a first storage region and a second storage region. In an embodiment, the first storage region and the second storage region may be a first memory bank and a second memory bank, respectively. In another embodiment, the first data storage region and the second storage region may be a memory bank and buffer memory, respectively. The data storage region 11 may include a volatile memory element or a non-volatile memory element. For an embodiment, the data storage region 11 may include both a volatile memory element and a non-volatile memory element.

The arithmetic circuit 12 may perform an arithmetic operation on the data transferred from the data storage region 11. In an embodiment, the arithmetic circuit 12 may include a multiplying-and-accumulating (MAC) operator. The MAC operator may perform a multiplying calculation on the data transferred from the data storage region 11 and perform an accumulating calculation on the multiplication result data. After MAC operations, the MAC operator may output MAC result data. The MAC result data may be stored in the data storage region 11 or output from the PIM device 10 through the data I/O pad 13-2.

The interface 13-1 of the PIM device 10 may receive a command CMD and address ADDR from the PIM controller 20. The interface 13-1 may output the command CMD to the data storage region 11 or the arithmetic circuit 12 in the PIM device 10. The interface 13-1 may output the address ADDR to the data storage region 11 in the PIM device 10. The data I/O pad 13-2 of the PIM device 10 may function as a data communication terminal between a device external to the PIM device 10, for example the PIM controller 20, and the data storage region 11 included in the PIM device 10. The external device to the PIM device 10 may correspond to the PIM controller 20 of the PIM system 1 or a host located outside the PIM system 1. Accordingly, data outputted from the host or the PIM controller 20 may be inputted into the PIM device 10 through the data I/O pad 13-2.

The PIM controller 20 may control operations of the PIM device 10. In an embodiment, the PIM controller 20 may control the PIM device 10 such that the PIM device 10 operates in a memory mode or an arithmetic mode. In the event that the PIM controller 20 controls the PIM device 10 such that the PIM device 10 operates in the memory mode, the PIM device 10 may perform a data read operation or a data write operation for the data storage region 11. In the event that the PIM controller 20 controls the PIM device 10 such that the PIM device 10 operates in the arithmetic mode, the arithmetic circuit 12 of the PIM device 10 may receive first data and second data from the data storage region 11 to perform an arithmetic operation. In the event that the PIM controller 20 controls the PIM device 10 such that the PIM device 10 operates in the arithmetic mode, the PIM device 10 may also perform the data read operation and the data write operation for the data storage region 11 to execute the arithmetic operation. The arithmetic operation may be a deterministic arithmetic operation performed during a predetermined fixed time. The word "predetermined" as used herein with respect to a parameter, such as a predetermined fixed time or time period, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The PIM controller 20 may be configured to include command queue logic 21, a scheduler 22, a command (CMD) generator 23, and an address (ADDR) generator 25. The command queue logic 21 may receive a request REQ from an external device (e.g., a host of the PIM system 1) and store the command queue corresponding to the request REQ in the command queue logic 21. The command queue logic 21 may transmit information on a storage status of the command queue to the scheduler 22 whenever the command queue logic 21 stores the command queue. The command queue stored in the command queue logic 21 may be transmitted to the command generator 23 according to a sequence determined by the scheduler 22. The command queue logic 21, and also the command queue logic 210 of FIGS. 2 and 20, may be implemented as hardware, software, or a combination of hardware and software. For example, the command queue logic 21 and/or 210 may be a command queue logic circuit operating in accordance with an algorithm and/or a processor executing command queue logic code.

The scheduler 22 may adjust a sequence of the command queue when the command queue stored in the command queue logic 21 is outputted from the command queue logic 21. In order to adjust the output sequence of the command queue stored in the command queue logic 21, the scheduler 22 may analyze the information on the storage status of the command queue provided by the command queue logic 21 and may readjust a process sequence of the command queue so that the command queue is processed according to a proper sequence.

The command generator 23 may receive the command queue related to the memory mode of the PIM device 10 and the MAC mode of the PIM device 10 from the command queue logic 21.

The command generator 23 may decode the command queue to generate and output the command CMD. The command CMD may include a memory command for the memory mode or an arithmetic command for the arithmetic mode. The command CMD outputted from the command generator 23 may be transmitted to the PIM device 10.

The command generator 23 may be configured to generate and transmit the memory command to the PIM device 10 in the memory mode. The command generator 23 may be configured to generate and transmit a plurality of arithmetic commands to the PIM device 10 in the arithmetic mode. In one example, the command generator 23 may be configured to generate and output first to fifth arithmetic commands with predetermined time intervals in the arithmetic mode. The first arithmetic command may be a control signal for reading the first data out of the data storage region 11. The second arithmetic command may be a control signal for reading the second data out of the data storage region 11. The third arithmetic command may be a control signal for latching the first data in the arithmetic circuit 12. The fourth arithmetic command may be a control signal for latching the second data in the arithmetic circuit 12. And the fifth MAC command may be a control signal for latching arithmetic result data of the arithmetic circuit 12.

The address generator 25 may receive address information from the command queue logic 21 and generate the address ADDR for accessing a region in the data storage region 11. In an embodiment, the address ADDR may include a bank address, a row address, and a column address. The address ADDR outputted from the address generator 25 may be inputted to the data storage region 11 through the interface (I/F) 13-1.

Figure 2:
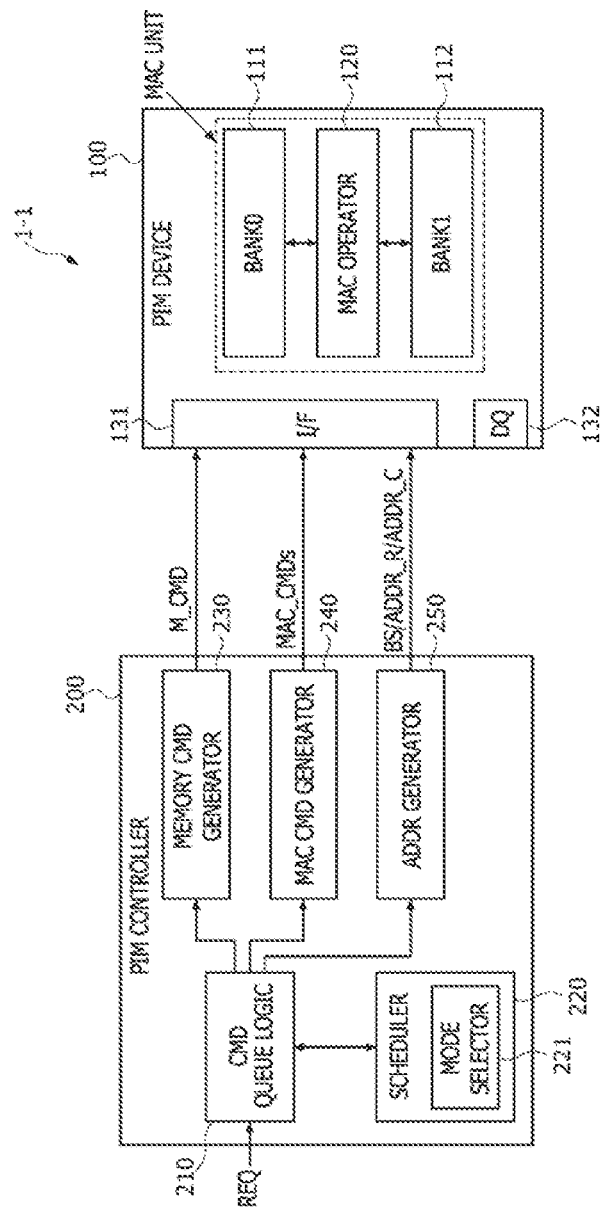
FIG. 2 is a block diagram illustrating a PIM system according to a first embodiment of the present disclosure.

FIG. 2 is a block diagram illustrating a PIM system 1-1 according to a first embodiment of the present disclosure. As illustrated in FIG. 2, the PIM system 1-1 may include a PIM device 100 and a PIM controller 200. The PIM device 100 may include a first memory bank (BANK0) 111, a second memory bank (BANK1) 112, a MAC operator 120, an interface (I/F) 131, and a data input/output (I/O) pad 132. For an embodiment, the MAC operator 120 represents a MAC operator circuit. The first memory bank (BANK0) 111, the second memory bank (BANK1) 112, and the MAC operator 120 included in the PIM device 100 may constitute one MAC unit. In another embodiment, the PIM device 100 may include a plurality of MAC units. The first memory bank (BANK0) 111 and the second memory bank (BANK1) 112 may represent a memory region for storing data, for example, a DRAM device. Each of the first memory bank (BANK0) 111 and the second memory bank (BANK1) 112 may be a component unit which is independently activated and may be configured to have the same data bus width as data I/O lines in the PIM device 100. In an embodiment, the first and second memory banks 111 and 112 may operate through interleaving such that an active operation of the first and second memory banks 111 and 112 is performed in parallel while another memory bank is selected. Each of the first and second memory banks 111 and 112 may include at least one cell array which includes memory unit cells located at cross points of a plurality of rows and a plurality of columns.

Although not shown in the drawings, a core circuit may be disposed adjacent to the first and second memory banks 111 and 112. The core circuit may include X-decoders XDECs and Y-decoders/IO circuits YDEC/IOs. An X-decoder XDEC may also be referred to as a word line decoder or a row decoder. The X-decoder XDEC may receive a row address ADD_R from the PIM controller 200 and may decode the row address ADD_R to select and enable one of the rows (i.e., word lines) coupled to the selected memory bank. Each of the Y-decoders/IO circuits YDEC/IOs may include a Y-decoder YDEC and an I/O circuit JO. The Y-decoder YDEC may also be referred to as a bit line decoder or a column decoder. The Y-decoder YDEC may receive a column address ADDR_C from the PIM controller 200 and may decode the column address ADDR_C to select and enable at least one of the columns (i.e., bit lines) coupled to the selected memory bank. Each of the I/O circuits may include an I/O sense amplifier for sensing and amplifying a level of a read datum outputted from the corresponding memory bank during a read operation for the first and second memory banks 111 and 112. In addition, the I/O circuit may include a write driver for driving a write datum during a write operation for the first and second memory banks 111 and 112.

The interface 131 of the PIM device 100 may receive a memory command M_CMD, MAC commands MAC_CMDs, a bank selection signal BS, and the row/column addresses ADDR_R/ADDR_C from the PIM controller 200. The interface 131 may output the memory command M_CMD, together with the bank selection signal BS and the row/column addresses ADDR_R/ADDR_C, to the first memory bank 111 or the second memory bank 112. The interface 131 may output the MAC commands MAC_CMDs to the first memory bank 111, the second memory bank 112, and the MAC operator 120. In such a case, the interface 131 may output the bank selection signal BS and the row/column addresses ADDR_R/ADDR_C to both of the first memory bank 111 and the second memory bank 112. The data I/O pad 132 of the PIM device 100 may function as a data communication terminal between a device external to the PIM device 100 and the MAC unit (which includes the first and second memory banks 111 and 112 and the MAC operator 120) included in the PIM device 100. The external device to the PIM device 100 may correspond to the PIM controller 200 of the PIM system 1-1 or a host located outside the PIM system 1-1. Accordingly, data outputted from the host or the PIM controller 200 may be inputted into the PIM device 100 through the data I/O pad 132.

The PIM controller 200 may control operations of the PIM device 100. In an embodiment, the PIM controller 200 may control the PIM device 100 such that the PIM device 100 operates in a memory mode or a MAC mode. In the event that the PIM controller 200 controls the PIM device 100 such that the PIM device 100 operates in the memory mode, the PIM device 100 may perform a data read operation or a data write operation for the first memory bank 111 and the second memory bank 112. In the event that the PIM controller 200 controls the PIM device 100 such that the PIM device 100 operates in the MAC mode, the PIM device 100 may perform a MAC arithmetic operation for the MAC operator 120. In the event that the PIM controller 200 controls the PIM device 100 such that the PIM device 100 operates in the MAC mode, the PIM device 100 may also perform the data read operation and the data write operation for the first and second memory banks 111 and 112 to execute the MAC arithmetic operation.

The PIM controller 200 may be configured to include command queue logic 210, a scheduler 220, a memory command generator 230, a MAC command generator 240, and an address generator 250. The command queue logic 210 may receive a request REQ from an external device (e.g., a host of the PIM system 1-1) and store a command queue corresponding to the request REQ in the command queue logic 210. The command queue logic 210 may transmit information on a storage status of the command queue to the scheduler 220 whenever the command queue logic 210 stores the command queue. The command queue stored in the command queue logic 210 may be transmitted to the memory command generator 230 or the MAC command generator 240 according to a sequence determined by the scheduler 220. When the command queue outputted from the command queue logic 210 includes command information requesting an operation in the memory mode of the PIM device 100, the command queue logic 210 may transmit the command queue to the memory command generator 230. On the other hand, when the command queue outputted from the command queue logic 210 is command information requesting an operation in the MAC mode of the PIM device 100, the command queue logic 210 may transmit the command queue to the MAC command generator 240. Information on whether the command queue relates to the memory mode or the MAC mode may be provided by the scheduler 220.

The scheduler 220 may adjust a timing of the command queue when the command queue stored in the command queue logic 210 is outputted from the command queue logic 210. In order to adjust the output timing of the command queue stored in the command queue logic 210, the scheduler 220 may analyze the information on the storage status of the command queue provided by the command queue logic 210 and may readjust a process sequence of the command queue such that the command queue is processed according to a proper sequence. The scheduler 220 may output and transmit to the command queue logic 210 information on whether the command queue outputted from the command queue logic 210 relates to the memory mode of the PIM device 100 or relates to the MAC mode of the PIM device 100. In order to obtain the information on whether the command queue outputted from the command queue logic 210 relates to the memory mode or the MAC mode, the scheduler 220 may include a mode selector 221. The mode selector 221 may generate a mode selection signal including information on whether the command queue stored in the command queue logic 210 relates to the memory mode or the MAC mode, and the scheduler 220 may transmit the mode selection signal to the command queue logic 210.

The memory command generator 230 may receive the command queue related to the memory mode of the PIM device 100 from the command queue logic 210. The memory command generator 230 may decode the command queue to generate and output the memory command M_CMD. The memory command M_CMD outputted from the memory command generator 230 may be transmitted to the PIM device 100. In an embodiment, the memory command M_CMD may include a memory read command and a memory write command. When the memory read command is outputted from the memory command generator 230, the PIM device 100 may perform the data read operation for the first memory bank 111 or the second memory bank 112. Data which are read out of the PIM device 100 may be transmitted to an external device through the data I/O pad 132. The read data outputted from the PIM device 100 may be transmitted to a host through the PIM controller 200. When the memory write command is outputted from the memory command generator 230, the PIM device 100 may perform the data write operation for the first memory bank 111 or the second memory bank 112. In such a case, data to be written into the PIM device 100 may be transmitted from the host to the PIM device 100 through the PIM controller 200. The write data inputted to the PIM device 100 may be transmitted to the first memory bank 111 or the second memory bank 112 through the data I/O pad 132.

The MAC command generator 240 may receive the command queue related to the MAC mode of the PIM device 100 from the command queue logic 210. The MAC command generator 240 may decode the command queue to generate and output the MAC commands MAC_CMDs. The MAC commands MAC_CMDs outputted from the MAC command generator 240 may be transmitted to the PIM device 100. The data read operation for the first memory bank 111 and the second memory bank 112 of the PIM device 100 may be performed by the MAC commands MAC_CMDs outputted from the MAC command generator 240, and the MAC arithmetic operation of the MAC operator 120 may also be performed by the MAC commands MAC_CMDs outputted from the MAC command generator 240. The MAC commands MAC_CMDs and the MAC arithmetic operation of the PIM device 100 according to the MAC commands MAC_CMDs will be described in detail with reference to FIG. 3.

The address generator 250 may receive address information from the command queue logic 210. The address generator 250 may generate the bank selection signal BS for selecting one of the first and second memory banks 111 and 112 and may transmit the bank selection signal BS to the PIM device 100. In addition, the address generator 250 may generate the row address ADDR_R and the column address ADDR_C for accessing a region (e.g., memory cells) in the first or second memory bank 111 or 112 and may transmit the row address ADDR_R and the column address ADDR_C to the PIM device 100.

Figure 3:
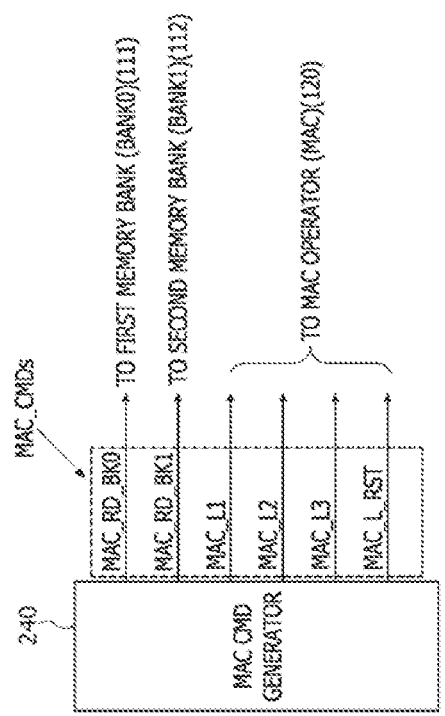
FIG. 3 illustrates MAC commands outputted from a MAC command generator of a PIM controller included in a PIM system according to a first embodiment of the present disclosure.

FIG. 3 illustrates the MAC commands MAC_CMDs outputted from the MAC command generator 240 included in the PIM system 1-1 according to the first embodiment of the present disclosure. As illustrated in FIG. 3, the MAC commands MAC_CMDs may include first to sixth MAC command signals. In an embodiment, the first MAC command signal may be a first MAC read signal MAC_RD_BK0, the second MAC command signal may be a second MAC read signal MAC_RD_BK1, the third MAC command signal may be a first MAC input latch signal MAC_L1, the fourth MAC command signal may be a second MAC input latch signal MAC_L2, the fifth MAC command signal may be a MAC output latch signal MAC_L3, and the sixth MAC command signal may be a MAC latch reset signal MAC_L_RST.

The first MAC read signal MAC_RD_BK0 may control an operation for reading first data (e.g., weight data) out of the first memory bank 111 to transmit the first data to the MAC operator 120. The second MAC read signal MAC_RD_BK1 may control an operation for reading second data (e.g., vector data) out of the second memory bank 112 to transmit the second data to the MAC operator 120. The first MAC input latch signal MAC_L1 may control an input latch operation of the weight data transmitted from the first memory bank 111 to the MAC operator 120. The second MAC input latch signal MAC_L2 may control an input latch operation of the vector data transmitted from the second memory bank 112 to the MAC operator 120. If the input latch operations of the weight data and the vector data are performed, the MAC operator 120 may perform the MAC arithmetic operation to generate MAC result data corresponding to the result of the MAC arithmetic operation. The MAC output latch signal MAC_L3 may control an output latch operation of the MAC result data generated by the MAC operator 120. And, the MAC latch reset signal MAC_L_RST may control an output operation of the MAC result data generated by the MAC operator 120 and a reset operation of an output latch included in the MAC operator 120.

The PIM system 1-1 according to the present embodiment may be configured to perform a deterministic MAC arithmetic operation. The term "deterministic MAC arithmetic operation" used in the present disclosure may be defined as the MAC arithmetic operation performed in the PIM system 1-1 during a predetermined fixed time. Thus, the MAC commands MAC_CMDs transmitted from the PIM controller 200 to the PIM device 100 may be sequentially generated with fixed time intervals. Accordingly, the PIM controller 200 does not require any extra end signals of various operations executed for the MAC arithmetic operation to generate the MAC commands MAC_CMDs for controlling the MAC arithmetic operation. In an embodiment, latencies of the various operations executed by MAC commands MAC_CMDs for controlling the MAC arithmetic operation may be set to have fixed values in order to perform the deterministic MAC arithmetic operation. In such a case, the MAC commands MAC_CMDs may be sequentially outputted from the PIM controller 200 with fixed time intervals corresponding to the fixed latencies.

For example, the MAC command generator 240 is configured to output the first MAC command at a first point in time. The MAC command generator 240 is configured to output the second MAC command at a second point in time when a first latency elapses from the first point in time. The first latency is set as the time it takes to read the first data out of the first storage region based on the first MAC command and to output the first data to the MAC operator. The MAC command generator 240 is configured to output the third MAC command at a third point in time when a second latency elapses from the second point in time. The second latency is set as the time it takes to read the second data out of the second storage region based on the second MAC command and to output the second data to the MAC operator. The MAC command generator 240 is configured to output the fourth MAC command at a fourth point in time when a third latency elapses from the third point in time. The third latency is set as the time it takes to latch the first data in the MAC operator based on the third MAC command. The MAC command generator 240 is configured to output the fifth MAC command at a fifth point in time when a fourth latency elapses from the fourth point in time. The fourth latency is set as the time it takes to latch the second data in the MAC operator based on the fourth MAC command and to perform the MAC arithmetic operation of the first and second data which are latched in the MAC operator. The MAC command generator 240 is configured to output the sixth MAC command at a sixth point in time when a fifth latency elapses from the fifth point in time. The fifth latency is set as the time it takes to perform an output latch operation of MAC result data generated by the MAC arithmetic operation.

Figure 4:
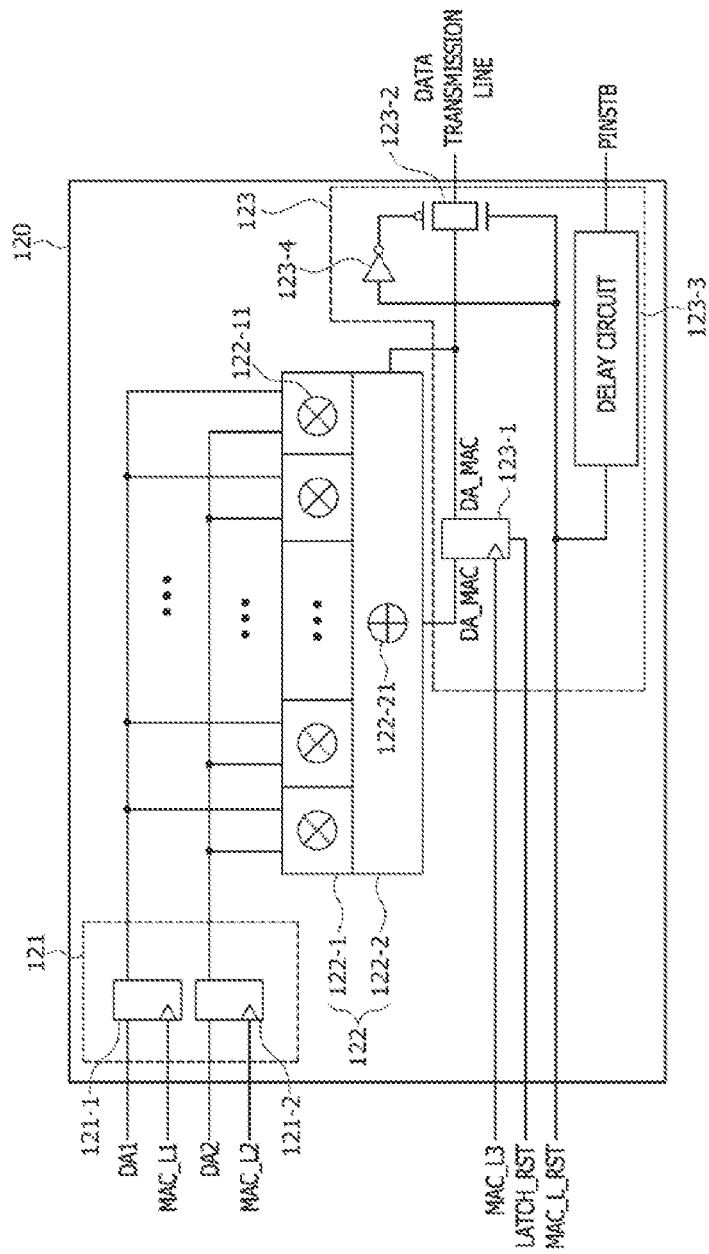
FIG. 4 is a block diagram illustrating an example of a configuration of a MAC operator of a PIM device included in a PIM system according to a first embodiment of the present disclosure.

FIG. 4 illustrates an example of the MAC operator 120 of the PIM device 100 included in the PIM system 1-1 according to the first embodiment of the present disclosure. Referring to FIG. 4, MAC operator 120 may be configured to include a data input circuit 121, a MAC circuit 122, and a data output circuit 123. The data input circuit 121 may include a first input latch 121-1 and a second input latch 121-2. The MAC circuit 122 may include a multiplication logic circuit 122-1 and an addition logic circuit 122-2. The data output circuit 123 may include an output latch 123-1, a transfer gate 123-2, a delay circuit 123-3, and an inverter 123-4. In an embodiment, the first input latch 121-1, the second input latch 121-2, and the output latch 123-1 may be realized using flip-flops.

The data input circuit 121 of the MAC operator 120 may be synchronized with the first MAC input latch signal MAC_L1 to latch first data DA1 transferred from the first memory bank 111 to the MAC circuit 122 through an internal data transmission line. In addition, the data input circuit 121 of the MAC operator 120 may be synchronized with the second MAC input latch signal MAC_L2 to latch second data DA2 transferred from the second memory bank 112 to the MAC circuit 122 through another internal data transmission line. Because the first MAC input latch signal MAC_L1 and the second MAC input latch signal MAC_L2 are sequentially transmitted from the MAC command generator 240 of the PIM controller 200 to the MAC operator 120 of the PIM device 100 with a predetermined time interval, the second data DA2 may be inputted to the MAC circuit 122 of the MAC operator 120 after the first data DA1 is inputted to the MAC circuit 122 of the MAC operator 120.

The MAC circuit 122 may perform the MAC arithmetic operation of the first data DA1 and the second data DA2 inputted through the data input circuit 121. The multiplication logic circuit 122-1 of the MAC circuit 122 may include a plurality of multipliers 122-11. Each of the multipliers 122-11 may perform a multiplying calculation of the first data DA1 outputted from the first input latch 121-1 and the second data DA2 outputted from the second input latch 121-2 and may output the result of the multiplying calculation. Bit values constituting the first data DA1 may be separately inputted to the multipliers 122-11. Similarly, bit values constituting the second data DA2 may also be separately inputted to the multipliers 122-11. For example, if the first data DA1 is represented by an 'N'-bit binary stream, the second data DA2 is represented by an 'N'-bit binary stream, and the number of the multipliers 122-11 is 'M', then 'N/M'-bit portions of the first data DA1 and 'N/M'-bit portions of the second data DA2 may be inputted to each of the multipliers 122-11.

The addition logic circuit 122-2 of the MAC circuit 122 may include a plurality of adders 122-21. Although not shown in the drawings, the plurality of adders 122-21 may be disposed to provide a tree structure including a plurality of stages. Each of the adders 122-21 disposed at a first stage may receive two sets of multiplication result data from two of the multipliers 122-11 included in the multiplication logic circuit 122-1 and may perform an adding calculation of the two sets of multiplication result data to output the addition result data. Each of the adders 122-21 disposed at a second stage may receive two sets of addition result data from two of the adders 122-21 disposed at the first stage and may perform an adding calculation of the two sets of addition result data to output the addition result data. The adder 122-21 disposed at a last stage may receive two sets of addition result data from two adders 122-21 disposed at the previous stage and may perform an adding calculation of the two sets of addition result data to output the addition result data. Although not shown in the drawings, the addition logic circuit 122-2 may further include an additional adder for performing an accumulative adding calculation of MAC result data DA_MAC outputted from the adder 122-21 disposed at the last stage and previous MAC result data DA_MAC stored in the output latch 123-1 of the data output circuit 123.

The data output circuit 123 may output the MAC result data DA_MAC outputted from the MAC circuit 122 to a data transmission line. Specifically, the output latch 123-1 of the data output circuit 123 may be synchronized with the MAC output latch signal MAC_L3 to latch the MAC result data DA_MAC outputted from the MAC circuit 122 and to output the latched data of the MAC result data DA_MAC. The MAC result data DA_MAC outputted from the output latch 123-1 may be fed back to the MAC circuit 122 for the accumulative adding calculation. In addition, the MAC result data DA_MAC may be inputted to the transfer gate 123-2. The output latch 123-1 may be initialized if a latch reset signal LATCH_RST is inputted to the output latch 123-1. In such a case, all of data latched by the output latch 123-1 may be removed. In an embodiment, the latch reset signal LATCH_RST may be activated by generation of the MAC latch reset signal MAC_L_RST and may be inputted to the output latch 123-1.

The MAC latch reset signal MAC_L_RST outputted from the MAC command generator 240 may be inputted to the transfer gate 123-2, the delay circuit 123-3, and the inverter 123-4. The inverter 123-4 may inversely buffer the MAC latch reset signal MAC_L_RST to output the inversely buffered signal of the MAC latch reset signal MAC_L_RST to the transfer gate 123-2. The transfer gate 123-2 may transfer the MAC result data DA_MAC from the output latch 123-1 to the data transmission line in response to the MAC latch reset signal MAC_L_RST. The delay circuit 123-3 may delay the MAC latch reset signal MAC_L_RST by a certain time to generate and output a latch control signal PINSTB.

Figure 5:
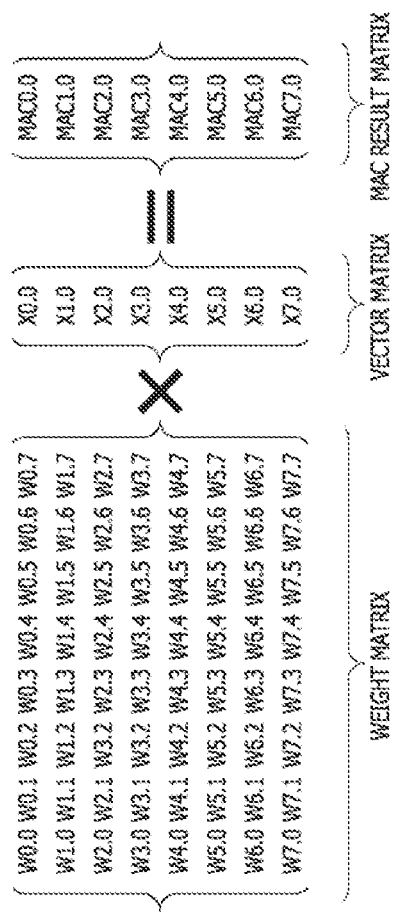
FIG. 5 illustrates an example of a MAC arithmetic operation performed in a PIM system according to a first embodiment of the present disclosure.

FIG. 5 illustrates an example of the MAC arithmetic operation performed in the PIM system 1-1 according to the first embodiment of the present disclosure. As illustrated in FIG. 5, the MAC arithmetic operation performed by the PIM system 1-1 may be executed though a matrix calculation. Specifically, the PIM device 100 may execute a matrix multiplying calculation of an 'M×N' weight matrix (e.g., '8×8' weight matrix) and a 'N×1' vector matrix (e.g., '8×1' vector matrix) according to control of the PIM controller 200 (where, 'M' and 'N' are natural numbers). Elements W0.0, ..., and W7.7 constituting the weight matrix may correspond to the first data DA1 inputted to the MAC operator 120 from the first memory bank 111. Elements X0.0, ..., and X7.0 constituting the vector matrix may correspond to the second data DA2 inputted to the MAC operator 120 from the second memory bank 112. Each of the elements W0.0, ..., and W7.7 constituting the weight matrix may be represented by a binary stream having a plurality of bit values. In addition, each of the elements X0.0, ..., and X7.0 constituting the vector matrix may also be represented by a binary stream having a plurality of bit values. The number of bits included in each of the elements W0.0, ..., and W7.7 constituting the weight matrix may be equal to the number of bits included in each of the elements X0.0, ..., and X7.0 constituting the vector matrix.

The matrix multiplying calculation of the weight matrix and the vector matrix may be appropriate for a multilayer perceptron-type neural network structure (hereinafter, referred to as an 'MLP-type neural network'). In general, the MLP-type neural network for executing deep learning may include an input layer, a plurality of hidden layers (e.g., at least three hidden layers), and an output layer. The matrix multiplying calculation (i.e., the MAC arithmetic operation) of the weight matrix and the vector matrix illustrated in FIG. 5 may be performed in one of the hidden layers. In a first hidden layer of the plurality of hidden layers, the MAC arithmetic operation may be performed using vector data inputted to the first hidden layer. However, in each of second to last hidden layers among the plurality of hidden layers, the MAC arithmetic operation may be performed using a calculation result of the previous hidden layer as the vector data.

Figure 6:
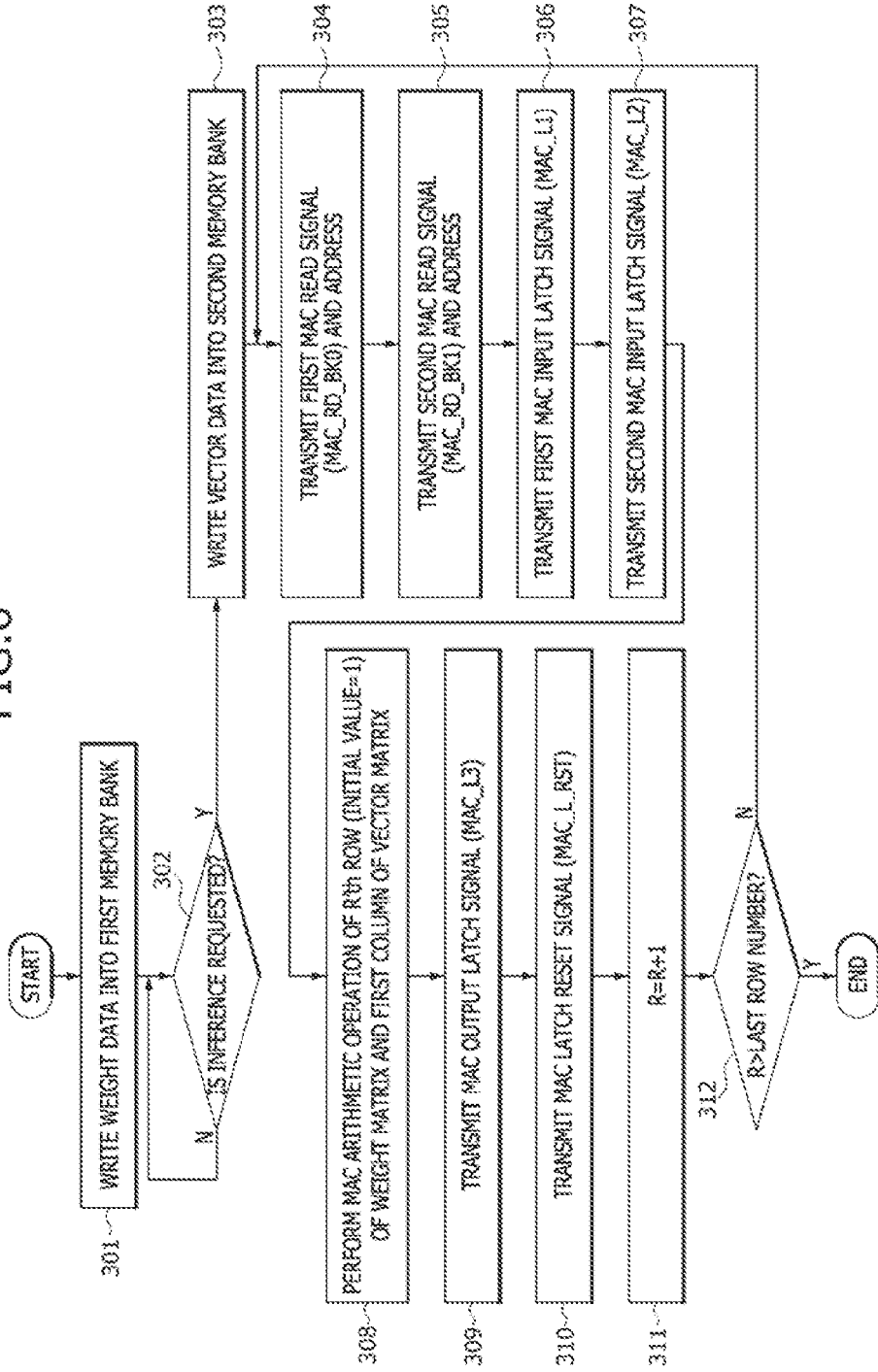
FIG. 6 is a flowchart illustrating processes of the MAC arithmetic operation illustrated in FIG. 5 in a PIM system according to a first embodiment of the present disclosure.

FIG. 6 is a flowchart illustrating processes of the MAC arithmetic operation described with reference to FIG. 5, which are performed in the PIM system 1-1 according to the first embodiment of the present disclosure. In addition, FIGS. 7 to 13 are block diagrams illustrating the processes of the MAC arithmetic operation illustrated in FIG. 5, which are performed in the PIM system 1-1 according to the first embodiment of the present disclosure. Referring to FIGS. 6 to 13, before the MAC arithmetic operation is performed, the first data (i.e., the weight data) may be written into the first memory bank 111 at a step 301. Thus, the weight data may be stored in the first memory bank 111 of the PIM device 100. In the present embodiment, it may be assumed that the weight data are the elements W0.0, ..., and W7.7 constituting the weight matrix of FIG. 5. The integer before the decimal point is one less than a row number, and the integer after the decimal point is one less than a column number. Thus, for example, the weight W0.0 represents the element of the first row and the first column of the weight matrix.

At a step 302, whether an inference is requested may be determined. An inference request signal may be transmitted from an external device located outside of the PIM system 1-1 to the PIM controller 200 of the PIM system 1-1. An inference request, in some instances, may be based on user input. An inference request may initiate a calculation performed by the PIM system 1-1 to reach a determination based on input data. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, ..., and X7.0 constituting the vector matrix of FIG. 5. If the inference request signal is transmitted to the PIM controller 200 at the step 302, then the PIM controller 200 may write the vector data transmitted with the inference request signal into the second memory bank 112 at a step 303. Accordingly, the vector data may be stored in the second memory bank 112 of the PIM device 100.

Figure 7:
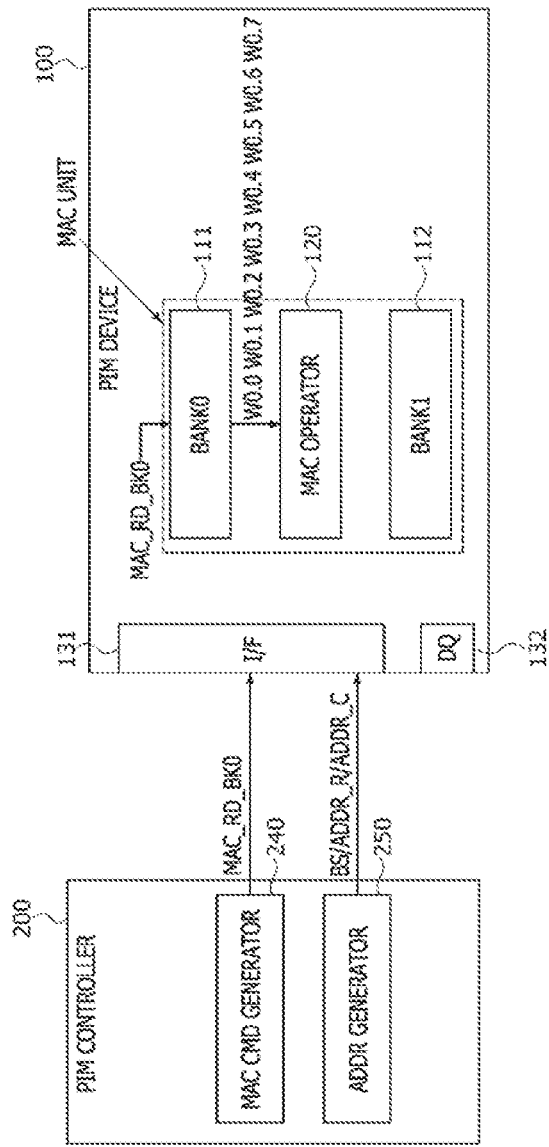
FIGS. 7 to 13 are block diagrams illustrating processes of the MAC arithmetic operation illustrated in FIG. 5 in a PIM system according to a first embodiment of the present disclosure.

At a step 304, the MAC command generator 240 of the PIM controller 200 may generate and transmit the first MAC read signal MAC_RD_BK0 to the PIM device 100, as illustrated in FIG. 7. In such a case, the address generator 250 of the PIM controller 200 may generate and transmit the bank selection signal BS and the row/column address ADDR_R/ADDR_C to the PIM device 100. The bank selection signal BS may be generated to select the first memory bank 111 of the first and second memory banks 111 and 112. Thus, the first MAC read signal MAC_RD_BK0 may control the data read operation for the first memory bank 111 of the PIM device 100. The first memory bank 111 may output and transmit the elements W0.0, ..., and W0.7 in the first row of the weight matrix of the weight data stored in a region of the first memory bank 111, which is selected by the row/column address ADDR_R/ADDR_C, to the MAC operator 120 in response to the first MAC read signal MAC_RD_BK0. In an embodiment, the data transmission from the first memory bank 111 to the MAC operator 120 may be executed through a global input/output (hereinafter, referred to as 'GIO') line which is provided as a data transmission path in the PIM device 100. Alternatively, the data transmission from the first memory bank 111 to the MAC operator 120 may be executed through a first bank input/output (hereinafter, referred to as 'BIO') line which is provided specifically for data transmission between the first memory bank 111 and the MAC operator 120.

Figure 8:
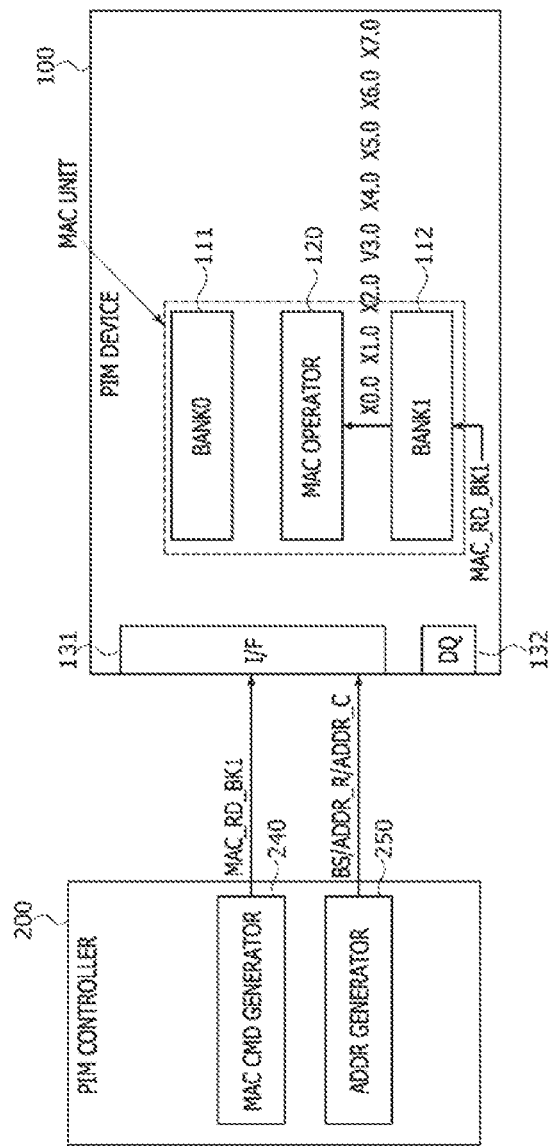

At a step 305, the MAC command generator 240 of the PIM controller 200 may generate and transmit the second MAC read signal MAC_RD_BK1 to the PIM device 100, as illustrated in FIG. 8. In such a case, the address generator 250 of the PIM controller 200 may generate and transmit the bank selection signal BS for selecting the second memory bank 112 and the row/column address ADDR_R/ADDR_C to the PIM device 100. The second MAC read signal MAC_RD_BK1 may control the data read operation for the second memory bank 112 of the PIM device 100. The second memory bank 112 may output and transmit the elements X0.0, . . . , and X7.0 in the first column of the vector matrix corresponding to the vector data stored in a region of the second memory bank 112, which is selected by the row/column address ADDR_R/ADDR_C, to the MAC operator 120 in response to the second MAC read signal MAC_RD_BK1. In an embodiment, the data transmission from the second memory bank 112 to the MAC operator 120 may be executed through the GIO line in the PIM device 100. Alternatively, the data transmission from the second memory bank 112 to the MAC operator 120 may be executed through a second BIO line which is provided specifically for data transmission between the second memory bank 112 and the MAC operator 120.

Figure 9:
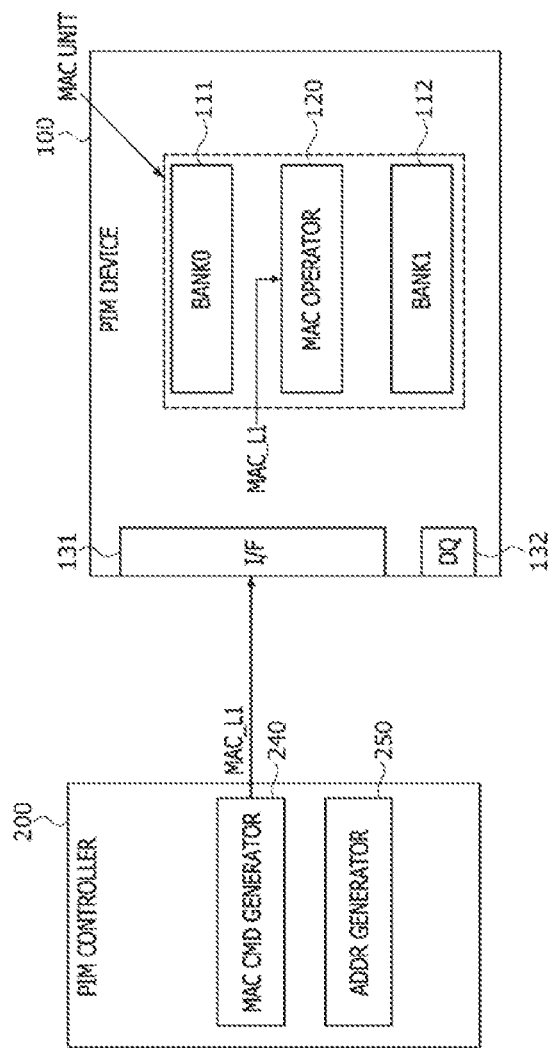
Figure 11:
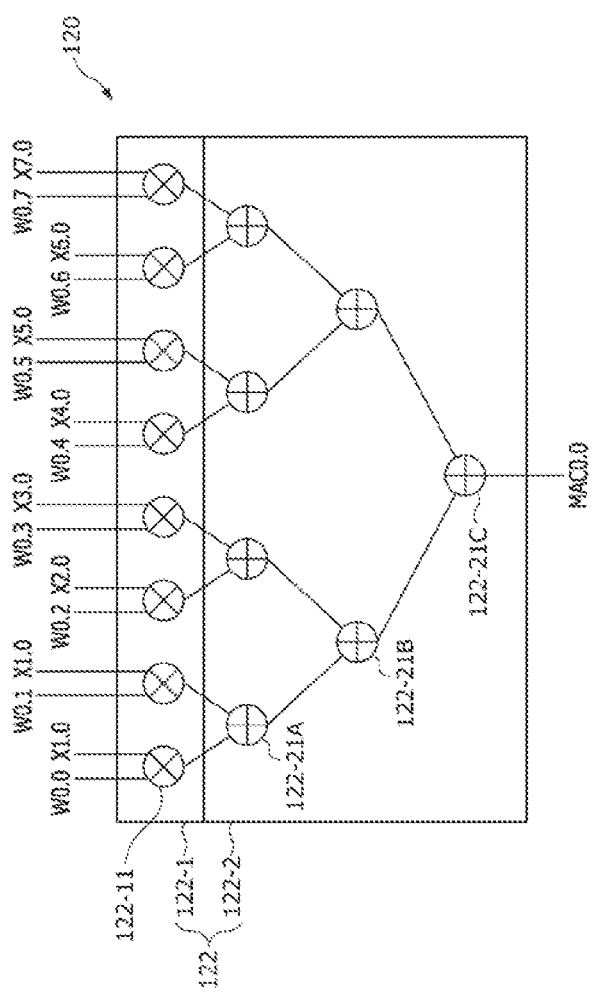

At a step 306, the MAC command generator 240 of the PIM controller 200 may generate and transmit the first MAC input latch signal MAC_L1 to the PIM device 100, as illustrated in FIG. 9. The first MAC input latch signal MAC_L1 may control the input latch operation of the first data for the MAC operator 120 of the PIM device 100. The elements W0.0, . . . , and W0.7 in the first row of the weight matrix may be inputted to the MAC circuit 122 of the MAC operator 120 by the input latch operation, as illustrated in FIG. 11. The MAC circuit 122 may include the plurality of multipliers 122-11 (e.g., eight multipliers 122-11), the number of which is equal to the number of columns of the weight matrix. In such a case, the elements W0.0, . . . , and W0.7 in the first row of the weight matrix may be inputted to the eight multipliers 122-11, respectively.

Figure 10:
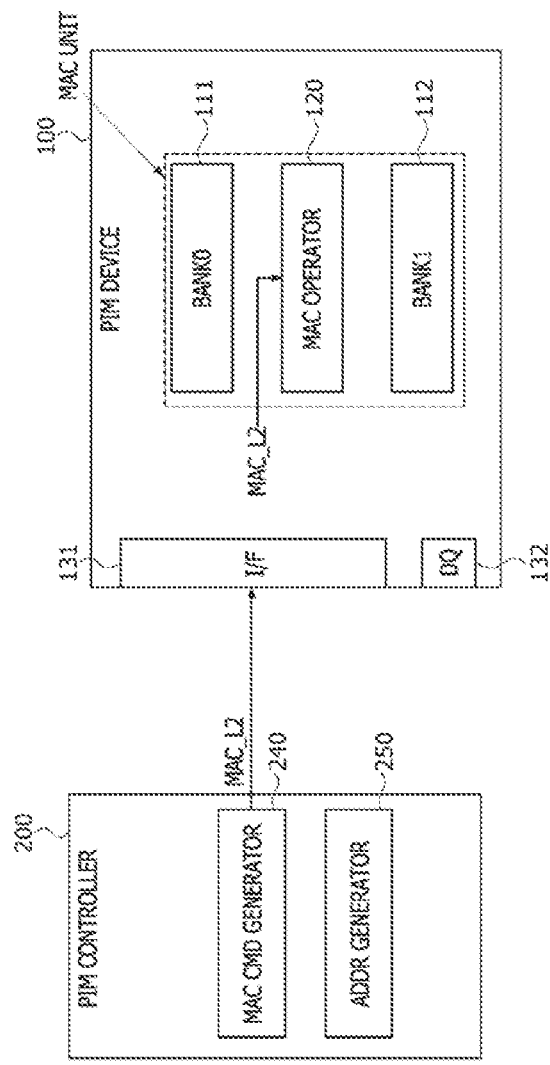

At a step 307, the MAC command generator 240 of the PIM controller 200 may generate and transmit the second MAC input latch signal MAC_L2 to the PIM device 100, as illustrated in FIG. 10. The second MAC input latch signal MAC_L2 may control the input latch operation of the second data for the MAC operator 120 of the PIM device 100. The elements X0.0, . . . , and X7.0 in the first column of the vector matrix may be inputted to the MAC circuit 122 of the MAC operator 120 by the input latch operation, as illustrated in FIG. 11. In such a case, the elements X0.0, . . . , and X7.0 in the first column of the vector matrix may be inputted to the eight multipliers 122-11, respectively.

At a step 308, the MAC circuit 122 of the MAC operator 120 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. For example, the scalar product is calculated of the Rth '1×N' row vector of the 'M×N' weight matrix and the 'N×1' vector matrix as an 'R×1' element of the 'M×1' MAC result matrix. For R=1, the scalar product of the first row of the weight matrix and the first column of the vector matrix shown in FIG. 5 is W0.0*X0.0+W0.1*X1.0+W0.2*X2.0+ W0.3*X3.0+W0.4*X4.0+W0.5*X5.0+W0.6*X6.0+ W0.7*X7.0. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2, as illustrated in FIG. 11, may include four adders 122-21A disposed at a first stage, two adders 122-21B disposed at a second stage, and an adder 122-21C disposed at a third stage.

Each of the adders 122-21A disposed at the first stage may receive output data of two of the multipliers 122-11 and may perform an adding calculation of the output data of the two multipliers 122-11 to output the result of the adding calculation. Each of the adders 122-21B disposed at the second stage may receive output data of two of the adders 122-21A disposed at the first stage and may perform an adding calculation of the output data of the two adders 122-21A to output the result of the adding calculation. The adder 122-21C disposed at the third stage may receive output data of two of the adders 122-21B disposed at the second stage and may perform an adding calculation of the output data of the two adders 122-21B to output the result of the adding calculation. The output data of the addition logic circuit 122-2 may correspond to result data (i.e., MAC result data) of the MAC arithmetic operation of the first row included in the weight matrix and the column included in the vector matrix. Thus, the output data of the addition logic circuit 122-2 may correspond to an element MAC0.0 located at a first row of an '8×1' MAC result matrix having eight elements of MAC0.0, . . . , and MAC7.0, as illustrated in FIG. 5. The output data MAC0.0 of the addition logic circuit 122-2 may be inputted to the output latch 123-1 disposed in the data output circuit 123 of the MAC operator 120, as described with reference to FIG. 4.

Figure 12:
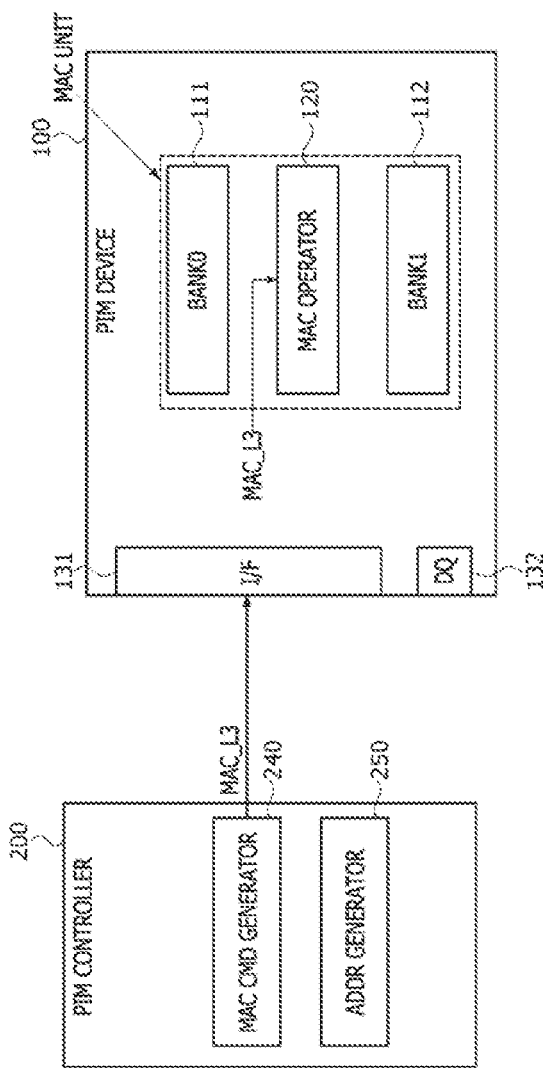

At a step 309, the MAC command generator 240 of the PIM controller 200 may generate and transmit the MAC output latch signal MAC_L3 to the PIM device 100, as illustrated in FIG. 12. The MAC output latch signal MAC_L3 may control the output latch operation of the MAC result data MAC0.0 performed by the MAC operator 120 of the PIM device 100. The MAC result data MAC0.0 inputted from the MAC circuit 122 of the MAC operator 120 may be outputted from the output latch 123-1 in synchronization with the MAC output latch signal MAC_L3, as described with reference to FIG. 4. The MAC result data MAC0.0 outputted from the output latch 123-1 may be inputted to the transfer gate 123-2 of the data output circuit 123.

Figure 13:
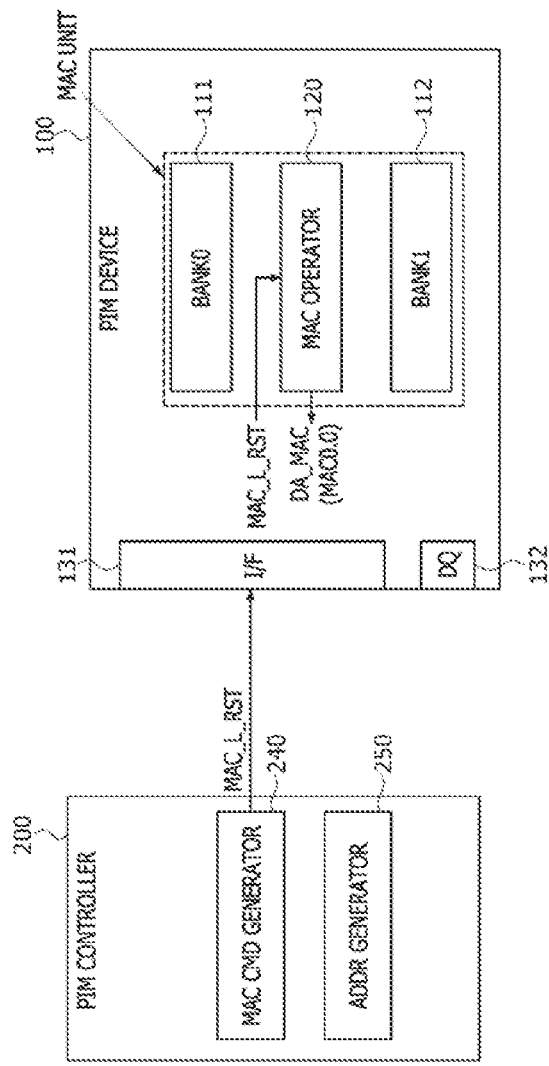

At a step 310, the MAC command generator 240 of the PIM controller 200 may generate and transmit the MAC latch reset signal MAC_L_RST to the PIM device 100, as illustrated in FIG. 13. The MAC latch reset signal MAC_L_RST may control an output operation of the MAC result data MAC0.0 generated by the MAC operator 120 and a reset operation of the output latch included in the MAC operator 120. As described with reference to FIG. 4, the transfer gate 123-2 receiving the MAC result data MAC0.0 from the output latch 123-1 of the MAC operator 120 may be synchronized with the MAC latch reset signal MAC_L_RST to output the MAC result data MAC0.0. In an embodiment, the MAC result data MAC0.0 outputted from the MAC operator 120 may be stored into the first memory bank 111 or the second memory bank 112 through the first BIO line or the second BIO line in the PIM device 100.

At a step 311, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 311. At a step 312, whether the row number changed at the step 311 is greater than the row number of the last row (i.e., the eighth row of the current example) of the weight matrix may be determined. Because the row number of the weight matrix is changed to '2' at the step 311, a process of the MAC arithmetic operation may be fed back to the step 304.

If the process of the MAC arithmetic operation is fed back to the step 304 from the step 312, then the same processes as described with reference to the steps 304 to 310 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 304 at the step 312, then the processes from the step 304 to the step 311 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 311, the MAC arithmetic operation may terminate because the row number of '9' is greater than the last row number of '8' at the step 312.

Figure 14:
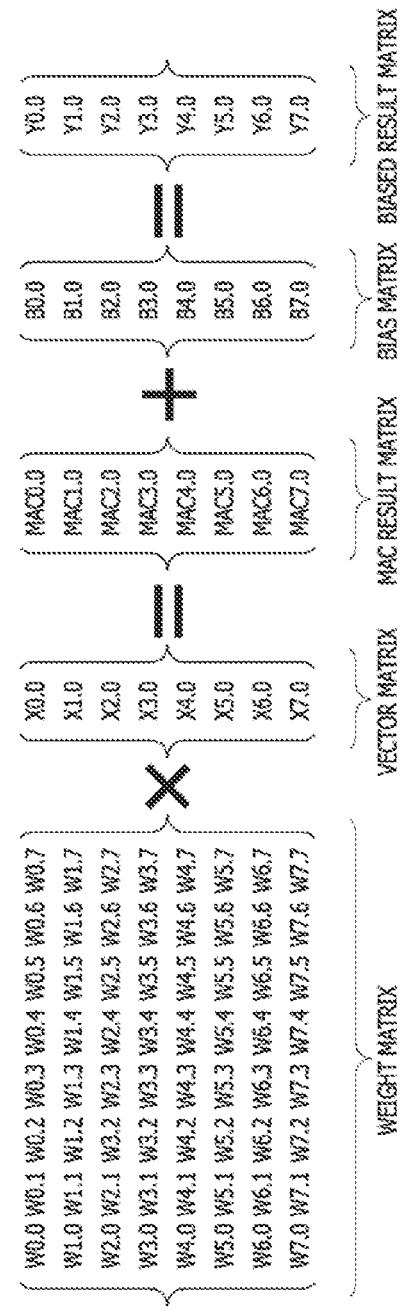
FIG. 14 illustrates another example of a MAC arithmetic operation performed in a PIM system according to a first embodiment of the present disclosure.

FIG. 14 illustrates another example of a MAC arithmetic operation performed in the PIM system 1-1 according to the first embodiment of the present disclosure. As illustrated in FIG. 14, the MAC arithmetic operation performed by the PIM system 1-1 may further include an adding calculation of the MAC result matrix and a bias matrix. Specifically, as described with reference to FIG. 5, the PIM device 100 may execute the matrix multiplying calculation of the '8×8' weight matrix and the '8×1' vector matrix according to control of the PIM controller 200. As a result of the matrix multiplying calculation of the '8×8' weight matrix and the '8×1' vector matrix, the '8×1' MAC result matrix having the eight elements MAC0.0, . . . , and MAC7.0 may be generated. The '8×1' MAC result matrix may be added to a '8×1' bias matrix. The '8×1' bias matrix may have elements B0.0, . . . , and B7.0 corresponding to bias data. The bias data may be set to reduce an error of the MAC result matrix. As a result of the adding calculation of the MAC result matrix and the bias matrix, a '8×1' biased result matrix having eight elements Y0.0, . . . , and Y7.0 may be generated.

Figure 15:
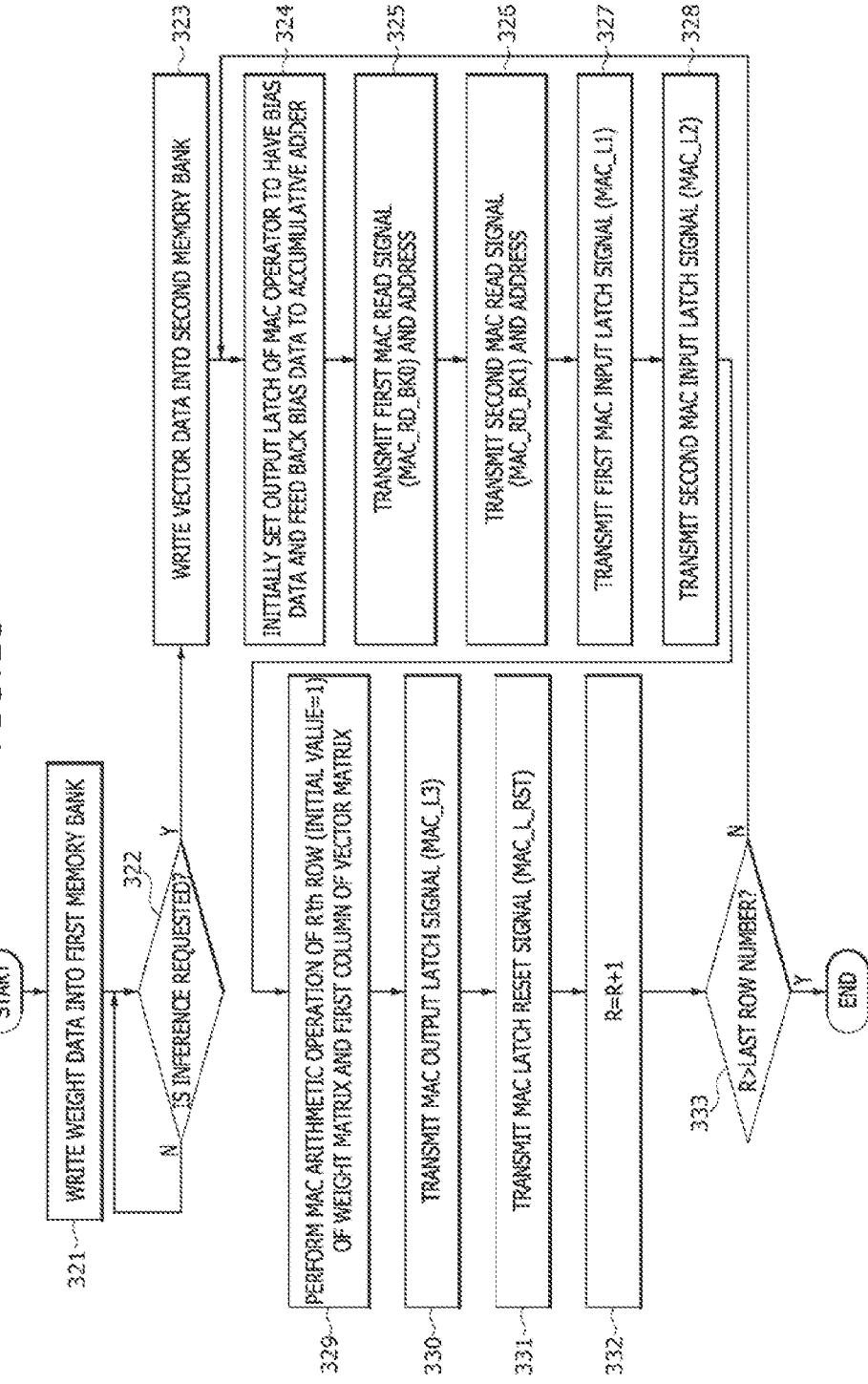
FIG. 15 is a flowchart illustrating processes of the MAC arithmetic operation illustrated in FIG. 14 in a PIM system according to a first embodiment of the present disclosure.
Figure 16:
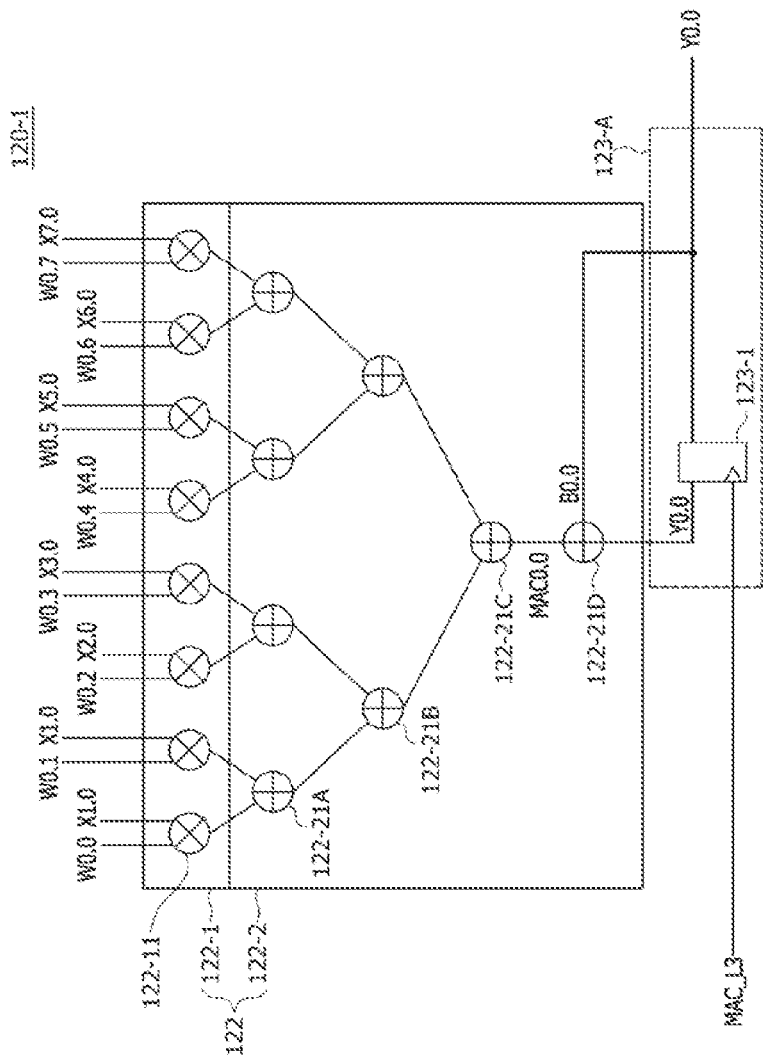
FIG. 16 illustrates an example of a configuration of a MAC operator for performing the MAC arithmetic operation of FIG. 14 in a PIM system according to a first embodiment of the present disclosure.

FIG. 15 is a flowchart illustrating processes of the MAC arithmetic operation described with reference to FIG. 14 in the PIM system 1-1 according to the first embodiment of the present disclosure. Moreover, FIG. 16 illustrates an example of a configuration of a MAC operator 120-1 for performing the MAC arithmetic operation of FIG. 14 in the PIM system 1-1 according to the first embodiment of the present disclosure. In FIG. 16, the same reference numerals or the same reference symbols as used in FIG. 4 denote the same elements, and the detailed descriptions of the same elements as indicated in the previous embodiment will be omitted hereinafter. Referring to FIG. 15, the first data (i.e., the weight data) may be written into the first memory bank 111 at a step 321 to perform the MAC arithmetic operation in the PIM device 100. Thus, the weight data may be stored in the first memory bank 111 of the PIM device 100. In the present embodiment, it may be assumed that the weight data are the elements W0.0, . . . , and W7.7 constituting the weight matrix of FIG. 14.

At a step 322, whether an inference is requested may be determined. An inference request signal may be transmitted from an external device located outside of the PIM system 1-1 to the PIM controller 200 of the PIM system 1-1. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 14. If the inference request signal is transmitted to the PIM controller 200 at the step 322, the PIM controller 200 may write the vector data transmitted with the inference request signal into the second memory bank 112 at a step 323. Accordingly, the vector data may be stored in the second memory bank 112 of the PIM device 100.

At a step 324, the output latch of the MAC operator may be initially set to have the bias data and the initially set bias data may be fed back to an accumulative adder of the MAC operator. This process is executed to perform the matrix adding calculation of the MAC result matrix and the bias matrix, which is described with reference to FIG. 14. In other words, the output latch 123-1 in the data output circuit 123-A of the MAC operator (120-1) is set to have the bias data. Because the matrix multiplying calculation is executed for the first row of the weight matrix, the output latch 123-1 may be initially set to have the element B0.0 located at a cross point of the first row and the first column of the bias matrix as the bias data. The output latch 123-1 may output the bias data B0.0, and the bias data B0.0 outputted from the output latch 123-1 may be inputted to the accumulative adder 122-21D of the addition logic circuit 122-2, as illustrated in FIG. 16.

In an embodiment, in order to output the bias data B0.0 out of the output latch 123-1 and to feed back the bias data B0.0 to the accumulative adder 122-21D, the MAC command generator 240 of the PIM controller 200 may transmit the MAC output latch signal MAC_L3 to the MAC operator 120-1 of the PIM device 100. When a subsequent MAC arithmetic operation is performed, the accumulative adder 122-21D of the MAC operator 120-1 may add the MAC result data MAC0.0 outputted from the adder 122-21C disposed at the last stage to the bias data B0.0 which is fed back from the output latch 123-1 to generate the biased result data Y0.0 and may output the biased result data Y0.0 to the output latch 123-1. The biased result data Y0.0 may be outputted from the output latch 123-1 in synchronization with the MAC output latch signal MAC_L3 transmitted in a subsequent process.

In a step 325, the MAC command generator 240 of the PIM controller 200 may generate and transmit the first MAC read signal MAC_RD_BK0 to the PIM device 100. In addition, the address generator 250 of the PIM controller 200 may generate and transmit the bank selection signal BS and the row/column address ADDR_R/ADDR_C to the PIM device 100. The step 325 may be executed in the same way as described with reference to FIG. 7. In a step 326, the MAC command generator 240 of the PIM controller 200 may generate and transmit the second MAC read signal MAC_RD_BK1 to the PIM device 100. In addition, the address generator 250 of the PIM controller 200 may generate and transmit the bank selection signal BS for selecting the second memory bank 112 and the row/column address ADDR_R/ADDR_C to the PIM device 100. The step 326 may be executed in the same way as described with reference to FIG. 8.

At a step 327, the MAC command generator 240 of the PIM controller 200 may generate and transmit the first MAC input latch signal MAC_L1 to the PIM device 100. The step 327 may be executed in the same way as described with reference to FIG. 9. The first MAC input latch signal MAC_L1 may control the input latch operation of the first data for the MAC operator 120 of the PIM device 100. The input latch operation of the first data may be performed in the same way as described with reference to FIG. 11. At a step 328, the MAC command generator 240 of the PIM controller 200 may generate and transmit the second MAC input latch signal MAC_L2 to the PIM device 100. The step 328 may be executed in the same way as described with reference to FIG. 10. The second MAC input latch signal MAC_L2 may control the input latch operation of the second data for the MAC operator 120 of the PIM device 100. The input latch operation of the second data may be performed in the same way as described with reference to FIG. 11.

At a step 329, the MAC circuit 122 of the MAC operator 120 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may include the four adders 122-21A disposed at the first stage, the two adders 122-21B disposed at the second stage, the adder 122-21C disposed at the third stage, and the accumulative adder 122-21D, as illustrated in FIG. 16. The accumulative adder 122-21D may add output data of the adder 122-21C to feedback data fed back from the output latch 123-1 to output the result of the adding calculation. The output data of the adder 122-21C may be the matrix multiplying result MAC0.0, which corresponds to the result of the matrix multiplying calculation of the first row of the weight matrix and the first column of the vector matrix. The accumulative adder 122-21D may add the output data MAC0.0 of the adder 122-21C to the bias data B0.0 fed back from the output latch 123-1 to output the result of the adding calculation. The output data Y0.0 of the accumulative adder 122-21D may be inputted to the output latch 123 disposed in a data output circuit 123-A of the MAC operator 120-1.

At a step 330, the MAC command generator 240 of the PIM controller 200 may generate and transmit the MAC output latch signal MAC_L3 to the PIM device 100. The step 330 may be executed in the same way as described with reference to FIG. 12. The MAC output latch signal MAC_L3 may control the output latch operation of the MAC result data MAC0.0, which is performed by the MAC operator 120-1 of the PIM device 100. The biased result data Y0.0 transmitted from the MAC circuit 122 of the MAC operator 120 to the output latch 123-1 may be outputted from the output latch 123-1 in synchronization with the MAC output latch signal MAC_L3. The biased result data Y0.0 outputted from the output latch 123 may be inputted to the transfer gate 123-2.

At a step 331, the MAC command generator 240 of the PIM controller 200 may generate and transmit the MAC latch reset signal MAC_L_RST to the PIM device 100. The step 331 may be executed in the same way as described with reference to FIG. 13. The MAC latch reset signal MAC_L_RST may control an output operation of the biased result data Y0.0 generated by the MAC operator 120 and a reset operation of the output latch 123-1 included in the MAC operator 120. The transfer gate 123-2 receiving the biased result data Y0.0 from the output latch 123-1 of the data output circuit 123-A included in the MAC operator 120 may be synchronized with the MAC latch reset signal MAC_L_RST to output the biased result data Y0.0. In an embodiment, the biased result data Y0.0 outputted from the MAC operator 120 may be stored into the first memory bank 111 or the second memory bank 112 through the first BIO line or the second BIO line in the PIM device 100.

At a step 332, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 332. At a step 333, whether the row number changed at the step 332 is greater than the row number of the last row (i.e., the eighth row of the current example) of the weight matrix may be determined. Because the row number of the weight matrix is changed to '2' at the step 332, a process of the MAC arithmetic operation may be fed back to the step 324.

If the process of the MAC arithmetic operation is fed back to the step 324 from the step 333, then the same processes as described with reference to the steps 324 to 331 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix and the bias data B0.0 in the output latch 123-1 initially set at the step 324 may be changed into the bias data B1.0. If the process of the MAC arithmetic operation is fed back to the step 324 at the step 333, the processes from the step 324 to the step 332 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 332, the MAC arithmetic operation may terminate because the row number of '9' is greater than the last row number of '8' at the step 333.

Figure 17:
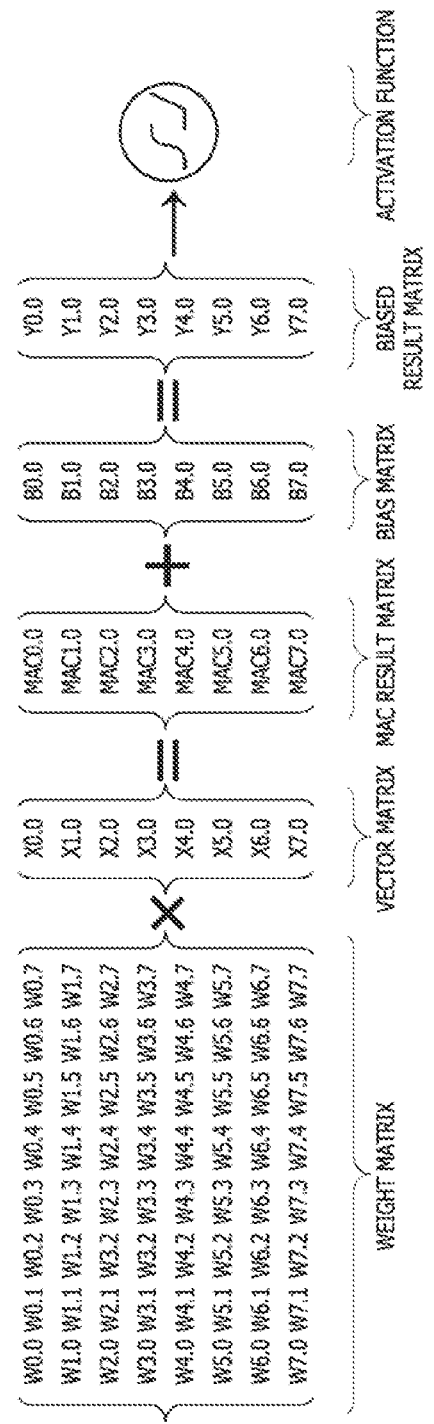
FIG. 17 illustrates yet another example of a MAC arithmetic operation performed in a PIM system according to a first embodiment of the present disclosure.

FIG. 17 illustrates yet another example of a MAC arithmetic operation performed in the PIM system 1-1 according to the first embodiment of the present disclosure. As illustrated in FIG. 17, the MAC arithmetic operation performed by the PIM system 1-1 may further include a process for applying the biased result matrix to an activation function. Specifically, as described with reference to FIG. 14, the PIM device 100 may execute the matrix multiplying calculation of the '8×8' weight matrix and the '8×1' vector matrix according to control of the PIM controller 200 to generate the MAC result matrix. In addition, the MAC result matrix may be added to the bias matrix to generate biased result matrix.

The biased result matrix may be applied to the activation function. The activation function means a function which is used to calculate a unique output value by comparing a MAC calculation value with a critical value in an MLP-type neural network. In an embodiment, the activation function may be a unipolar activation function which generates only positive output values or a bipolar activation function which generates negative output values as well as positive output values. In different embodiments, the activation function may include a sigmoid function, a hyperbolic tangent (Tanh) function, a rectified linear unit (ReLU) function, a leaky ReLU function, an identity function, and a maxout function.

Figure 18:
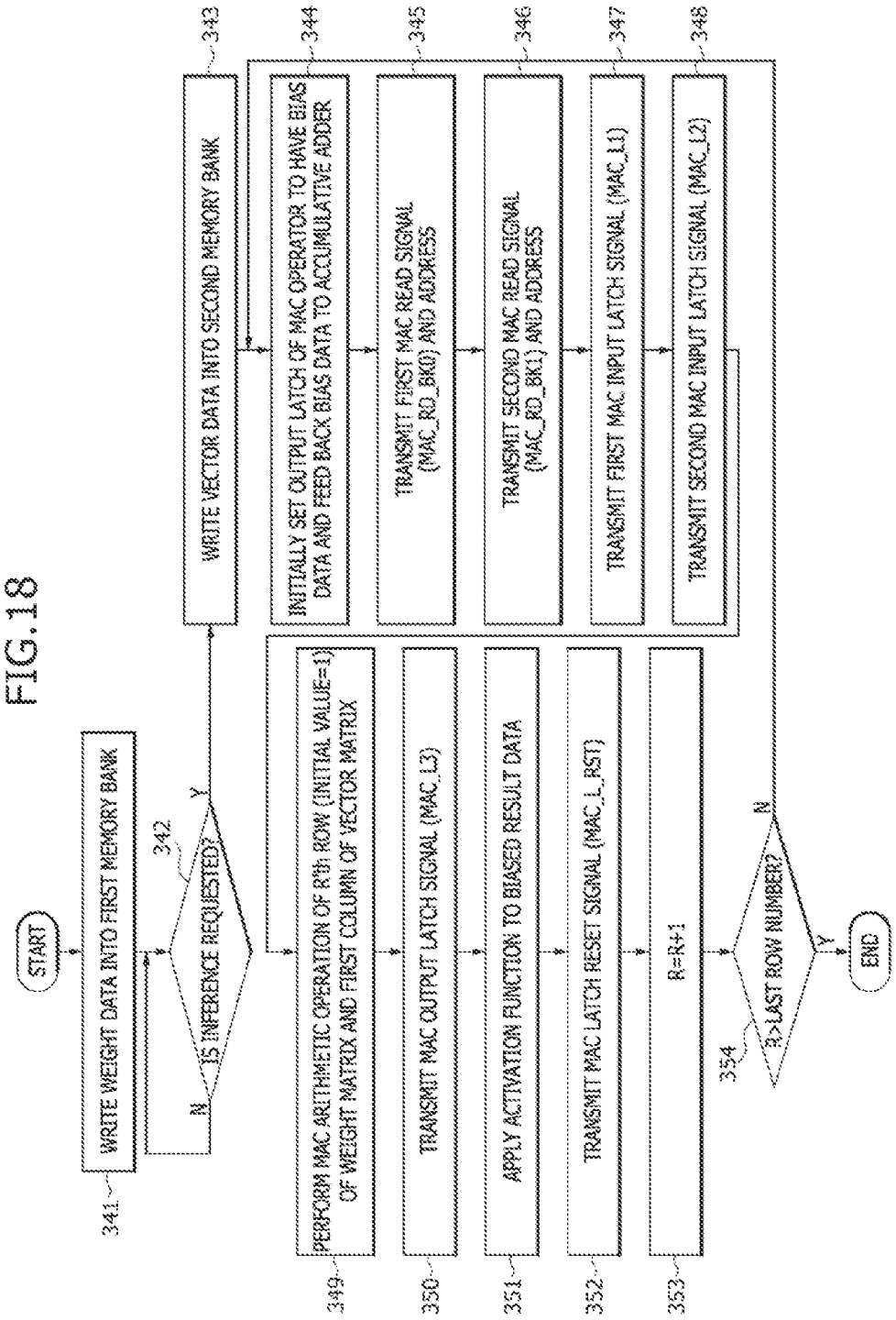
FIG. 18 is a flowchart illustrating processes of the MAC arithmetic operation illustrated in FIG. 17 in a PIM system according to a first embodiment of the present disclosure.
Figure 19:
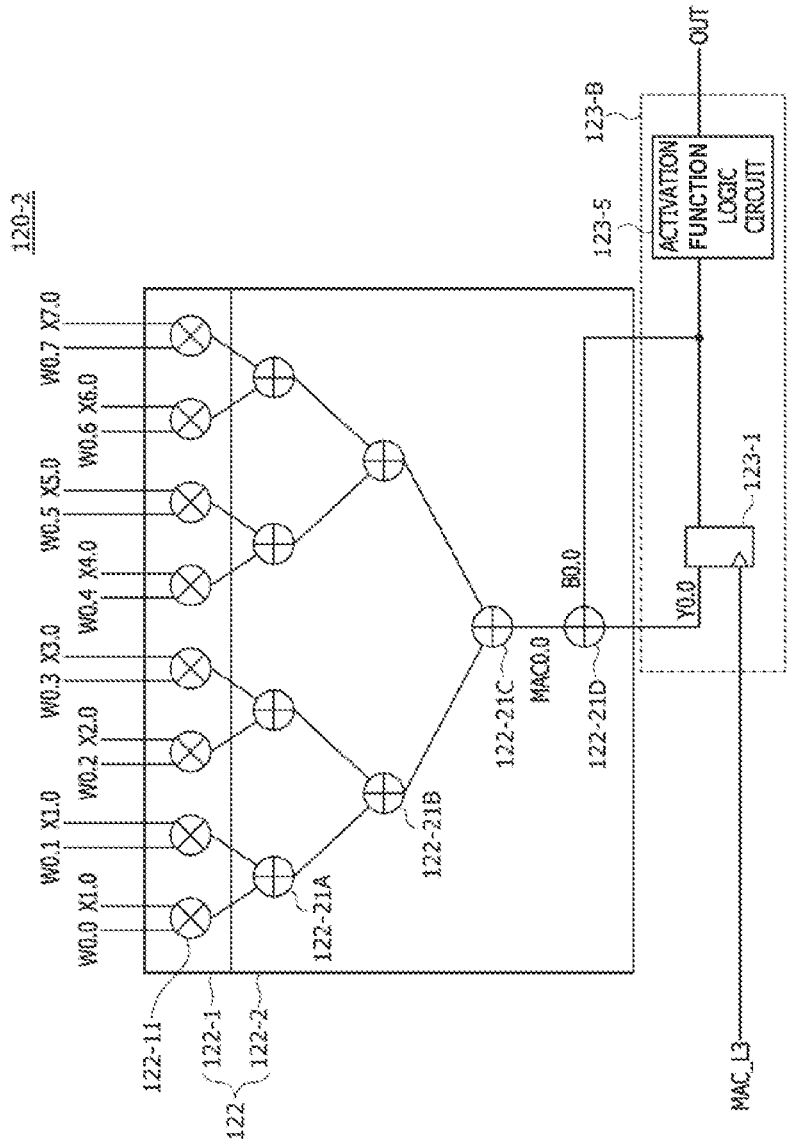
FIG. 19 illustrates an example of a configuration of a MAC operator for performing the MAC arithmetic operation of FIG. 17 in a PIM system according to a first embodiment of the present disclosure.

FIG. 18 is a flowchart illustrating processes of the MAC arithmetic operation described with reference to FIG. 17 in the PIM system 1-1 according to the first embodiment of the present disclosure. Moreover, FIG. 19 illustrates an example of a configuration of a MAC operator 120-2 for performing the MAC arithmetic operation of FIG. 17 in the PIM system 1-1 according to the first embodiment of the present disclosure. In FIG. 19, the same reference numerals or the same reference symbols as used in FIG. 4 denote the same elements, and the detailed descriptions of the same elements as mentioned in the previous embodiment will be omitted hereinafter. Referring to FIG. 18, the first data (i.e., the weight data) may be written into the first memory bank 111 at a step 341 to perform the MAC arithmetic operation in the PIM device 100. Thus, the weight data may be stored in the first memory bank 111 of the PIM device 100. In the present embodiment, it may be assumed that the weight data are the elements W0.0, . . . , and W7.7 constituting the weight matrix of FIG. 17.

At a step 342, whether an inference is requested may be determined. An inference request signal may be transmitted from an external device located outside of the PIM system 1-1 to the PIM controller 200 of the PIM system 1-1. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., the data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 17. If the inference request signal is transmitted to the PIM controller 200 at the step 342, then the PIM controller 200 may write the vector data transmitted with the inference request signal into the second memory bank 112 at a step 343. Accordingly, the vector data may be stored in the second memory bank 112 of the PIM device 100.

At a step 344, an output latch of a MAC operator may be initially set to have bias data and the initially set bias data may be fed back to an accumulative adder of the MAC operator. This process is executed to perform the matrix adding calculation of the MAC result matrix and the bias matrix, which is described with reference to FIG. 17. That is, as illustrated in FIG. 19, the output latch 123-1 of the MAC operator (120-2 of FIG. 19) may be initially set to have the bias data of the bias matrix. Because the matrix multiplying calculation is executed for the first row of the weight matrix, the element B0.0 located at first row and the first column of the bias matrix may be initially set as the bias data in the output latch 123-1. The output latch 123-1 may output the bias data B0.0, and the bias data B0.0 outputted from the output latch 123-1 may be inputted to the accumulative adder 122-21D of the MAC operator 120-2.

In an embodiment, in order to output the bias data B0.0 out of the output latch 123-1 and to feed back the bias data B0.0 to the accumulative adder 122-21D, the MAC command generator 240 of the PIM controller 200 may transmit the MAC output latch signal MAC_L3 to the MAC operator 120-2 of the PIM device 100. When a subsequent MAC arithmetic operation is performed, the accumulative adder 122-21D of the MAC operator 120-2 may add the MAC result data MAC0.0 outputted from the adder 122-21C disposed at the last stage to the bias data B0.0 which is fed back from the output latch 123-1 to generate the biased result data Y0.0 and may output the biased result data Y0.0 to the output latch 123-1. As illustrated in FIG. 19, the biased result data Y0.0 may be transmitted from the output latch 123-1 to an activation function logic circuit 123-5 disposed in a data output circuit 123-B of the MAC operator 120-2 in synchronization with the MAC output latch signal MAC_L3 transmitted in a subsequent process.

In a step 345, the MAC command generator 240 of the PIM controller 200 may generate and transmit the first MAC read signal MAC_RD_BK0 to the PIM device 100. In addition, the address generator 250 of the PIM controller 200 may generate and transmit the bank selection signal BS and the row/column address ADDR_R/ADDR_C to the PIM device 100. The step 345 may be executed in the same way as described with reference to FIG. 7. In a step 346, the MAC command generator 240 of the PIM controller 200 may generate and transmit the second MAC read signal MAC_RD_BK1 to the PIM device 100. In addition, the address generator 250 of the PIM controller 200 may generate and transmit the bank selection signal BS for selecting the second memory bank 112 and the row/column address ADDR_R/ADDR_C to the PIM device 100. The step 346 may be executed in the same way as described with reference to FIG. 8.

At a step 347, the MAC command generator 240 of the PIM controller 200 may generate and transmit the first MAC input latch signal MAC_L1 to the PIM device 100. The step 347 may be executed in the same way as described with reference to FIG. 9. The first MAC input latch signal MAC_L1 may control the input latch operation of the first data for the MAC operator 120 of the PIM device 100. The input latch operation of the first data may be performed in the same way as described with reference to FIG. 11. At a step 348, the MAC command generator 240 of the PIM controller 200 may generate and transmit the second MAC input latch signal MAC_L2 to the PIM device 100. The step 348 may be executed in the same way as described with reference to FIG. 10. The second MAC input latch signal MAC_L2 may control the input latch operation of the second data for the MAC operator 120 of the PIM device 100. The input latch operation of the second data may be performed in the same way as described with reference to FIG. 11.

At a step 349, the MAC circuit 122 of the MAC operator 120 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may include the four adders 122-21A disposed at the first stage, the two adders 122-21B disposed at the second stage, the adder 122-21C disposed at the third stage, and the accumulative adder 122-21D, as illustrated in FIG. 19. The accumulative adder 122-21D may add output data of the adder 122-21C to feedback data fed back from the output latch 123-1 to output the result of the adding calculation. The output data of the adder 122-21C may be the element MAC0.0 of the '8×1' MAC result matrix, which corresponds to the result of the matrix multiplying calculation of the first row of the weight matrix and the first column of the vector matrix. The accumulative adder 122-21D may add the output data MAC0.0 of the adder 122-21C to the bias data B0.0 fed back from the output latch 123-1 to output the result of the adding calculation. The output data Y0.0 of the accumulative adder 122-21D may be inputted to the output latch 123-1 disposed in the data output circuit 123-A of the MAC operator 120.

At a step 350, the MAC command generator 240 of the PIM controller 200 may generate and transmit the MAC output latch signal MAC_L3 to the PIM device 100. The step 350 may be executed in the same way as described with reference to FIG. 12. The MAC output latch signal MAC_L3 may control the output latch operation of the output latch 123-1 included in the MAC operator 120 of the PIM device 100. The biased result data Y0.0 transmitted from the MAC circuit 122 of the MAC operator 120 to the output latch 123-1 may be outputted from the output latch 123-1 in synchronization with the MAC output latch signal MAC_L3. The biased result data Y0.0 outputted from the output latch 123-1 may be inputted to the activation function logic circuit 123-5. At a step 351, the activation function logic circuit 123-5 may apply an activation function to the biased result data Y0.0 to generate a final output value, and the final output value may be inputted to the transfer gate (123-2 of FIG. 4). This, for example, is the final output value for the current of R which is incremented in step 354.

At a step 352, the MAC command generator 240 of the PIM controller 200 may generate and transmit the MAC latch reset signal MAC_L_RST to the PIM device 100. The step 352 may be executed in the same way as described with reference to FIG. 13. The MAC latch reset signal MAC_L_RST may control an output operation of the final output value generated by the MAC operator 120 and a reset operation of the output latch 123-1 included in the MAC operator 120. The transfer gate 123-2 receiving the final output value from the activation function logic circuit 123-5 of the data output circuit 123-B included in the MAC operator 120 may be synchronized with the MAC latch reset signal MAC_L_RST to output the final output value. In an embodiment, the final output value outputted from the MAC operator 120 may be stored into the first memory bank 111 or the second memory bank 112 through the first BIO line or the second BIO line in the PIM device 100.

At a step 353, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 353. At a step 354, whether the row number changed at the step 353 is greater than the row number of the last row (i.e., the eighth row) of the weight matrix may be determined. Because the row number of the weight matrix is changed to '2' at the step 353, a process of the MAC arithmetic operation may be fed back to the step 344.

If the process of the MAC arithmetic operation is fed back to the step 344 from the step 354, the same processes as described with reference to the steps 344 to 354 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix, and the bias data B0.0 in the output latch 123-1 initially set at the step 344 may be changed to the bias data B1.0. If the process of the MAC arithmetic operation is fed back to the step 344 from the step 354, the processes from the step 344 to the step 354 may be iteratively performed until the MAC arithmetic operation is performed for all of the rows of the weight matrix with the vector matrix. For an embodiment, a plurality of final output values, namely, one final output value for each incremented value of R, represents an 'N×1' final result matrix. If the MAC arithmetic operation for the eighth row of the weight matrix terminates and the row number of the weight matrix changes from '8' to '9' at the step 354, the MAC arithmetic operation may terminate because the row number of '9' is greater than the last row number of '8' at the step 354.

Figure 20:
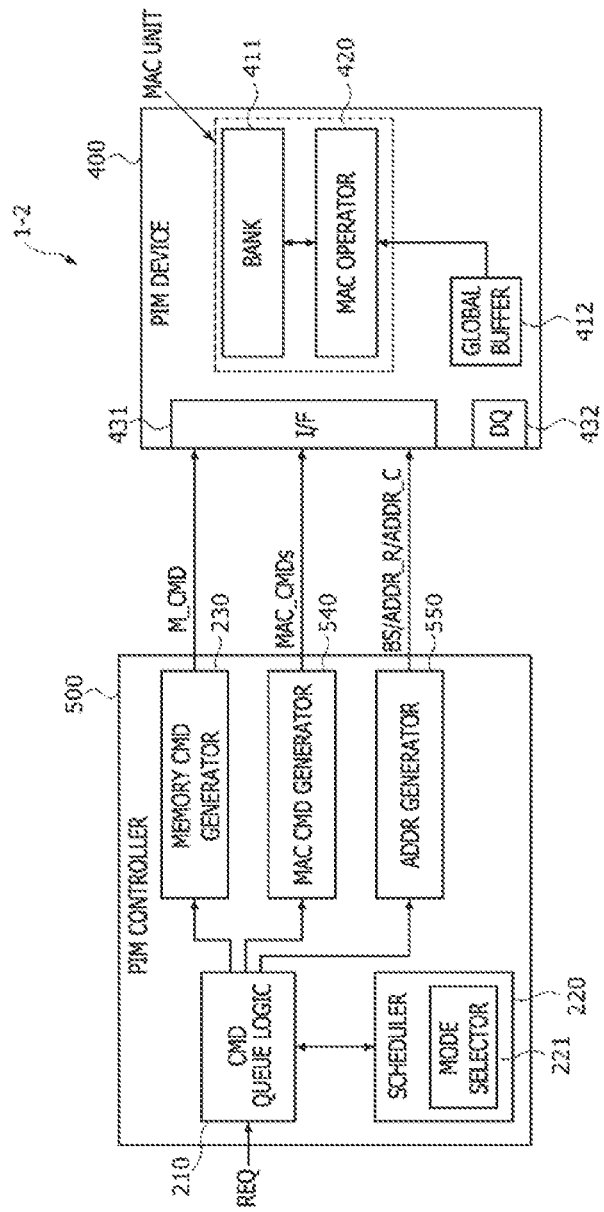
FIG. 20 is a block diagram illustrating a PIM system according to a second embodiment of the present disclosure.

FIG. 20 is a block diagram illustrating a PIM system 1-2 according to a second embodiment of the present disclosure. In FIG. 20, the same reference numerals or the same reference symbols as used in FIG. 2 denote the same elements. As illustrated in FIG. 20, the PIM system 1-2 may be configured to include a PIM device 400 and a PIM controller 500. The PIM device 400 may be configured to include a memory bank (BANK) 411 corresponding to a storage region, a global buffer 412, a MAC operator 420, an interface (I/F) 431, and a data input/output (I/O) pad 432. For an embodiment, the MAC operator 420 represents a MAC operator circuit. The memory bank (BANK) 411 and the MAC operator 420 included in the PIM device 400 may constitute one MAC unit. In another embodiment, the PIM device 400 may include a plurality of MAC units. The memory bank (BANK) 411 may represent a memory region for storing data, for example, a DRAM device. The global buffer 412 may also represent a memory region for storing data, for example, a DRAM device or an SRAM device. The memory bank (BANK) 411 may be a component unit which is independently activated and may be configured to have the same data bus width as data I/O lines in the PIM device 400. In an embodiment, the memory bank 411 may operate through interleaving such that an active operation of the memory bank 411 is performed in parallel while another memory bank is selected. The memory bank 411 may include at least one cell array which includes memory unit cells located at cross points of a plurality of rows and a plurality of columns.

Although not shown in the drawings, a core circuit may be disposed adjacent to the memory bank 411. The core circuit may include X-decoders XDECs and Y-decoders/IO circuits YDEC/IOs. An X-decoder XDEC may also be referred to as a word line decoder or a row decoder. The X-decoder XDEC may receive a row address ADDR_R from the PIM controller 500 and may decode the row address ADDR_R to select and enable one of the rows (i.e., word lines) coupled to the selected memory bank. Each of the Y-decoders/IO circuits YDEC/IOs may include a Y-decoder YDEC and an I/O circuit IO. The Y-decoder YDEC may also be referred to as a bit line decoder or a column decoder. The Y-decoder YDEC may receive a column address ADD_C from the PIM controller 500 and may decode the column address ADD_C to select and enable at least one of the columns (i.e., bit lines) coupled to the selected memory bank. Each of the I/O circuits may include an I/O sense amplifier for sensing and amplifying a level of a read datum outputted from the corresponding memory bank during a read operation for the memory bank 411. In addition, the I/O circuit may include a write driver for driving a write datum during a write operation for the memory bank 411.

The MAC operator 420 of the PIM device 400 may have mostly the same configuration as the MAC operator 120 described with reference to FIG. 4. That is, the MAC operator 420 may be configured to include the data input circuit 121, the MAC circuit 122, and the data output circuit 123, as described with reference to FIG. 4. The data input circuit 121 may be configured to include the first input latch 121-1 and the second input latch 121-2. The MAC circuit 122 may be configured to include the multiplication logic circuit 122-1 and the addition logic circuit 122-2. The data output circuit 123 may be configured to include the output latch 123-1, the transfer gate 123-2, the delay circuit 123-3, and the inverter 123-4. In an embodiment, the first input latch 121-1, the second input latch 121-2, and the output latch 123-1 may be realized using flip-flops.

The MAC operator 420 may be different from the MAC operator 120 in that a MAC input latch signal MAC_L1 is simultaneously inputted to both of clock terminals of the first and second input latches 121-1 and 121-2. As indicated in the following descriptions, the weight data and the vector data may be simultaneously transmitted to the MAC operator 420 of the PIM device 400 included in the PIM system 1-2 according to the present embodiment. That is, the first data DA1 (i.e., the weight data) and the second data DA2 (i.e., the vector data) may be simultaneously inputted to both of the first input latch 121-1 and the second input latch 121-2 constituting the data input circuit 121, respectively. Accordingly, it may be unnecessary to apply an extra control signal to the clock terminals of the first and second input latches 121-1 and 121-2, and thus the MAC input latch signal MAC_L1 may be simultaneously inputted to both of the clock terminals of the first and second input latches 121-1 and 121-2 included in the MAC operator 420.

In another embodiment, the MAC operator 420 may be realized to have the same configuration as the MAC operator 120-1 described with reference to FIG. 16 to perform the operation illustrated in FIG. 14. Even in such a case, the MAC operator 420 may have the same configuration as described with reference to FIG. 16 except that the MAC input latch signal MAC_L1 is simultaneously inputted to both of the clock terminals of the first and second input latches 121-1 and 121-2 constituting the data input circuit 121. In yet another embodiment, the MAC operator 420 may be realized to have the same configuration as the MAC operator 120-2 described with reference to FIG. 19 to perform the operation illustrated in FIG. 17. Even in such a case, the MAC operator 420 may have the same configuration as described with reference to FIG. 19 except that the MAC input latch signal MAC_L1 is simultaneously inputted to both of the clock terminals of the first and second input latches 121-1 and 121-2 constituting the data input circuit 121.

The interface 431 of the PIM device 400 may receive the memory command M_CMD, the MAC commands MAC_CMDs, the bank selection signal BS, and the row/column addresses ADDR_R/ADDR_C from the PIM controller 500. The interface 431 may output the memory command M_CMD, together with the bank selection signal BS and the row/column addresses ADDR_R/ADDR_C, to the memory bank 411. The interface 431 may output the MAC commands MAC_CMDs to the memory bank 411 and the MAC operator 420. In such a case, the interface 431 may output the bank selection signal BS and the row/column addresses ADDR_R/ADDR_C to the memory bank 411. The data I/O pad 432 of the PIM device 400 may function as a data communication terminal between a device external to the PIM device 400, the global buffer 412, and the MAC unit (which includes the memory bank 411 and the MAC operator 420) included in the PIM device 400. The external device to the PIM device 400 may correspond to the PIM controller 500 of the PIM system 1-2 or a host located outside the PIM system 1-2. Accordingly, data outputted from the host or the PIM controller 500 may be inputted into the PIM device 400 through the data I/O pad 432. In addition, data generated by the PIM device 400 may be transmitted to the external device to the PIM device 400 through the data I/O pad 432.

The PIM controller 500 may control operations of the PIM device 400. In an embodiment, the PIM controller 500 may control the PIM device 400 such that the PIM device 400 operates in the memory mode or the MAC mode. In the event that the PIM controller 500 controls the PIM device 500 such that the PIM device 400 operates in the memory mode, the PIM device 400 may perform a data read operation or a data write operation for the memory bank 411. In the event that the PIM controller 500 controls the PIM device 400 such that the PIM device 400 operates in the MAC mode, the PIM device 400 may perform the MAC arithmetic operation for the MAC operator 420. In the event that the PIM controller 500 controls the PIM device 400 such that the PIM device 400 operates in the MAC mode, the PIM device 400 may also perform the data read operation and the data write operation for the memory bank 411 and the global buffer 412 to execute the MAC arithmetic operation.

The PIM controller 500 may be configured to include the command queue logic 210, the scheduler 220, the memory command generator 230, a MAC command generator 540, and an address generator 550. The scheduler 220 may include the mode selector 221. The command queue logic 210 may receive the request REQ from an external device (e.g., a host of the PIM system 1-2) and store a command queue corresponding the request REQ in the command queue logic 210. The command queue stored in the command queue logic 210 may be transmitted to the memory command generator 230 or the MAC command generator 540 according to a sequence determined by the scheduler 220. The scheduler 220 may adjust a timing of the command queue when the command queue stored in the command queue logic 210 is outputted from the command queue logic 210. The scheduler 210 may include the mode selector 221 that generates a mode selection signal including information on whether command queue stored in the command queue logic 210 relates to the memory mode or the MAC mode. The memory command generator 230 may receive the command queue related to the memory mode of the PIM device 400 from the command queue logic 210 to generate and output the memory command M_CMD. The command queue logic 210, the scheduler 220, the mode selector 221, and the memory command generator 230 may have the same function as described with reference to FIG. 2.

The MAC command generator 540 may receive the command queue related to the MAC mode of the PIM device 400 from the command queue logic 210. The MAC command generator 540 may decode the command queue to generate and output the MAC commands MAC_CMDs. The MAC commands MAC_CMDs outputted from the MAC command generator 540 may be transmitted to the PIM device 400. The data read operation for the memory bank 411 of the PIM device 400 may be performed by the MAC commands MAC_CMDs outputted from the MAC command generator 540, and the MAC arithmetic operation of the MAC operator 420 may also be performed by the MAC commands MAC_CMDs outputted from the MAC command generator 540. The MAC commands MAC_CMDs and the MAC arithmetic operation of the PIM device 400 according to the MAC commands MAC_CMDs will be described in detail with reference to FIG. 21.

The address generator 550 may receive address information from the command queue logic 210. The address generator 550 may generate the bank selection signal BS for selecting a memory bank where, for example, the memory bank 411 represents multiple memory banks. The address generator 550 may transmit the bank selection signal BS to the PIM device 400. In addition, the address generator 550 may generate the row address ADDR_R and the column address ADDR_C for accessing a region (e.g., memory cells) in the memory bank 411 and may transmit the row address ADDR_R and the column address ADDR_C to the PIM device 400.

Figure 21:
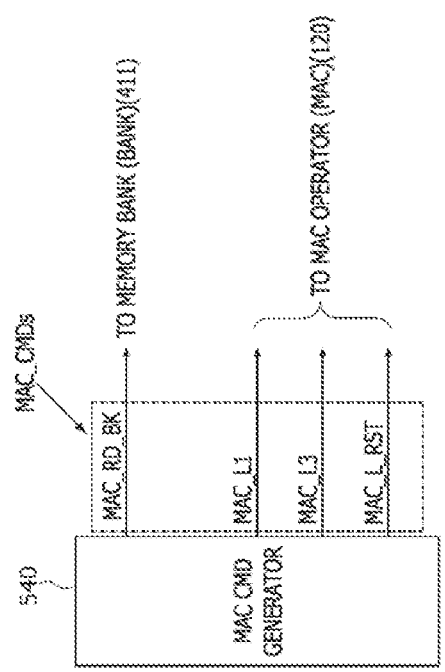
FIG. 21 illustrates MAC commands outputted from a MAC command generator of a PIM controller included in a PIM system according to a second embodiment of the present disclosure.

FIG. 21 illustrates the MAC commands MAC_CMDs outputted from the MAC command generator 540 included in the PIM system 1-2 according to the second embodiment of the present disclosure. As illustrated in FIG. 21, the MAC commands MAC_CMDs may include first to fourth MAC command signals. In an embodiment, the first MAC command signal may be a MAC read signal MAC_RD_BK, the second MAC command signal may be a MAC input latch signal MAC_L1, the third MAC command signal may be a MAC output latch signal MAC_L3, and the fourth MAC command signal may be a MAC latch reset signal MAC_L_RST.

The MAC read signal MAC_RD_BK may control an operation for reading the first data (e.g., the weight data) out of the memory bank 411 to transmit the first data to the MAC operator 420. The MAC input latch signal MAC_L1 may control an input latch operation of the weight data transmitted from the first memory bank 411 to the MAC operator 420. The MAC output latch signal MAC_L3 may control an output latch operation of the MAC result data generated by the MAC operator 420. And, the MAC latch reset signal MAC_L_RST may control an output operation of the MAC result data generated by the MAC operator 420 and a reset operation of an output latch included in the MAC operator 420.

The PIM system 1-2 according to the present embodiment may also be configured to perform the deterministic MAC arithmetic operation. Thus, the MAC commands MAC_CMDs transmitted from the PIM controller 500 to the PIM device 400 may be sequentially generated with fixed time intervals. Accordingly, the PIM controller 500 does not require any extra end signals of various operations executed for the MAC arithmetic operation to generate the MAC commands MAC_CMDs for controlling the MAC arithmetic operation. In an embodiment, latencies of the various operations executed by MAC commands MAC_CMDs for controlling the MAC arithmetic operation may be set to have fixed values in order to perform the deterministic MAC arithmetic operation. In such a case, the MAC commands MAC_CMDs may be sequentially outputted from the PIM controller 500 with fixed time intervals corresponding to the fixed latencies.

Figure 22:
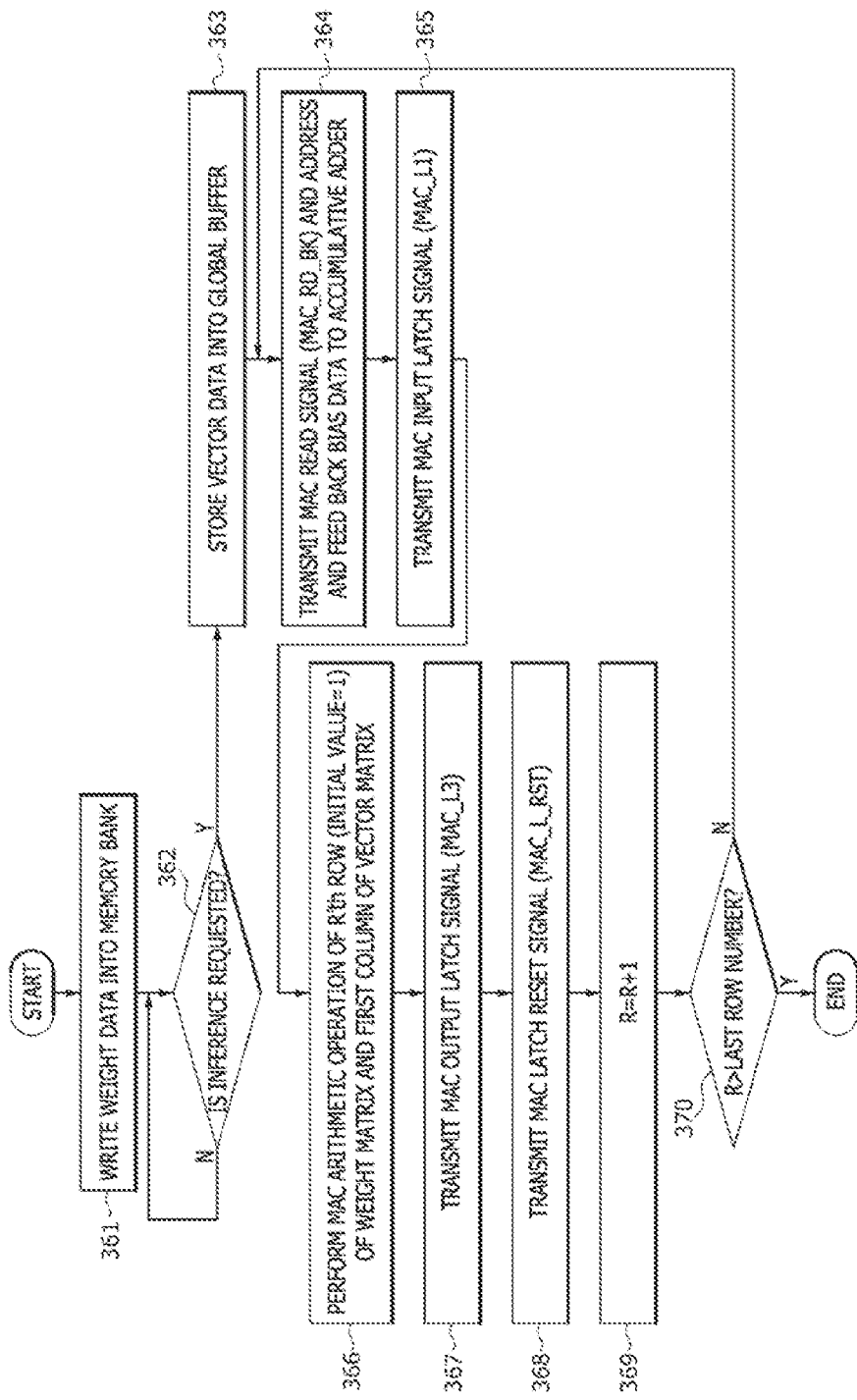
FIG. 22 is a flowchart illustrating processes of the MAC arithmetic operation illustrated in FIG. 5 in a PIM system according to a second embodiment of the present disclosure.

FIG. 22 is a flowchart illustrating processes of the MAC arithmetic operation described with reference to FIG. 5, which are performed in the PIM system 1-2 according to the second embodiment of the present disclosure. In addition, FIGS. 23 to 26 are block diagrams illustrating the processes of the MAC arithmetic operation illustrated in FIG. 5, which are performed in the PIM system 1-2 according to the second embodiment of the present disclosure. Referring to FIGS. 22 to 26, the first data (i.e., the weight data) may be written into the memory bank 411 at a step 361 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 5.

At a step 362, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 5. If the inference request signal is transmitted to the PIM controller 500 at the step 362, then the PIM controller 500 may write the vector data transmitted with the inference request signal into the global buffer 412 at a step 363. Accordingly, the vector data may be stored in the global buffer 412 of the PIM device 400.

Figure 23:
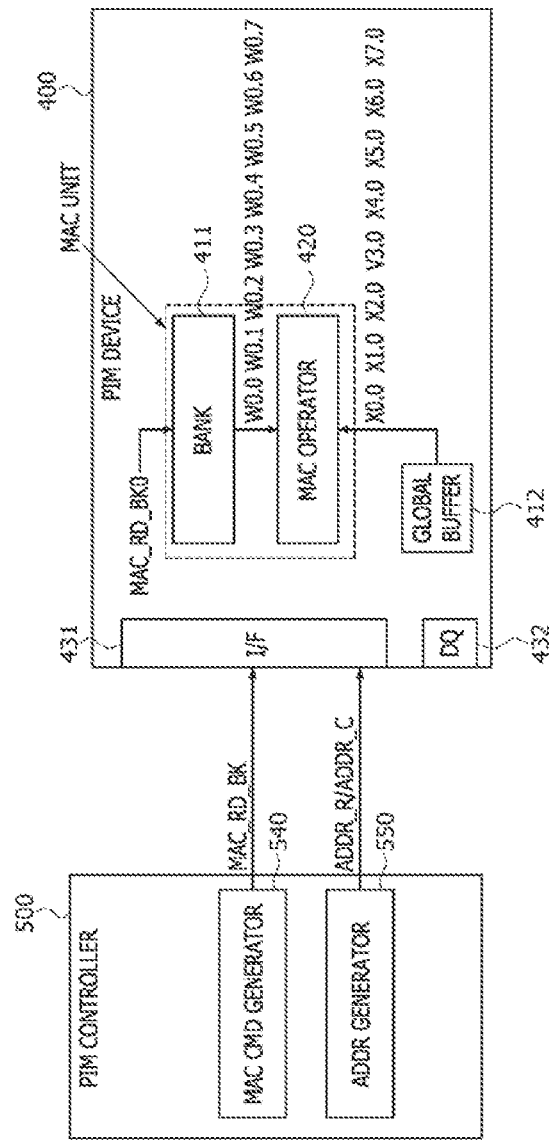
FIGS. 23 to 26 are block diagrams illustrating processes of the MAC arithmetic operation illustrated in FIG. 5 in a PIM system according to a second embodiment of the present disclosure.

At a step 364, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. Although not shown in the drawings, if a plurality of memory banks are disposed in the PIM device 400, the address generator 550 may transmit a bank selection signal for selecting the memory bank 411 among the plurality of memory banks as well as the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK outputted from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

Figure 24:
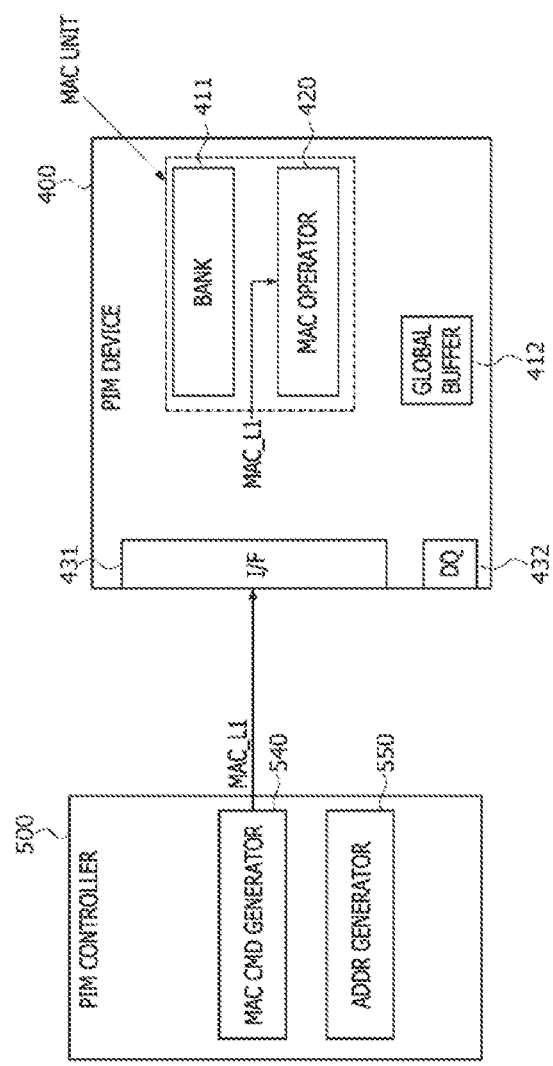

At a step 365, the MAC command generator 540 of the PIM controller 500 may generate and transmit the MAC input latch signal MAC_L1 to the PIM device 400, as illustrated in FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 366, the MAC circuit 122 of the MAC operator 420 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, as described with reference to FIG. 4, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data from the multipliers 122-11 and may perform the adding calculation of the output data of the multipliers 122-11 to output the result data of the adding calculation. The output data of the addition logic circuit 122-2 may correspond to result data (i.e., MAC result data) of the MAC arithmetic operation of the first row included in the weight matrix and the column included in the vector matrix. Thus, the output data of the addition logic circuit 122-2 may correspond to the element MAC0.0 located at the first row of the '8×1' MAC result matrix having the eight elements of MAC0.0, . . . , and MAC7.0 illustrated in FIG. 5. The output data MAC0.0 of the addition logic circuit 122-2 may be inputted to the output latch 123-1 disposed in the data output circuit 123 of the MAC operator 420, as described with reference to FIG. 4.

Figure 25:
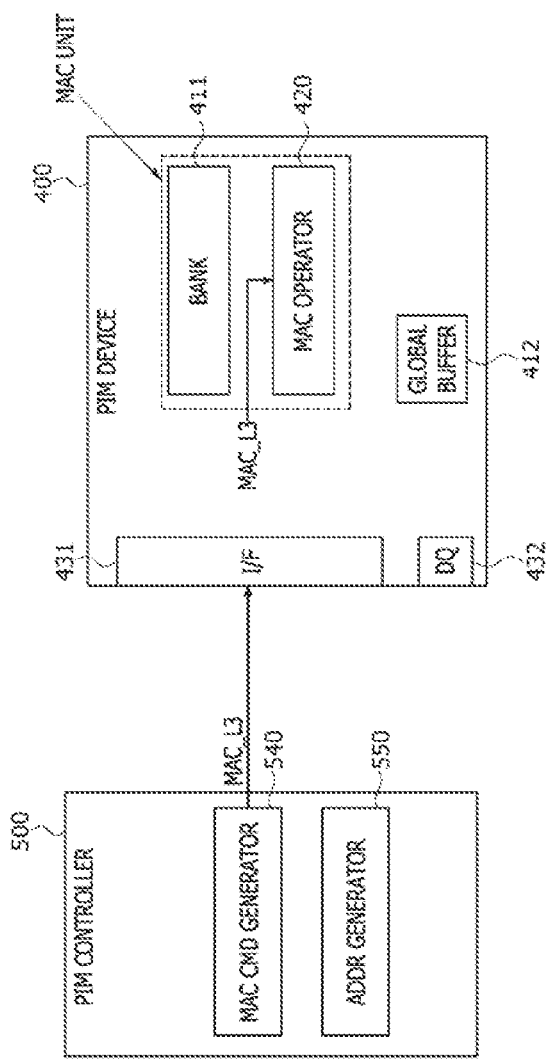

At a step 367, the MAC command generator 540 of the PIM controller 500 may generate and transmit the MAC output latch signal MAC_L3 to the PIM device 400, as illustrated in FIG. 25. The MAC output latch signal MAC_L3 may control the output latch operation of the MAC result data MAC0.0 performed by the MAC operator 420 of the PIM device 400. The MAC result data MAC0.0 transmitted from the MAC circuit 122 of the MAC operator 420 to the output latch 123-1 may be outputted from the output latch 123-1 by the output latch operation performed in synchronization with the MAC output latch signal MAC_L3, as described with reference to FIG. 4. The MAC result data MAC0.0 outputted from the output latch 123-1 may be inputted to the transfer gate 123-2 of the data output circuit 123.

Figure 26:
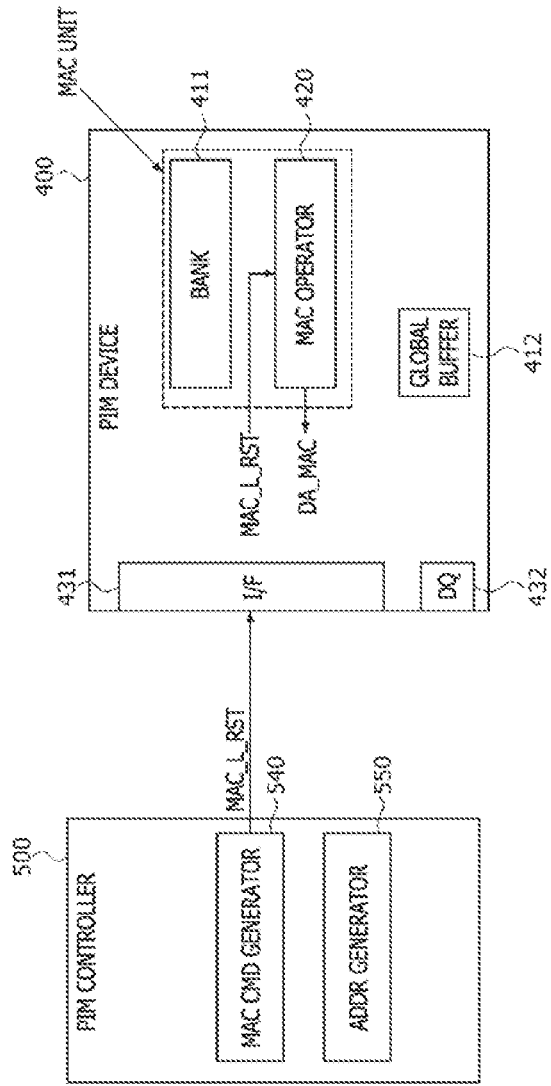

At a step 368, the MAC command generator 540 of the PIM controller 500 may generate and transmit the MAC latch reset signal MAC_L_RST to the PIM device 400, as illustrated in FIG. 26. The MAC latch reset signal MAC_L_RST may control an output operation of the MAC result data MAC0.0 generated by the MAC operator 420 and a reset operation of the output latch 123-1 included in the MAC operator 420. As described with reference to FIG. 4, the transfer gate 123-2 receiving the MAC result data MAC0.0 from the output latch 123-1 of the MAC operator 420 may be synchronized with the MAC latch reset signal MAC_L_RST to output the MAC result data MAC0.0. In an embodiment, the MAC result data MAC0.0 outputted from the MAC operator 420 may be stored into the memory bank 411 through the BIO line in the PIM device 400.

At a step 369, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 369. At a step 370, whether the row number changed at the step 369 is greater than the row number of the last row (i.e., the eighth row) of the weight matrix may be determined. Because the row number of the weight matrix is changed to '2' at the step 370, a process of the MAC arithmetic operation may be fed back to the step 364.

If the process of the MAC arithmetic operation is fed back to the step 364 from the step 370, the same processes as described with reference to the steps 364 to 370 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 364 from the step 370, the processes from the step 364 to the step 370 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 369, the MAC arithmetic operation may terminate because the row number of '9' is greater than the last row number of '8' at the step 370.

Figure 27:
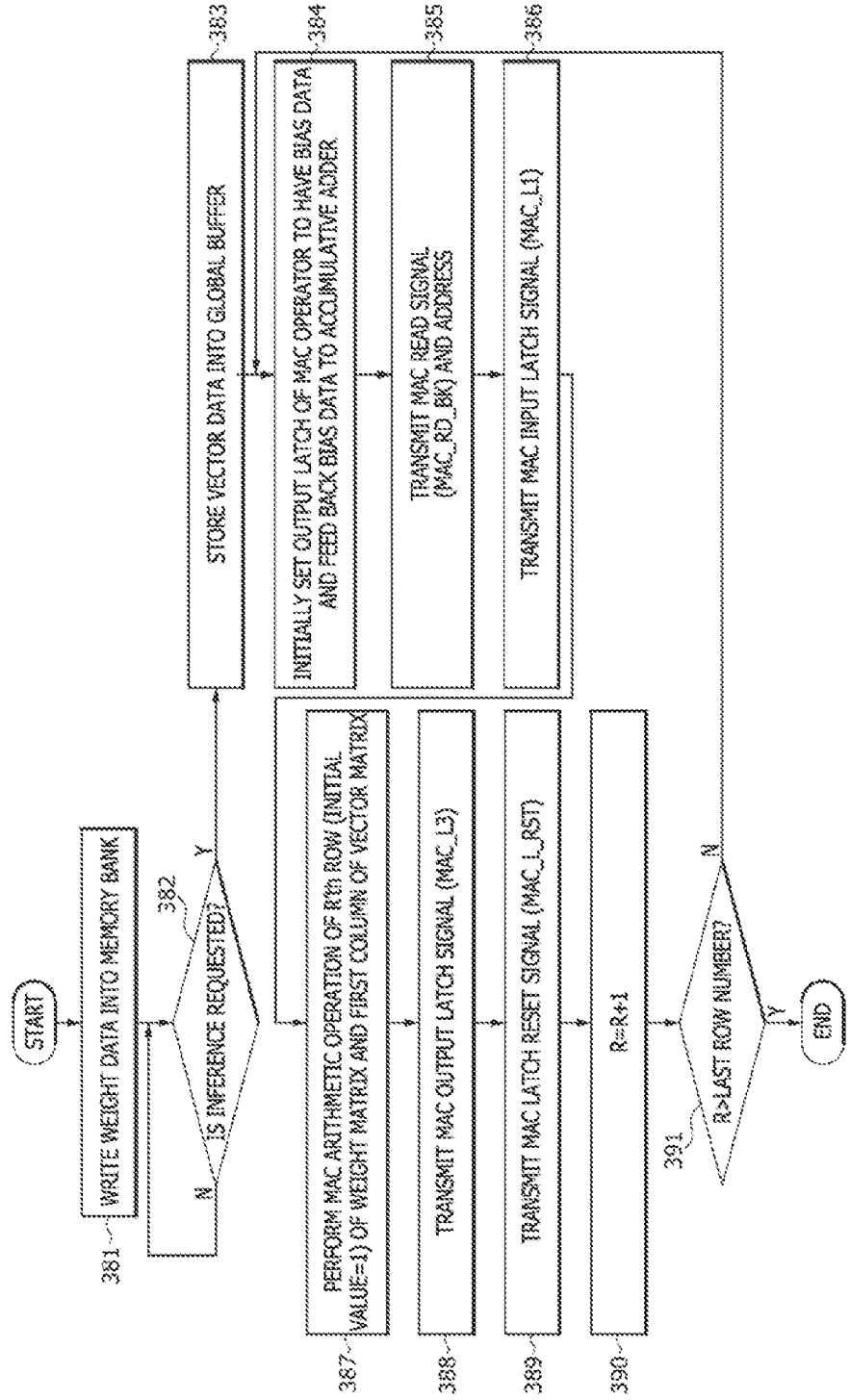
FIG. 27 is a flowchart illustrating processes of the MAC arithmetic operation illustrated in FIG. 14 in a PIM system according to a second embodiment of the present disclosure.

FIG. 27 is a flowchart illustrating processes of the MAC arithmetic operation described with reference to FIG. 14, which are performed in the PIM system 1-2 according to the second embodiment of the present disclosure. In order to perform the MAC arithmetic operation according to the present embodiment, the MAC operator 420 of the PIM device 400 may have the same configuration as the MAC operator 120-1 illustrated in FIG. 16. Referring to FIGS. 20 and 27, the first data (i.e., the weight data) may be written into the memory bank 411 at a step 381 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 14.

At a step 382, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 14. If the inference request signal is transmitted to the PIM controller 500 at the step 382, then the PIM controller 500 may write the vector data transmitted with the inference request signal into the global buffer 412 at a step 383. Accordingly, the vector data may be stored in the global buffer 412 of the PIM device 400.

At a step 384, an output latch of a MAC operator 420 may be initially set to have bias data and the initially set bias data may be fed back to an accumulative adder of the MAC operator 420. This process is executed to perform the matrix adding calculation of the MAC result matrix and the bias matrix, which is described with reference to FIG. 14. That is, as illustrated in FIG. 16, the output latch 123-1 of the data output circuit 123-A included in the MAC operator 420 may be initially set to have the bias data of the bias matrix. Because the matrix multiplying calculation is executed for the first row of the weight matrix, the element B0.0 located at first row of the bias matrix may be initially set as the bias data in the output latch 123-1. The output latch 123-1 may output the bias data B0.0, and the bias data B0.0 outputted from the output latch 123-1 may be inputted to the accumulative adder 122-21D of the addition logic circuit 122-2 included in the MAC operator 420.

In an embodiment, in order to output the bias data B0.0 out of the output latch 123-1 and to feed back the bias data B0.0 to the accumulative adder 122-21D, the MAC command generator 540 of the PIM controller 500 may transmit the MAC output latch signal MAC_L3 to the MAC operator 420 of the PIM device 400. When a subsequent MAC arithmetic operation is performed, the accumulative adder 122-21D of the MAC operator 420 may add the MAC result data MAC0.0 outputted from the adder 122-21C disposed at the last stage to the bias data B0.0 which is fed back from the output latch 123-1 to generate the biased result data Y0.0 and may output the biased result data Y0.0 to the output latch 123-1. The biased result data Y0.0 may be outputted from the output latch 123-1 in synchronization with the MAC output latch signal MAC_L3 transmitted in a subsequent process.

At a step 385, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK outputted from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

At a step 386, the MAC command generator 540 of the PIM controller 500 may generate and transmit the MAC input latch signal MAC_L1 to the PIM device 400, as illustrated in FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 387, the MAC circuit 122 of the MAC operator 420 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data of the multipliers 122-11 and may perform the adding calculation of the output data of the multipliers 122-11 to output the result data of the adding calculation to the accumulative adder 122-21D. The output data of the adder 122-21C included in the addition logic circuit 122-2 may correspond to result data (i.e., MAC result data) of the MAC arithmetic operation of the first row included in the weight matrix and the column included in the vector matrix. The accumulative adder 122-21D may add the output data MAC0.0 of the adder 122-21C to the bias data B0.0 fed back from the output latch 123-1 and may output the result data of the adding calculation. The output data (i.e., the biased result data Y0.0) of the accumulative adder 122-21D may be inputted to the output latch 123-1 disposed in the data output circuit 123-A of the MAC operator 420.

At a step 388, the MAC command generator 540 of the PIM controller 500 may generate and transmit the MAC output latch signal MAC_L3 to the PIM device 400, as described with reference to FIG. 25. The MAC output latch signal MAC_L3 may control the output latch operation for the output latch 123-1 of the MAC operator 420 included in the PIM device 400. The output latch 123-1 of the MAC operator 420 may output the biased result data Y0.0 according to the output latch operation performed in synchronization with the MAC output latch signal MAC_L3. The biased result data Y0.0 outputted from the output latch 123-1 may be inputted to the transfer gate 123-2 of the data output circuit 123-A.

At a step 389, the MAC command generator 540 of the PIM controller 500 may generate and transmit the MAC latch reset signal MAC_L_RST to the PIM device 400, as illustrated in FIG. 26. The MAC latch reset signal MAC_L_RST may control an output operation of the biased result data Y0.0 generated by the MAC operator 420 and a reset operation of the output latch 123-1 included in the MAC operator 420. The transfer gate 123-2 receiving the biased result data Y0.0 from the output latch 123-1 of the MAC operator 420 may be synchronized with the MAC latch reset signal MAC_L_RST to output the biased result data Y0.0. In an embodiment, the biased result data Y0.0 outputted from the MAC operator 120 may be stored into the memory bank 411 through the BIO line in the PIM device 400.

At a step 390, the row number 'R' of the weight matrix for which the MAC arithmetic operation is performed may be increased by '1'. Because the MAC arithmetic operation for the first row among the first to eight rows of the weight matrix has been performed at the previous steps, the row number of the weight matrix may change from '1' to '2' at the step 390. At a step 391, whether the row number changed at the step 390 is greater than the row number of the last row (i.e., the eighth row) of the weight matrix may be determined. Because the row number of the weight matrix is changed to '2' at the step 390, a process of the MAC arithmetic operation may be fed back to the step 384.

If the process of the MAC arithmetic operation is fed back to the step 384 at the step 391, the same processes as described with reference to the steps 384 to 391 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 384 at the step 391, then the processes from the step 384 to the step 390 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 390, then the MAC arithmetic operation may terminate because the row number of '9' is greater than the last row number of '8' at the step 391.

Figure 28:
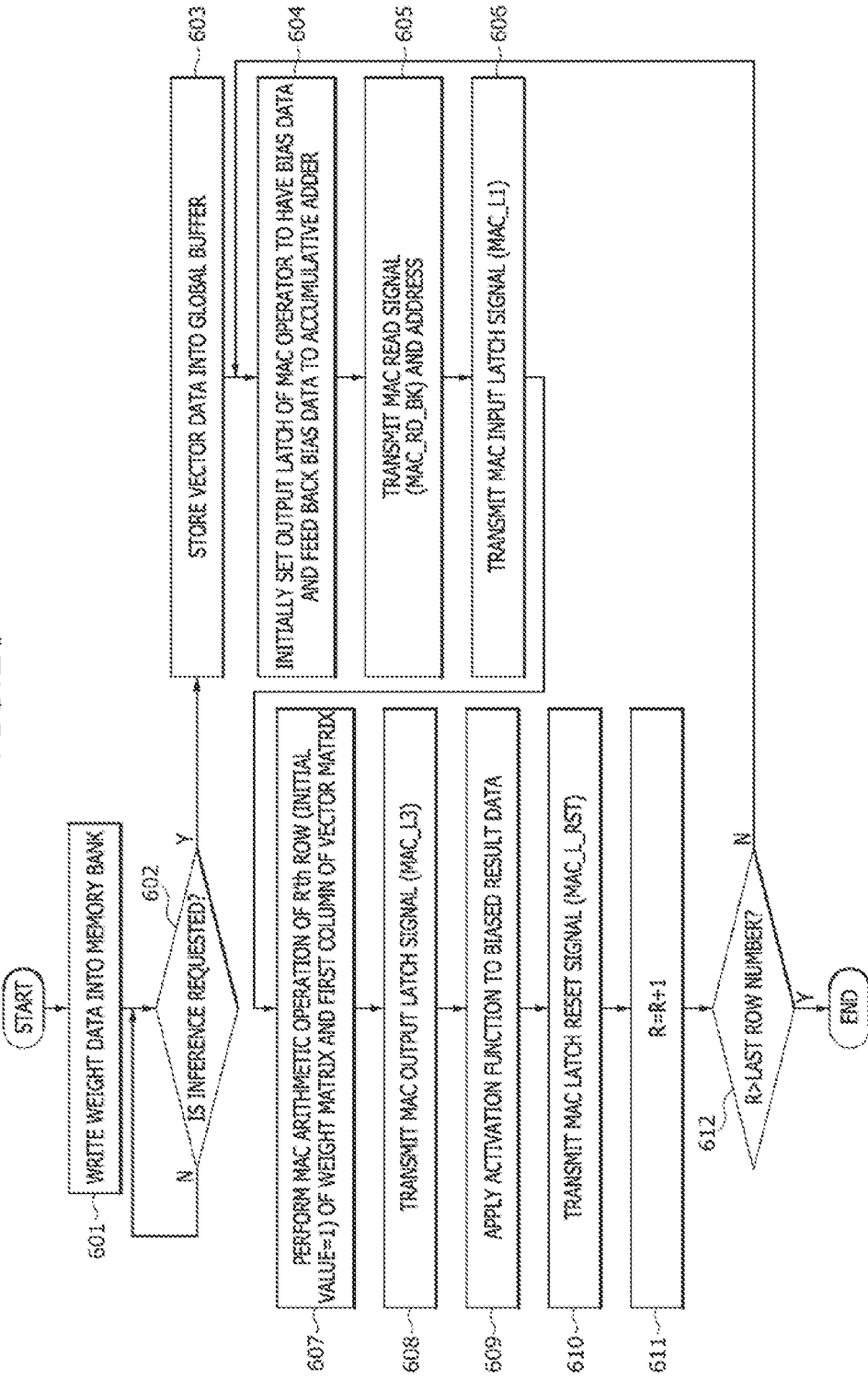
FIG. 28 is a flowchart illustrating processes of the MAC arithmetic operation illustrated in FIG. 17 in a PIM system according to a second embodiment of the present disclosure.

FIG. 28 is a flowchart illustrating processes of the MAC arithmetic operation described with reference to FIG. 17, which are performed in the PIM system 1-2 according to the second embodiment of the present disclosure. In order to perform the MAC arithmetic operation according to the present embodiment, the MAC operator 420 of the PIM device 400 may have the same configuration as the MAC operator 120-2 illustrated in FIG. 19. Referring to FIGS. 19 and 28, the first data (i.e., the weight data) may be written into the memory bank 411 at a step 601 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 17.

At a step 602, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 17. If the inference request signal is transmitted to the PIM controller 500 at the step 602, then the PIM controller 500 may write the vector data transmitted with the inference request signal into the global buffer 412 at a step 603. Accordingly, the vector data may be stored in the global buffer 412 of the PIM device 400.

At a step 604, an output latch of a MAC operator 420 may be initially set to have bias data and the initially set bias data may be fed back to an accumulative adder of the MAC operator 420. This process is executed to perform the matrix adding calculation of the MAC result matrix and the bias matrix, which is described with reference to FIG. 17. That is, as described with reference to FIG. 19, the output latch 123-1 of the data output circuit 123-B included in the MAC operator 420 may be initially set to have the bias data of the bias matrix. Because the matrix multiplying calculation is executed for the first row of the weight matrix, the element B0.0 located at first row of the bias matrix may be initially set as the bias data in the output latch 123-1. The output latch 123-1 may output the bias data B0.0, and the bias data B0.0 outputted from the output latch 123-1 may be inputted to the accumulative adder 122-21D of the addition logic circuit 122-2 included in the MAC operator 420.

In an embodiment, in order to output the bias data B0.0 out of the output latch 123-1 and to feed back the bias data B0.0 to the accumulative adder 122-21D, the MAC command generator 540 of the PIM controller 500 may transmit the MAC output latch signal MAC_L3 to the MAC operator 420 of the PIM device 400. When a subsequent MAC arithmetic operation is performed, the accumulative adder 122-21D of the MAC operator 420 may add the MAC result data MAC0.0 outputted from the adder 122-21C disposed at the last stage of the addition logic circuit 122-2 to the bias data B0.0 which is fed back from the output latch 123-1 to generate the biased result data Y0.0 and may output the biased result data Y0.0 to the output latch 123-1. The biased result data Y0.0 may be outputted from the output latch 123-1 in synchronization with the MAC output latch signal MAC_L3 transmitted in a subsequent process.

At a step 605, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK outputted from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

At a step 606, the MAC command generator 540 of the PIM controller 500 may generate and transmit the MAC input latch signal MAC_L1 to the PIM device 400, as described with reference to FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 607, the MAC circuit 122 of the MAC operator 420 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data of the multipliers 122-11 and may perform the adding calculation of the output data of the multipliers 122-11 to output the result data of the adding calculation to the accumulative adder 122-21D. The output data of the adder 122-21C included in the addition logic circuit 122-2 may correspond to result data (i.e., the MAC result data MAC0.0) of the MAC arithmetic operation of the first row included in the weight matrix and the column included in the vector matrix. The accumulative adder 122-21D may add the output data MAC0.0 of the adder 122-21C to the bias data B0.0 fed back from the output latch 123-1 and may output the result data of the adding calculation. The output data (i.e., the biased result data Y0.0) of the accumulative adder 122-21D may be inputted to the output latch 123-1 disposed in the data output circuit 123-A of the MAC operator 420.

At a step 608, the MAC command generator 540 of the PIM controller 500 may generate and transmit the MAC output latch signal MAC_L3 to the PIM device 400, as described with reference to FIG. 25. The MAC output latch signal MAC_L3 may control the output latch operation for the output latch 123-1 of the MAC operator 420 included in the PIM device 400. The output latch 123-1 of the MAC operator 420 may output the biased result data Y0.0 according to the output latch operation performed in synchronization with the MAC output latch signal MAC_L3. The biased result data Y0.0 outputted from the output latch 123-1 may be inputted to the activation function logic circuit 123-5, which is illustrated in FIG. 19. At a step 610, the activation function logic circuit 123-5 may apply an activation function to the biased result data Y0.0 to generate a final output value, and the final output value may be inputted to the transfer gate (123-2 of FIG. 4).

At a step 610, the MAC command generator 540 of the PIM controller 500 may generate and transmit the MAC latch reset signal MAC_L_RST to the PIM device 400, as described with reference to FIG. 26. The MAC latch reset signal MAC_L_RST may control an output operation of the final output value generated by the MAC operator 420 and a reset operation of the output latch 123-1 included in the MAC operator 420. The transfer gate 123-2 receiving the final output value from the activation function logic circuit 123-5 of the data output circuit 123-B included in the MAC operator 420 may be synchronized with the MAC latch reset signal MAC_L_RST to output the final output value. In an embodiment, the final output value outputted from the MAC operator 420 may be stored into the memory bank 411 through the BIO line in the PIM device 400.

At a step 611, the row number 'R' of the weight matrix for which the MAC arithmetic operation is performed may be increased by '1'. Because the MAC arithmetic operation for the first row among the first to eight rows of the weight matrix has been performed at the previous steps, the row number of the weight matrix may change from '1' to '2' at the step 611. At a step 612, whether the row number changed at the step 611 is greater than the row number of the last row (i.e., the eighth row) of the weight matrix may be determined. Because the row number of the weight matrix is changed to '2' at the step 611, a process of the MAC arithmetic operation may be fed back to the step 604.

If the process of the MAC arithmetic operation is fed back to the step 604 from the step 612, the same processes as described with reference to the steps 604 to 612 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix to generate the MAC result data (corresponding to the element MAC1.0 located in the second row of the MAC result matrix) and the bias data (corresponding to the element B1.0 located in the second row of the bias matrix). If the process of the MAC arithmetic operation is fed back to the step 604 from the step 612, the processes from the step 604 to the step 612 may be iteratively performed until the MAC arithmetic operation is performed for all of the rows (i.e., first to eighth rows) of the weight matrix with the vector matrix. If the MAC arithmetic operation for the eighth row of the weight matrix terminates and the row number of the weight matrix changes from '8' to '9' at the step 611, the MAC arithmetic operation may terminate because the row number of '9' is greater than the last row number of '8' at the step 612.

Figure 29:
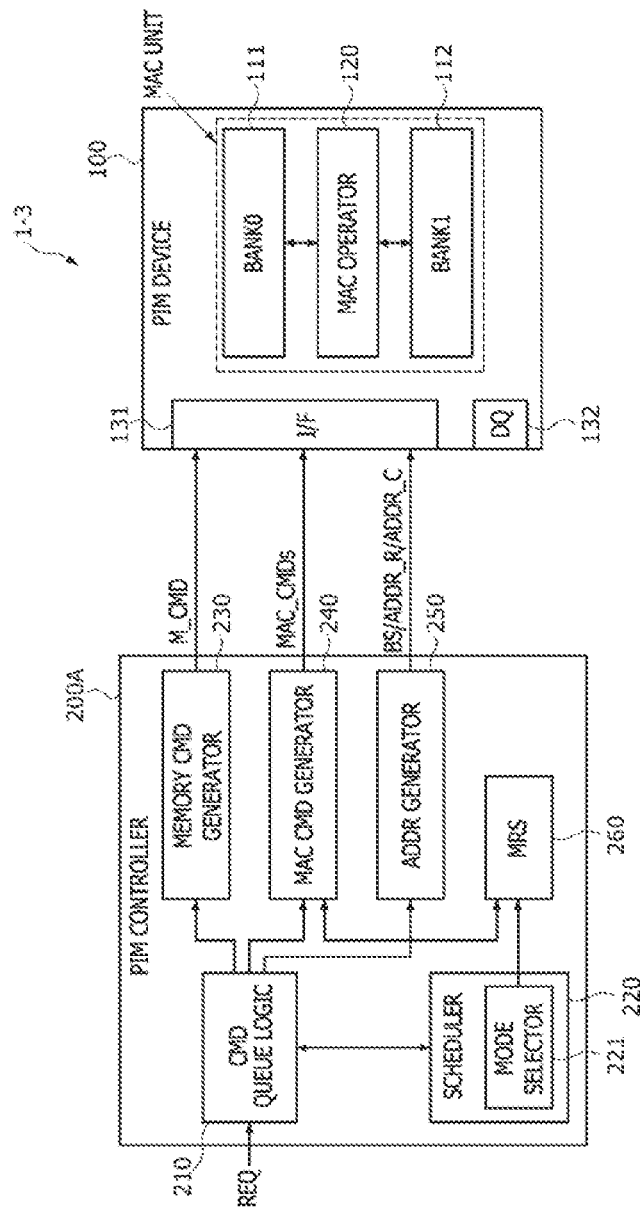
FIG. 29 is a block diagram illustrating a PIM system according to yet another embodiment of the present disclosure.

FIG. 29 is a block diagram illustrating a PIM system 1-3 according to a third embodiment of the present disclosure. As illustrated in FIG. 29, the PIM system 1-3 may have substantially the same configuration as the PIM system 1-1 illustrated in FIG. 2 except that a PIM controller 200A of the PIM system 1-3 further includes a mode register set (MRS) 260 as compared with the PIM controller 200 of the PIM system 1-1. Thus, the same explanation as described with reference to FIG. 2 will be omitted hereinafter. The mode register set 260 in the PIM controller 200A may receive an MRS signal instructing arrangement of various signals necessary for the MAC arithmetic operation of the PIM system 1-3. In an embodiment, the mode register set 260 may receive the MRS signal from the mode selector 221 included in the scheduler 220. However, in another embodiment, the MRS signal may be provided by an extra logic circuit other than the mode selector 221. The mode register set 260 receiving the MRS signal may transmit the MRS signal to the MAC command generator 240. For an embodiment, the MRS 260 represents a MRS circuit.

In an embodiment, the MRS signal may include timing information on when the MAC commands MAC_CMDs are generated. In such a case, the deterministic operation of the PIM system 1-3 may be performed by the MRS signal provided by the MRS 260. In another embodiment, the MRS signal may include information on the timing related to an interval between the MAC modes or information on a mode change between the MAC mode and the memory mode. In an embodiment, generation of the MRS signal in the MRS 260 may be executed before the vector data are stored in the second memory bank 112 of the PIM device 100 by the inference request signal transmitted from an external device to the PIM controller 200A. Alternatively, the generation of the MRS signal in the MRS 260 may be executed after the vector data are stored in the second memory bank 112 of the PIM device 100 by the inference request signal transmitted from an external device to the PIM controller 200A.

Figure 30:
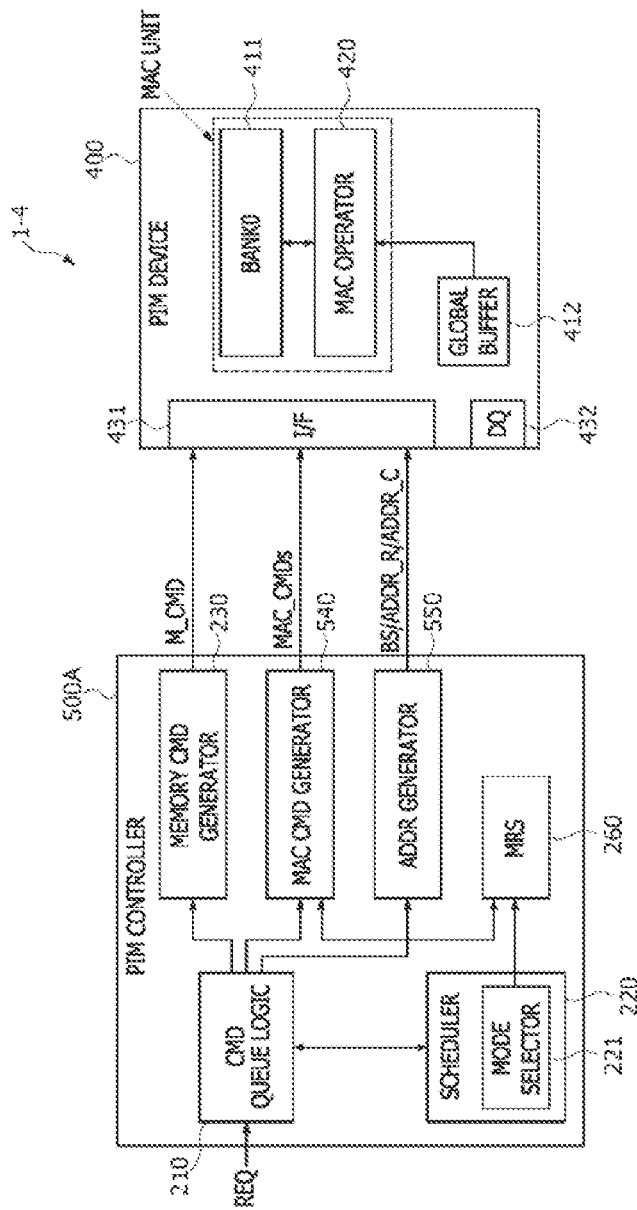
FIG. 30 is a block diagram illustrating a PIM system according to still another embodiment of the present disclosure.

FIG. 30 is a block diagram illustrating a PIM system 1-4 according to a fourth embodiment of the present disclosure. As illustrated in FIG. 30, the PIM system 1-4 may have substantially the same configuration as the PIM system 1-2 illustrated in FIG. 20 except that a PIM controller 500A of the PIM system 1-4 further includes the mode register set (MRS) 260 as compared with the PIM controller 500 of the PIM system 1-2. Thus, the same explanation as described with reference to FIG. 20 will be omitted hereinafter. The mode register set 260 in the PIM controller 500A may receive an MRS signal instructing arrangement of various signals necessary for the MAC arithmetic operation of the PIM system 1-4. In an embodiment, the mode register set 260 may receive the MRS signal from the mode selector 221 included in the scheduler 220. However, in another embodiment, the MRS signal may be provided by an extra logic circuit other than the mode selector 221. The mode register set 260 receiving the MRS signal may transmit the MRS signal to the MAC command generator 540.

In an embodiment, the MRS signal may include timing information on when the MAC commands MAC_CMDs are generated. In such a case, the deterministic operation of the PIM system 1-4 may be performed by the MRS signal provided by the MRS 260. In another embodiment, the MRS signal may include information on the timing related to an interval between the MAC modes or information on a mode change between the MAC mode and the memory mode. In an embodiment, generation of the MRS signal in the MRS 260 may be executed before the vector data are stored in the global buffer 412 of the PIM device 400 by the inference request signal transmitted from an external device to the PIM controller 500A. Alternatively, the generation of the MRS signal in the MRS 260 may be executed after the vector data are stored in the global buffer 412 of the PIM device 400 by the inference request signal transmitted from an external device to the PIM controller 500A.

Figure 31:
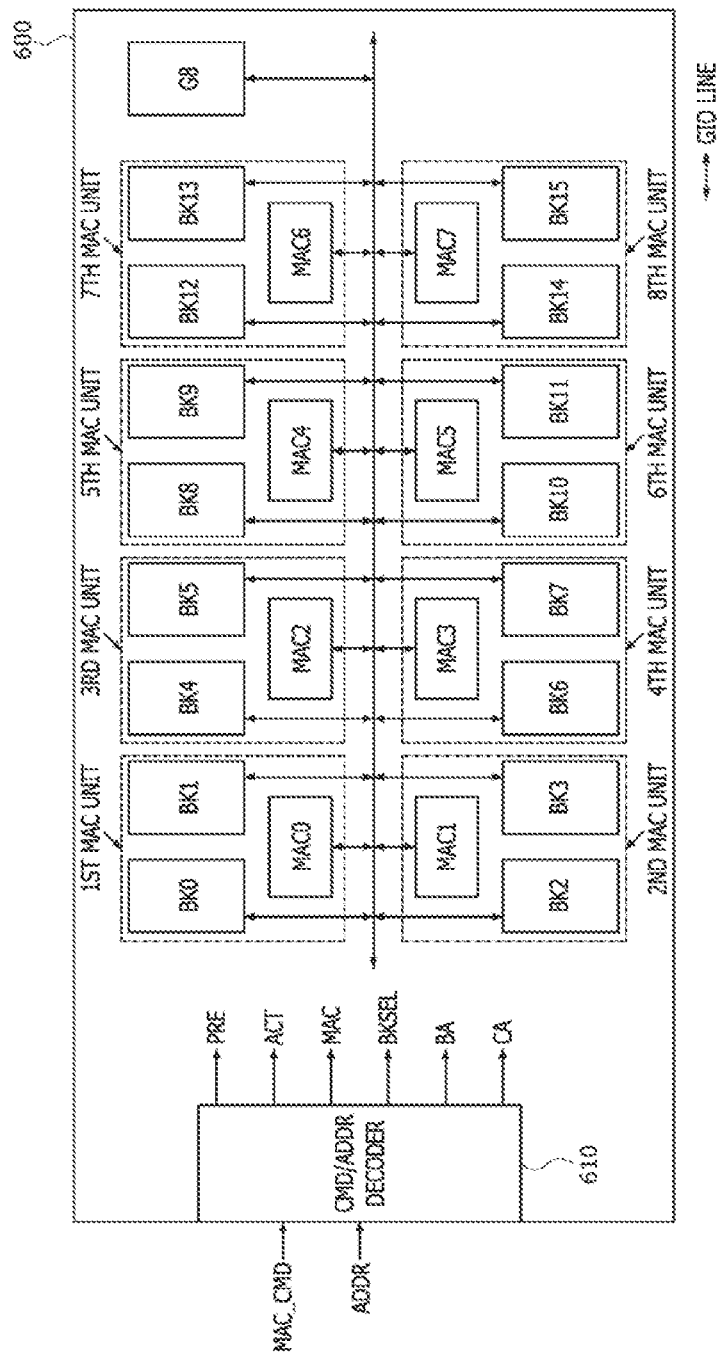
FIG. 31 is a diagram illustrating a PIM device according to an embodiment of the present disclosure.

FIG. 31 is a diagram illustrating a PIM device 600 according to an embodiment of the present disclosure. Referring to FIG. 31, the PIM device 600 may include a command/address decoder (CMD/ADDR DECODER) 610, a plurality of memory banks BK0-BK15, a plurality of MAC operators MAC0-MAC7, and a global buffer GB. In the present embodiment, a case in which the number of memory banks is 16 is exemplified, but this is just an example and the number may be less or more than 16. The PIM device 600 may perform a MAC operation in response to a MAC command MAC_CMD transmitted from a PIM controller (not shown) and an external address signal ADDR.

The command/address decoder 610 may receive the MAC command MAC_CMD and the external address signal ADDR. The command/address decoder 610 may output a pre-charge control signal PRE, an active control signal ACT, a MAC control signal MAC, a bank selection control signal BKSEL, a bank address signal BA, and a column address signal CA. The pre-charge control signal PRE may control a pre-charge operation on the memory banks selected by the bank address signal BA among the memory banks BK0-BK15. The active control signal ACT may control an active operation on the memory banks selected by the bank address signal BA. The activated row among the rows of the selected memory banks may be selected by a row address transmitted together with the active control signal ACT. The MAC control signal MAC may control the MAC operations of the MAC operators MAC0-MAC7. In an example, the MAC control signal MAC may be transmitted from the command/ address decoder 610 to the memory banks BK0-BK15. The memory banks BK0-BK15 that have received the MAC control signal MAC may transmit a MAC operation clock signal to the MAC operators MAC0-MAC7, and the MAC operators MAC0-MAC7 may perform MAC operations in synchronization with the MAC operation clock signal. The bank selection control signal BKSEL may control a bank selection operation in the MAC operators MAC0-MAC7. The bank address signal BA and the column address signal CA may be used to select the memory banks and to select the columns in the MAC operators MAC0-MAC7.

The plurality of memory banks BK0-BK15 may include a plurality of even memory banks BK0, BK2, . . . , and BK14 and a plurality of odd memory banks BK1, BK3, . . . , and BK15. In an example, the plurality of, for example, the first to sixteenth memory banks BK0-BK15 may constitute one bank group in units of four. For example, the first to fourth memory banks BK0-BK3 may constitute a first bank group. The fifth to eighth memory banks BK4-BK7 may constitute a second bank group. The ninth to twelfth memory banks BK8-BK11 may constitute a third bank group. In addition, the thirteenth to sixteenth memory banks BK12-BK15 may constitute a fourth bank group.

The even memory banks BK0, BK2, . . . , and BK14 may share a MAC operator with the odd memory banks BK1, BK3, . . . , and BK15. For example, the first even memory bank BK0 and the first odd memory bank BK1 may share the first MAC operator MAC0. The second even memory bank BK2 and the second odd memory bank BK3 may share the second MAC operator MAC1. The third even memory bank BK4 and the third odd memory bank BK5 may share the third MAC operator MAC2. The fourth even memory bank BK6 and the fourth odd memory bank BK7 may share the fourth MAC operator MAC3. The fifth even memory bank BK8 and the fifth odd memory bank BK9 may share the fifth MAC operator MAC4. The sixth even memory bank BK10 and the sixth odd memory bank BK11 may share the sixth MAC operator MAC5. The seventh even memory bank BK12 and the seventh odd memory bank BK13 may share the seventh MAC operator MACE. In addition, the eighth even memory bank BK14 and the eighth odd memory bank BK16 may share the eighth MAC operator MAC7. Here, the term of "share" may mean a relationship in which a MAC operator receives weight data through an even memory bank and an odd memory bank that share the MAC operator.

One even memory bank, one odd memory bank, and one MAC operator shared by the two memory banks may constitute one MAC unit. As illustrated in FIG. 31, the first even memory bank BK0, the first odd memory bank BK1, and the first MAC operator MAC0 may constitute a first MAC unit. The second even memory bank BK2, the second odd memory bank BK3, and the second MAC operator MAC1 may constitute a second MAC unit. The third even memory bank BK4, the third odd memory bank BK5, and the third MAC operator MAC2 may constitute a third MAC unit. The fourth even memory bank BK6, the fourth odd memory bank BK7, and the fourth MAC operator MAC3 may constitute a fourth MAC unit. The fifth even memory bank BK8, the fifth odd memory bank BK9, and the fifth MAC operator MAC4 may constitute a fifth MAC unit. The sixth even memory bank BK10, the sixth odd memory bank BK11, and the sixth MAC operator MAC5 may constitute a sixth MAC unit. The seventh even memory bank BK12, the seventh odd memory bank BK13, and the seventh MAC operator MACE may constitute a seventh MAC unit. In addition, the eighth even memory bank BK14, the eighth odd memory bank BK15, and the eighth MAC operator MAC7 may constitute an eighth MAC unit.

The memory banks BK0-BK15 may store the weight data that are used to MAC operations. The memory banks BK0-BK15 may provide the weight data to the MAC operators MAC0-MAC7 in response to the MAC control signal MAC. In an example, the first even memory bank BK0 and the first odd memory bank BK1 constituting the first MAC unit may provide the weight data to the first MAC operator MAC0. The second even memory bank BK2 and the second odd memory bank BK3 constituting the second MAC unit may provide the weight data to the second MAC operator MAC1. The third even memory bank BK4 and the third odd memory bank BK5 constituting the third MAC unit may provide the weight data to the third MAC operator MAC2. The fourth even memory bank BK6 and the fourth odd memory bank BK7 constituting the fourth MAC unit may provide the weight data to the fourth MAC operator MAC3. The fifth even memory bank BK8 and the fifth odd memory bank BK9 constituting the fifth MAC unit may provide the weight data to the fifth MAC operator MAC4. The sixth even memory bank BK10 and the sixth odd memory bank BK11 constituting the sixth MAC unit may provide the weight data to the sixth MAC operator MAC5. The seventh even memory bank BK12 and the seventh odd memory bank BK13 constituting the seventh MAC unit may provide the weight data to the seventh MAC operator MACE. In addition, the eighth even memory bank BK13 and the eighth odd memory bank BK14 constituting the eighth MAC unit may provide the weight data to the eighth MAC operator MAC7. In an example, the provision of the weight data from the memory banks to the MAC operators may be performed through a global input/output (GIO) line.

The global buffer GB may store the vector data. The global buffer GB may provide the stored vector data to the plurality of MAC operators MAC0-MAC7. The global buffer GB may transmit the vector data in common to the plurality of MAC operators MAC0-MAC7. Accordingly, the same vector data may be transmitted from the global buffer GB to the plurality of MAC operators MAC0-MAC7. In an example, the provision of the vector data from the global buffer GB to the MAC operators MAC0-MAC7 may be performed through the GIO line.

Each of the plurality of, for example, the first to eighth MAC operators MAC0-MAC7 may alternately perform an even MAC operation and an odd MAC operation. The even MAC operations in the first to eighth MAC operators MAC0-MAC7 may be simultaneously performed, and the odd MAC operations in the first to eighth MAC operators MAC0-MAC7 may also be simultaneously performed. That is, the first to eighth MAC operators MAC0-MAC7 may perform a first odd MAC operation after performing a first even MAC operation. When the first odd MAC operation is completed, the first to eighth MAC operators MAC0-MAC7 may perform a second even MAC operation. When the second even MAC operation is completed, the first to eighth MAC operators MAC0-MAC7 may perform a second odd MAC operation. The alternate performance on the even MAC operation and the odd MAC operation may be repeated until all MAC operations are completed.

The first to eighth MAC operators MAC0-MAC7 may perform the even MAC operations using the weight data from the first to eighth even memory banks BK0, BK2, . . . , and BK14 and the vector data from the global buffer GB. The first to eighth MAC operators MAC0-MAC7 may perform the odd MAC operations using the weight data from the first to eighth odd memory banks BK1, BK3, . . . , and BK15 and the vector data from the global buffer GB. For example, in the case of the first MAC unit, the first MAC operator MAC0 may receive the weight data from the first even memory bank BK0 and receive the vector data from the global buffer GB. The first MAC operator MAC0 may perform an even MAC operation on the weight data and the vector data to generate even MAC result data. In an example, the even MAC operation may be performed by continuously performing a plurality of sub-even MAC operations. In this case, the even MAC result data may be composed of result data generated by the final sub-even MAC operation among the plurality of sub-even MAC operations. When the even MAC result data is generated, that is, when the even MAC operation is completed, the first MAC operator MAC0 may receive weight data from the first odd memory bank BK1 and vector data from the global buffer GB. Here, the weight data may be data different from the weight data transmitted from the first even memory bank BK0 during the even MAC operation. On the other hand, the vector data may be the same as the vector data transmitted from the global buffer GB during the even MAC operation. The first MAC operator MAC0 may generate odd MAC result data by performing an odd MAC operation on the weight data and the vector data. In an example, the odd MAC operation may be performed by continuously performing a plurality of sub-odd MAC operations. In this case, the odd MAC result data may be composed of result data generated by the final sub-odd MAC operation among the plurality of sub-odd MAC operations. The even MAC operations and the odd MAC operations may be performed in the second to eighth MAC units in the same manner.

Figure 32:
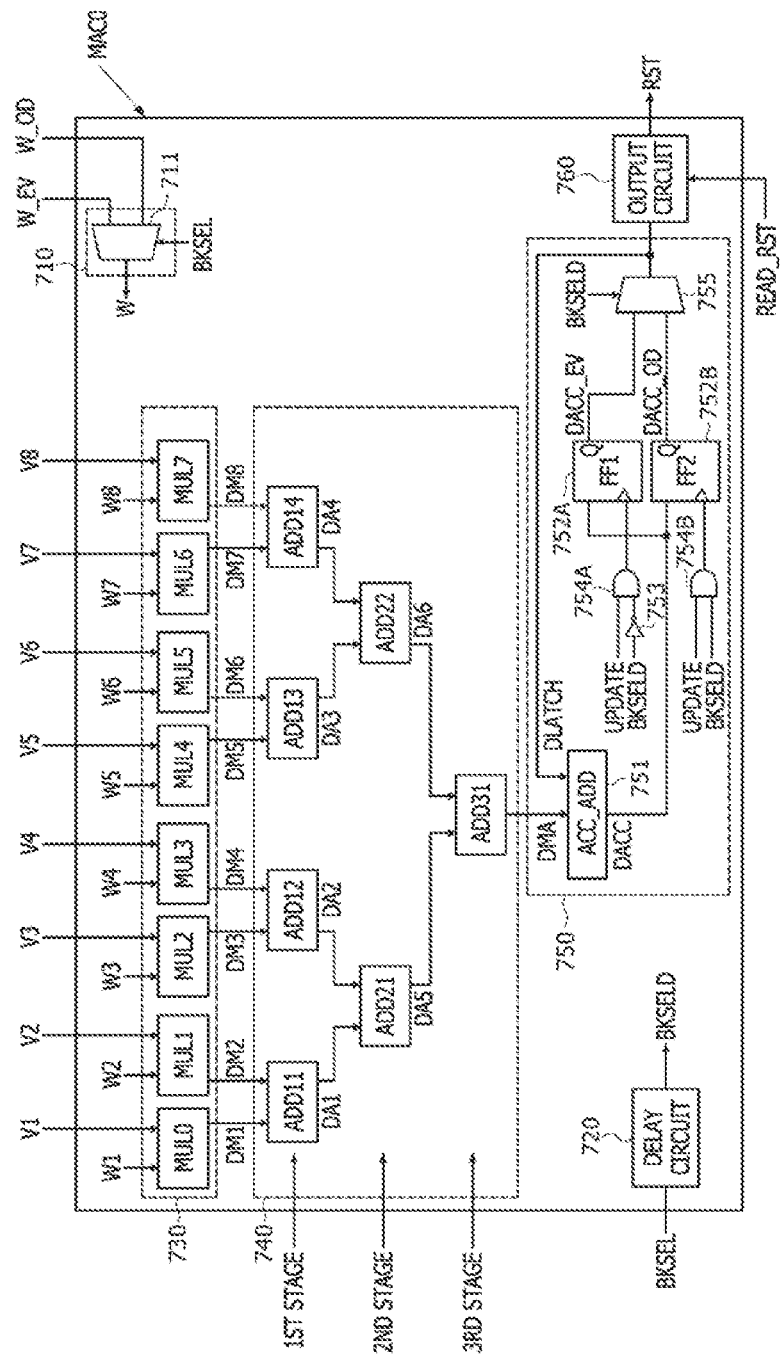
FIG. 32 is a diagram illustrating an example of a configuration of a first MAC operator of the PIM device of FIG. 31.

FIG. 32 is a diagram illustrating an example of a configuration of the first MAC operator MAC0 of the PIM device 600 of FIG. 31. In the PIM device 600 of FIG. 31, each of the second to eighth MAC operators MAC1-MAC7 may have the same configuration as the first MAC operator MAC0 described below. Referring to FIG. 32, the first MAC operator MAC0 may include a data input circuit 710, a delay circuit 720, a multiplication circuit 730, an addition circuit 740, an accumulation circuit 750, and an output circuit 760.

The data input circuit 710 may include a first selector 711. In an example, the first selector 711 may be implemented with a 2:1 multiplexer. The first selector 711 may have a first input terminal, a second input terminal, a selection terminal, and an output terminal. The first selector 711 may receive the even weight data W_EV from the first even memory bank BK0 through the first input terminal. The first selector 711 may receive the odd weight data W_OD from the first odd memory bank BK1 through the second input terminal. The terms "even weight data" and "odd weight data" used below may be used only to distinguish each other and might not have particular meanings. The first selector 711 may receive a bank selection signal BKSEL transmitted from a command/address decoder (610 of FIG. 31) through the selection terminal. The first selector 711 may output the even weight data W_EV or the odd weight data W_OD as weight data W through the output terminal, based on a logic level of the bank selection signal BKSEL. In an example, when a bank selection signal BKSEL of a logic "high" level is received through the selection terminal, the first selector 711 may output the even weight data W_EV received through the first input terminal, through the output terminal. On the other hand, when a bank selection signal BKSEL of a logic "low" level is received through the selection terminal, the first selector 711 may output the odd weight data W_OD received through the second input terminal, through the output terminal. In this case, the command/address decoder (610 in FIG. 31) may generate and output a bank selection signal BKSEL of a logic "high" level while the even MAC operation is being performed. On the other hand, while the odd MAC operation is being performed, the command/address decoder (610 in FIG. 31) may generate and output a bank selection signal BKSEL of a logic "low" level. The even weight data W_EV or the odd weight data W_OD output from the first selector 711 may be transmitted to the multiplication circuit 730.

The delay circuit 720 may receive the bank selection signal BKSEL output from the command/address decoder (610 in FIG. 31) as an input signal. The delay circuit 720 may output a bank selection delay control signal BKSELD as an output signal after delaying the bank selection signal BKSEL by a first delay time. The first delay time in the delay circuit 720 may be set to a time during which the first MAC operator MAC0 performs an even MAC operation. The time during which the first MAC operator MAC0 performs an even MAC operation may be substantially the same as the time during which the first MAC operator MAC0 performs an odd MAC operation. In an example, while a bank selection signal BKSEL of a logic "high" level is input from the command/address decoder (610 in FIG. 31), that is, while the first MAC operator MAC0 performs an even MAC operation, the delay circuit 720 may output a bank selection delay control signal BKSELD of a logic "low" level. When the first delay time elapses and the bank selection signal BKSEL of a logic "row" level is input from the command/address decoder (610 of FIG. 31), the logic level of the bank selection delay control signal BKSELD output from the delay circuit 720 may be changed from the logic "low" level to a logic "high" level. The logic level of the bank selection delay control signal BKSELD output from the delay circuit 720 may be maintained in the logic "high" state until the first MAC operator MAC0 completes the odd MAC operation. The bank selection delay control signal BKSELD output from the delay circuit 720 may be transmitted to the accumulation circuit 750.

The multiplication circuit 730 may include a plurality of, for example, first to eight multipliers MUL0-MUL7. The multiplication circuit 730 may receive eight weight data W1-W8 and eight vector data V1-V8. In an example, the weight data W1-W8 and the vector data V1-V8 may be configured in a floating-point format of 16 bits or 32 bits. When the first MAC operator MAC0 performs an even MAC operation, the eight weight data W1-W8 may be composed of even weight data transmitted from the first even memory bank BK0. On the other hand, when the first MAC operator MAC0 performs an odd MAC operation, the eight weight data W1-W8 may be composed of odd weight data transmitted from the first odd memory bank BK1. The eight vector data may be transmitted from the global buffer GB. The vector data V1-V8 when the first MAC operator MAC0 performs an even MAC operation may be the same as the vector data V1-V8 when the first MAC operator MAC0 performs an odd MAC operation. Each of the eight weight data W1-W8 and each of the eight vector data V1-V8 may be input to each of the first to eighth multipliers MUL0-MUL7, respectively, as shown in FIG. 32. The first to eighth multipliers MUL0-MUL7 may perform multiplication operations on the weight data W and the vector data V to output first to eighth multiplication data DM1-DM8. For example, the first multiplier MUL0 may perform a multiplication operation on the first weight data W1 and the first vector data V1 to generate and output first multiplication data DM1. The second multiplier MUL1 may perform a multiplication operation on the second weight data W2 and the second vector data V2 to generate and output second multiplication data DM2. In the same manner, the third to eighth multipliers MUL2-MUL7 may generate and output third to eighth multiplication data DM3-DM8, respectively. The first to eighth multiplication data DM1-DM8 may be transmitted to the addition circuit 740.

The addition circuit 740 may add the first to eighth multiplication data DM1-DM8 transmitted from the multiplication circuit 730 to generate and output multiplication addition data DMA. The addition circuit 740 may be configured in an adder tree form in which a plurality of, for example, seven adders ADD11, ADD12, ADD13, ADD14, ADD21, ADD22, and ADD31 are arranged in a hierarchical structure such as a tree structure. Four adders ADD11-ADD14 may be disposed at an uppermost first stage of the addition circuit 740. Two adders ADD21-ADD22 may be disposed at the next lower second stage of the addition circuit 740. One adder ADD31 may be disposed at a lowest third stage of the addition circuit 740.

The first adder ADD11 of the first stage may perform an addition operation on the first and second multiplication data DM1 and DM2 transmitted from the first and second multipliers MUL0 and MUL1 of the multiplication circuit 730, respectively, to output first addition data DA1. The second adder ADD12 of the first stage may perform an addition operation on the third and fourth multiplication data DM3 and DM4 transmitted from the third and fourth multipliers MUL2 and MUL3 of the multiplication circuit 730, respectively, to output second addition data DA2. The third adder ADD13 of the first stage may perform an addition operation on the fifth and sixth multiplication data DM5 and DM6 transmitted from the fifth and sixth multipliers MUL4 and MUL5 of the multiplication circuit 730, respectively, to output third addition data DA3. The fourth adder ADD14 of the first stage may perform an addition operation on the seventh and eighth multiplication data DM7 and DM8 transmitted from the seventh and eighth multipliers MULE and MUL7 of the multiplication circuit 730, respectively, to output fourth addition data DA4. The first adder ADD21 of the second stage may perform an addition operation on the first addition data DA1 and the second addition data DA2 transmitted from the first adder ADD11 and the second adder ADD12 of the first stage, respectively, to output fifth addition data DA5. The second adder ADD22 of the second stage may perform an addition operation on the third addition data DA3 and the fourth addition data DA4 transmitted from the third adder ADD13 and the fourth adder ADD14 of the first stage, respectively, to output sixth addition data DA6. The adder ADD31 of the third stage may perform an addition operation on the fifth addition data DA5 and the sixth addition data DA6 transmitted from the first adder ADD21 and the second adder ADD22 of the second stage, respectively, to output multiplication addition data DMA. The multiplication addition data DMA output from the addition circuit 740 may be transmitted to the accumulation circuit 750.

The accumulation circuit 750 may include an accumulative adder (ACC_ADD) 751, a first latch circuit (FFI) 752A, a second latch circuit (FF2) 7528, an inverter 753, a first AND gate 754A, a second AND gate 7548, and a second selector 755. The accumulative adder 751 may perform an accumulation operation on the multiplication data DMA transmitted from the addition circuit 740 and latch data DLATCH to generate and output accumulation data DACC as an accumulation result. The accumulative adder 751 may transmit the accumulation data DACC to an input terminal of the first latch circuit 752A and an input terminal of the second latch circuit 752B.

The first latch circuit 752A may latch the accumulation data DACC received through the input terminal, based on a logic level of a signal input through a clock terminal and output the latched accumulation data DACC through an output terminal Q. The first latch circuit 752A may perform latch and output operations on the accumulation data DACC output through the accumulative adder 751 in the even MAC operation process. Accordingly, the accumulation data output from the first latch circuit 752A may constitute even accumulation data DACC_EV. The second latch circuit 752B may also latch the accumulation data DACC received through an input terminal, based on a logic level of a signal input through a clock terminal and output the latched accumulation data DACC through an output terminal Q. The second latch circuit 752B may perform latch and output operations on the accumulation data DACC output through the accumulative adder 751 in the odd MAC operation process. Accordingly, the accumulation data output from the second latch circuit 752B may constitute odd accumulation data DACC_OD. Each of the first latch circuit 752A and the second latch circuit 752B may include a flip-flop. The inverter 753 may receive the bank selection delay control signal BKSELD and invert the logic level of the bank selection delay control signal BKSELD to output an inverted bank selection delay control signal. An output terminal of the inverter 753 may be coupled to the clock terminal of the first latch circuit 752A.

The first AND gate 754A may receive an update signal UPDATE through a first input terminal and receive the inverted bank selection delay control signal through a second input terminal. The first AND gate 754A may perform an AND operation on the update signal UPDATE and the inverted bank selection delay control signal to output a signal generated as a result of the AND operation through an output terminal. The signal output from the first AND gate 754A may be transmitted to the clock terminal of the first latch circuit 752A. The second AND gate 754B may receive the update signal UPDATE through a first input terminal and receive the bank selection delay control signal BKSELD through a second input terminal. The second AND gate 754B may perform an AND operation on the update signal UPDATE and the bank selection delay control signal BKSELD to output a signal generated as a result of the AND operation through an output terminal. The signal output from the second AND gate 754B may be transmitted to the clock terminal of the second latch circuit 752B.

The second selector 755 may have a first input terminal, a second input terminal, a selection terminal, and an output terminal. The second selector 755 may receive the even accumulation data DACC_EV output through the output terminal Q of the first latch circuit 752A through the first input terminal. The second selector 755 may receive the odd accumulation data DACC_OD output through the output terminal Q of the second latch circuit 752B through the second input terminal. The second selector 755 may receive the bank selection delay control signal BKSELD output from the delay circuit 720 through the selection terminal. The second selector 755 may output the even accumulation data DACC_EV or the odd accumulation data DACC_OD through the output terminal, based on a logic level of the bank selection delay control signal BKSELD. In an example, when a bank selection delay control signal BKSELD of a logic "low" level is received through the selection terminal, the second selector 755 may output the even accumulation data DACC_EV received through the first input terminal, through the output terminal. On the other hand, when a bank selection delay control signal BKSELD of a logic high" level is received through the selection terminal, the second selector 755 may output the odd accumulation data DACC_OD received through the second input terminal, through the output terminal. The even accumulation data DACC_EV or the odd accumulation data DAC-C_OD output from the second selector 755 may be fed back to the accumulative adder 751 as the latch data DLATCH and may also be transmitted to the output circuit 760.

The output circuit 760 may output or not output the accumulation data DACC transmitted from the second selector 755 from the first MAC operator MAC0, based on a MAC result data read signal READ_RST. In an example, when an even MAC operation is completed or an odd MAC operation is completed, a MAC result data read signal READ_RST of a logic "high" level may be transmitted to the output circuit 760. In this case, the output circuit 760 may output the accumulation data DACC transmitted from the second selector 755 as MAC result data RST. On the other hand, when the even MAC operation is not completed or the odd MAC operation is not completed, a MAC result data read signal READ_RST of a logic "low" level may be transmitted to the output circuit 760. In this case, the output circuit 760 might not output the accumulation data DACC transmitted from the second selector 755 as the MAC result data RST.

Figure 34:
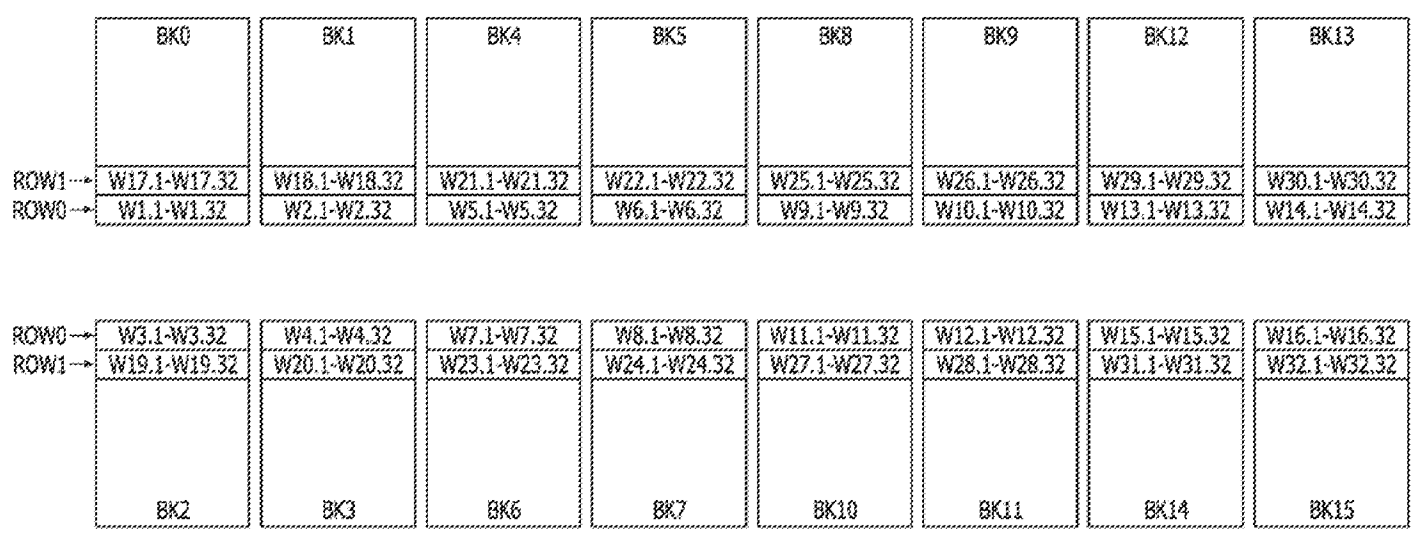

FIG. 33 is a diagram illustrating an example of matrix multiplication performed by a MAC operation of the PIM device 600 of FIG. 31. FIG. 34 is a diagram illustrating a method in which weight data W1.1-W1.32, . . . , and W32.1-W32.32 of a weight matrix of FIG. 33 are stored in first to sixteenth memory banks BK0-BK15. First, referring to FIG. 33, the PIM device 600 may perform a MAC operation according to matrix multiplication on an (M×N) ("M" and "N" are natural numbers of 2 or greater) weight matrix and an (N×1) vector matrix. The PIM device 600 may generate and output an (M×1) result matrix as a result of the MAC operation. Hereinafter, as an example, it will be assumed that the weight matrix has 32 rows and 32 columns, and the vector matrix has 32 rows and 1 column. In this case, the result matrix may have 32 rows and 1 column. The weight matrix may have 1,024 weight data W1.1-W1.32, . . . , and W32.1-W32.32 as elements. The vector matrix may have 32 vector data V1.1-V32.1 as elements. The result matrix generated as a result of the MAC operation may have 32 MAC result data RST1.1-RST32.1 as elements.

Next, referring to FIG. 34, the weight data W1.1-W1.32, . . . , and W32.1-W32.32 may be stored in the memory banks BK0-BK15 in units of one row of the weight matrix. First, the weight data W1.1-W1.32, . . . , and W16.1-W16.32 of the first row to the sixteenth row of the weight matrix may be stored in a first row ROW0 of the memory banks BK0-BK15. Specifically, the weight data W1.1-W1.32 of the first row and the weight data W2.1-W2.32 of the second row of the weight matrix may be stored in the first row ROW0 of each of the first even memory bank BK0 and the first odd memory bank BK1 constituting the first MAC unit, respectively. The weight data W3.1-W3.32 of the third row and the weight data W4.1-W4.32 of the fourth row of the weight matrix may be stored in the first row ROW0 of each of the second even memory bank BK2 and the second odd memory bank BK3 constituting the second MAC unit, respectively. The weight data W5.1-W5.32 of the fifth row and the weight data W6.1-W6.32 of the sixth row of the weight matrix may be stored in the first row ROW0 of each of the third even memory bank BK4 and the third odd memory bank BK5 constituting the third MAC unit, respectively. The weight data W7.1-W7.32 of the seventh row and the weight data W8.1-W8.32 of the eighth row of the weight matrix may be stored in the first row ROW0 of each of the fourth even memory bank BK6 and the fourth odd memory bank BK7 constituting the fourth MAC unit, respectively. The weight data W9.1-W9.32 of the ninth row and the weight data W10.1-W10.32 of the tenth row of the weight matrix may be stored in the first row ROW0 of each of the fifth even memory bank BK8 and the fifth odd memory bank BK9 constituting the fifth MAC unit, respectively. The weight data W11.1-W11.32 of the eleventh row and the weight data W12.1-W12.32 of the twelfth row of the weight matrix may be stored in the first row ROW0 of each of the sixth even memory bank BK10 and the sixth odd memory bank BK11 constituting the sixth MAC unit, respectively. The weight data W13.1-W13.32 of the thirteenth row and the weight data W14.1-W14.32 of the fourteenth row of the weight matrix may be stored in the first row ROW0 of each of the seventh even memory bank BK12 and the seventh odd memory bank BK13 constituting the seventh MAC unit, respectively. The weight data W15.1-W15.32 of the fifteenth row and the weight data W16.1-W16.32 of the sixteenth row of the weight matrix may be stored in the first row ROW0 of each of the eighth even memory bank BK14 and the eighth odd memory bank BK15 constituting the eighth MAC unit, respectively.

Next, the weight data W17.1-W17.32, . . . , and W32.1-W32.32 of the $17^{th}$ row to $32^{nd}$ row may be stored in the second row ROW1 of the memory banks BK0-BK15. Specifically, the weight data W17.1-W17.32 of the $17^{th}$ row and the weight data W18.1-W18.32 of the $18^{th}$ row of the weight matrix may be stored in the second row ROW1 of each of the first even memory bank BK0 and the first odd memory bank BK1 constituting the first MAC unit, respectively. The weight data W19.1-W19.32 of the $19^{th}$ row and the weight data W20.1-W20.32 of the $20^{th}$ row of the weight matrix may be stored in the second row ROW1 of each of the second even memory bank BK2 and the second odd memory bank BK3 constituting the second MAC unit, respectively. The weight data W21.1-W21.32 of the $21^{st}$ row and the weight data W22.1-W22.32 of the $22^{nd}$ row of the weight matrix may be stored in the second row ROW1 of each of the third even memory bank BK4 and the third odd memory bank BK5 constituting the third MAC unit, respectively. The weight data W23.1-W23.32 of the $23^{rd}$ row and the weight data W24.1-W24.32 of the $24^{th}$ row of the weight matrix may be stored in the second row ROW1 of each of the fourth even memory bank BK6 and the fourth odd memory bank BK7 constituting the fourth MAC unit, respectively. The weight data W25.1-W25.32 of the $25^{th}$ row and the weight data W26.1-W26.32 of the $26^{th}$ row of the weight matrix may be stored in the second row ROW1 of each of the fifth even memory bank BK8 and the fifth odd memory bank BK9 constituting the fifth MAC unit, respectively. The weight data W27.1-W27.32 of the $27^{th}$ row and the weight data W28.1-W28.32 of the $28^{th}$ row of the weight matrix may be stored in the second row ROW1 of each of the sixth even memory bank BK10 and the sixth odd memory bank BK11 constituting the sixth MAC unit, respectively. The weight data W29.1-W29.32 of the $29^{th}$ row and the weight data W30.1-W30.32 of the $30^{th}$ row of the weight matrix may be stored in the second row ROW1 of each of the seventh even memory bank BK12 and the seventh odd memory bank BK13 constituting the seventh MAC unit, respectively. The weight data W31.1-W31.32 of the $31^{st}$ row and the weight data W32.1-W32.32 of the $32^{nd}$ row of the weight matrix may be stored in the second row ROW1 of each of the eighth even memory bank BK14 and the eighth odd memory bank BK15 constituting the eighth MAC unit, respectively.

Figure 35:
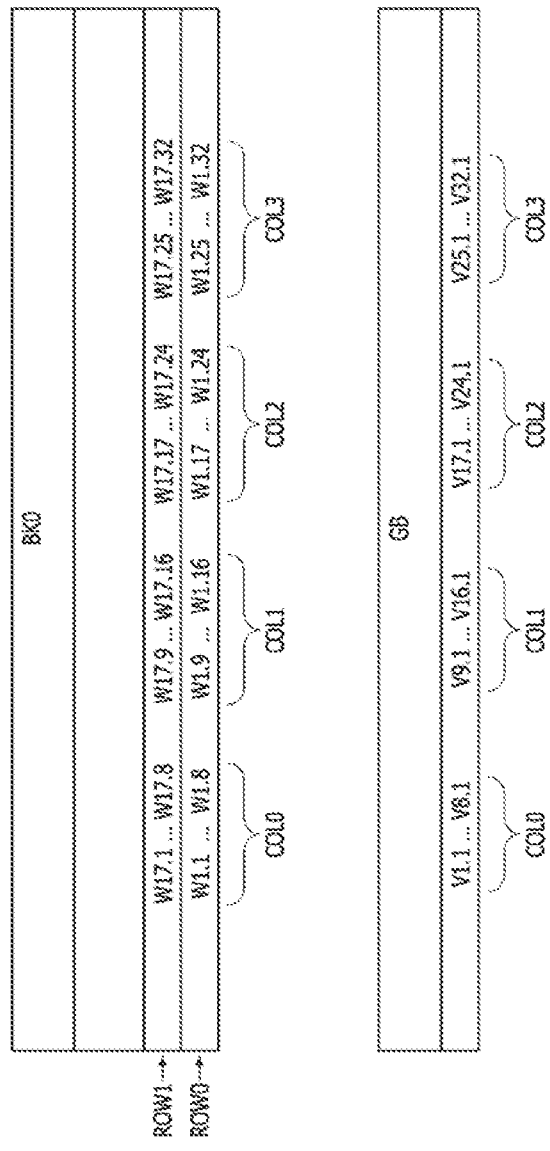
FIG. 35 is a diagram illustrating a method of transmitting weight data and vector data in a first even memory bank and a global buffer, respectively, to a first MAC operator of the PIM device of FIG. 31.

FIG. 35 is a diagram illustrating a method of transmitting weight data and vector data to the first MAC operator in the first even memory bank BK0 and the global buffer GB of the PIM device 600 of FIG. 31, respectively. Referring to FIG. 35, the first even memory bank BK0 and the global buffer GB may transmit the weight data and the vector data selected by a column address signal COL to the first MAC operator. In this example, it is assumed that eight weight data and eight vector data are selected by one column address signal COL. In a state in which the first row ROW0 of the first even memory bank BK0 is activated, when a first column address signal COL0 is transmitted to the first even memory bank BK0 and the global buffer GB, weight data W1.1-W1.8 and vector data V1.1-V8.1 may be output from the first even memory bank BK0 and the global buffer GB, respectively. Subsequently, when a second column address signal COL1 is transmitted to the first even memory bank BK0 and the global buffer GB, weight data W1.9-W1.16 and the vector data V9.1-V16.1 may be output from the first even memory bank BK0 and the global buffer GB, respectively. Subsequently, when a third column address signal COL2 is transmitted to the first even memory bank BK0 and the global buffer GB, weight data W1.17-W1.24 and vector data V17.1-V24.1 may be output from the first even memory bank BK0 and the global buffer GB, respectively. Subsequently, when a fourth column address signal COL3 is transmitted to the first even memory bank BK0 and the global buffer GB, weight data W1.25-W1.32 and the vector data V25.1-V32.1 may be output from the first even memory bank BK0 and the global buffer GB, respectively. Similarly, in a state in which the second row ROW1 of the first even memory bank BK0 is activated, when the first column address signal COL0 is transmitted to the first even memory bank BK0 and the global buffer GB, weight data W17.1-W17.8 and the vector data V1.1-V8.1 may be output from the first even memory bank BK0 and the global buffer GB, respectively. Subsequently, when the second column address signal COL1 is transmitted to the first even memory bank BK0 and the global buffer GB, weight data W17.9-W17.16 and the vector data V9.1-V16.1 may be output from the first even memory bank BK0 and the global buffer GB, respectively. Subsequently, when the third column address signal COL2 is transmitted to the first even memory bank BK0 and the global buffer GB, weight data W17.17-W17.24 and the vector data V17.1-V24.1 may be output from the first even memory bank BK0 and the global buffer GB, respectively. Subsequently, when the fourth column address signal COL3 is transmitted to the first even memory bank BK0 and the global buffer GB, weight data W17.25-W17.32 and the vector data V25.1-V32.1 may be output from the first even memory bank BK0 and the global buffer GB, respectively.

Figure 36:
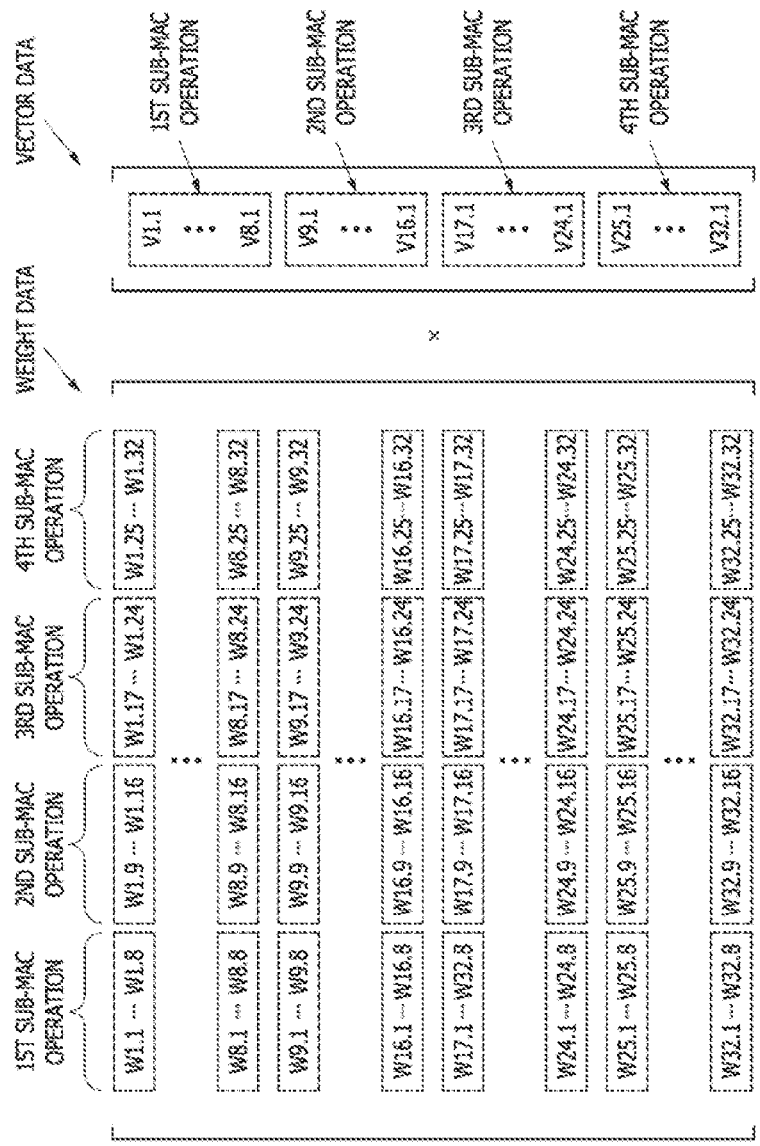
FIG. 36 is a diagram illustrating a process of performing matrix multiplication of FIG. 33 by the PIM device of FIG. 31.

FIG. 36 is a diagram illustrating a process of performing matrix multiplications of FIG. 33 by the PIM device 600 of FIG. 31. The first to eighth MAC units of the PIM device 600 according to the present example may simultaneously perform MAC operations. Specifically, the first to eighth MAC units may simultaneously perform even MAC operations, and then simultaneously perform odd MAC operations. This process may be repeatedly performed until the matrix multiplications for all rows of the weight matrix are completed. Because the number of MAC units is eight, matrix multiplications on the eight rows of the weight matrix may be completed by one even MAC operation. Similarly, matrix multiplications on the eight rows of the weight matrix may be completed by one odd MAC operation. Accordingly, when the even MAC operations and the odd MAC operations are performed in the first to eighth MAC units, matrix multiplications on the sixteen rows of the weight matrix may be completed. Because the weight matrix illustrated in FIG. 36 has 32 rows, the matrix multiplications for all rows of the weight matrix may be completed by sequentially performing the first even MAC operation, the first odd MAC operation, the second even MAC operation, and the second odd MAC operation.

When the weight data W1.1-W1.32, . . . , and W32.1-W32.32 are stored in the memory banks BK0-BK15 in the manner described with reference to FIG. 34, the matrix multiplications may be performed on the first row, the third row, the fifth row, the seventh row, the ninth row, the eleventh row, the thirteenth row, and the fifteenth row of the weight matrix by performing the first even MAC operation. Then, by performing the first odd MAC operation, the matrix multiplications on the second row, the fourth row, the sixth row, the eighth row, the tenth row, the twelfth row, the fourteenth row, and the sixteenth row may be performed. That is, the matrix multiplications may be performed on the first to sixteenth rows of the weight matrix by performing the first even MAC operation and the first odd MAC operation. Then, the matrix multiplications on the $17^{th}$ row, the $19^{th}$ row, the $21^{st}$ row, the $23^{rd}$ row, the $25^{th}$ row, the $27^{th}$ row, the $29^{th}$ row, and the $31^{st}$ row of the weight matrix may be performed by performing the second even MAC operation. Then, the matrix multiplications on the $18^{th}$ row, the $20^{th}$ row, the $22^{nd}$ row, the $24^{th}$ row, the $26^{th}$ row, the $28^{th}$ row, the $30^{th}$ row, and the $32^{nd}$ row of the weight matrix may be performed by performing the second odd MAC operation. That is, the matrix multiplications may be performed on the $17^{th}$ to $32^{nd}$ rows of the weight matrix by performing the second even MAC operation and the second odd MAC operation.

As described with reference to FIG. 32, the first to eighth MAC operators MAC0-MAC7 in the first to eighth MAC units may each perform MAC operations on the eight pieces of weight data. Accordingly, the first even MAC operation in the first MAC operator MAC0 may be performed by successively performing a first sub-MAC operation on the first to eighth columns, a second sub-MAC operation on the ninth to sixteenth columns, a third sub-MAC operation on the $17^{th}$ to $24^{th}$ columns, and a fourth sub-MAC operation on the $25^{th}$ to $32^{nd}$ columns of the first row of the weight matrix. Similarly, the first odd MAC operation in the first MAC operator MAC0 may be performed by successively performing a first sub-MAC operation on the first to eighth columns, a second sub-MAC operation on the ninth to sixteenth columns, a third sub-MAC operation on the $17^{th}$ to $24^{th}$ columns, and a fourth sub-MAC operation on the $25^{th}$ to $32^{nd}$ columns of the second row of the weight matrix. The second even MAC operation in the first MAC operator MAC0 may be performed by successively performing a first sub-MAC operation on the first to eighth columns, a second sub-MAC operation on the ninth to sixteenth columns, a third sub-MAC operation on the $17^{th}$ to $24^{th}$ columns, and a fourth sub-MAC operation on the $25^{th}$ to $32^{nd}$ columns of the 17th row of the weight matrix. In addition, the second odd MAC operation in the first MAC operator MAC0 may be performed by successively performing a first sub-MAC operation on the first to eighth columns, a second sub-MAC operation on the ninth to sixteenth columns, a third sub- MAC operation on the 17$^{th}$ to 24$^{th}$ columns, and a fourth sub-MAC operation on the 25$^{th}$ to 32$^{nd}$ columns of the 18$^{th}$ row of the weight matrix. In this way, the first even MAC operation, the first odd MAC operation, the second even MAC operation, and the second odd MAC operation in each of the first to eighth MAC operators MAC0-MAC7 may be performed by successively performing the first to fourth sub-MAC operations, respectively.

In the case of the vector matrix, the vector data V1.1-V8.1 of the first to eighth rows may be used for the first sub-MAC operation. The vector data V9.1-V16.1 of the ninth to sixteenth rows of the vector matrix may be used for the second sub-MAC operation. The vector data V17.1-V24.1 of the 17$^{th}$ to 24$^{th}$ rows of the vector matrix may be used for the third sub-MAC operation. In addition, the vector data V25.1-V32.1 of the 25$^{th}$ to 32$^{nd}$ rows of the vector matrix may be used for the fourth sub-MAC operation.

Figure 37:
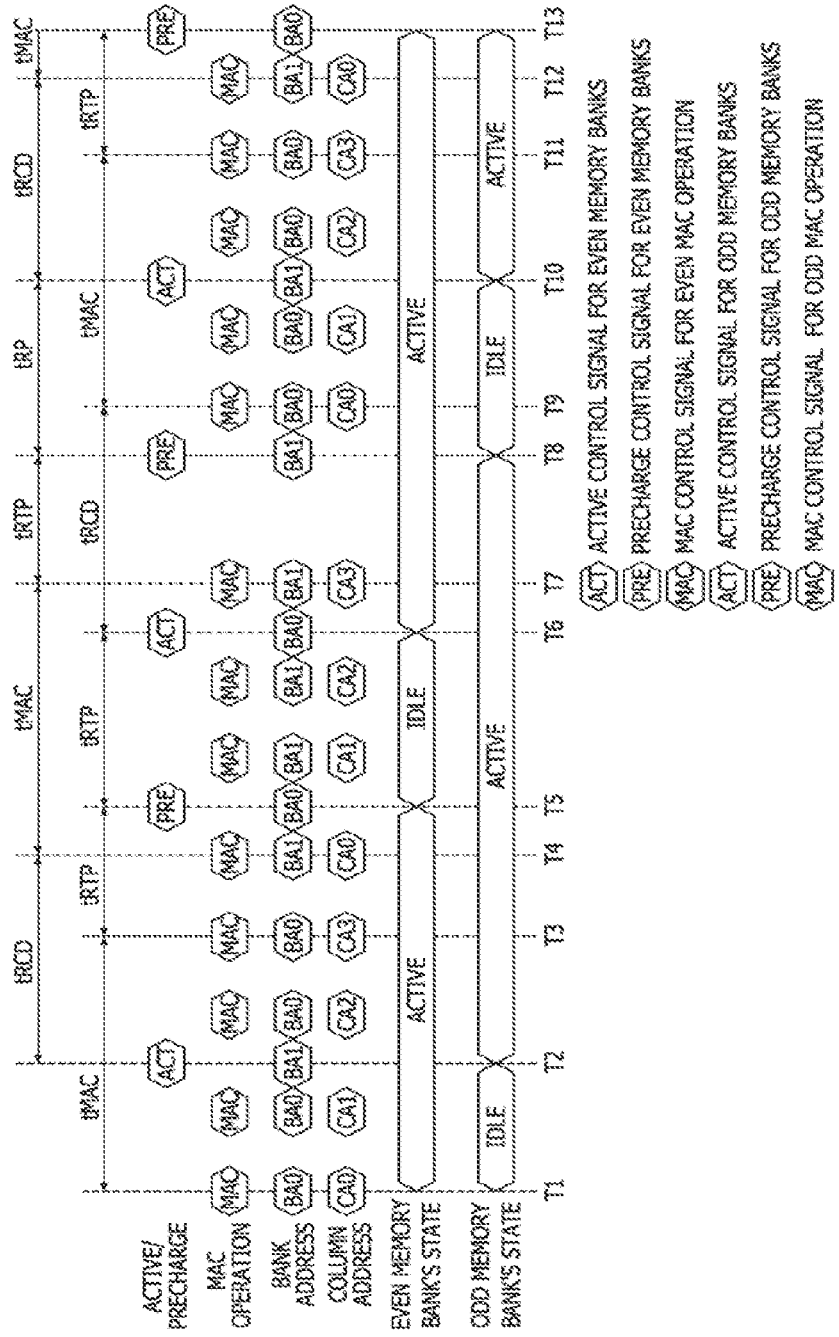
FIG. 37 is a timing diagram illustrating a process of performing from a first even MAC operation to a second even MAC operation in the PIM device of FIG. 31.
Figure 38:
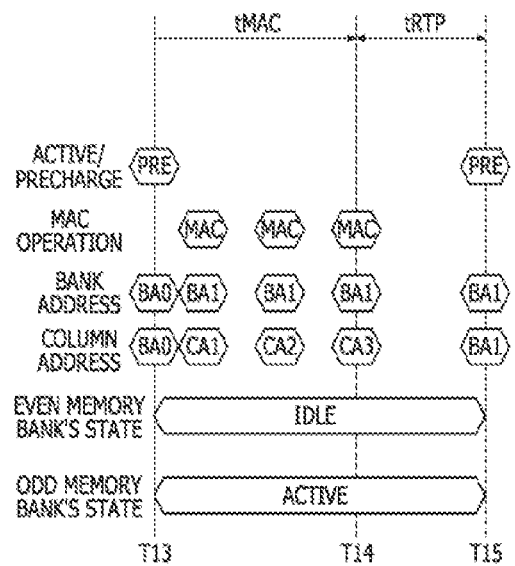
FIG. 38 is a timing diagram illustrating a process from the end of the second even MAC operation to the end of a second odd MAC operation in the PIM device of FIG. 31.

FIGS. 37 and 38 are timing diagrams illustrating the matrix multiplication process of FIG. 33 performed by the PIM device 600 of FIG. 31. Specifically, FIG. 37 is a timing diagram illustrating a process of performing a first even MAC operation to a second even MAC operation in the PIM device 600 of FIG. 31. FIG. 38 is a timing diagram illustrating a process from the end of the second even MAC operation to the end of the second odd MAC operation in the PIM device 600 of FIG. 31. In this example, it is assumed that the first row ROW0 of the even memory banks BK0, BK2, . . . , and BK14 is already activated. In FIGS. 37 and 38, the even memory banks BK0, BK2, . . . , and BK14 and the odd memory banks BK1, BK3, . . . , and BK15 may each be in an idle state while performing a pre-charge operation and maintain an activated state while performing an active operation and performing a MAC operation.

First, as illustrated in FIG. 37, at a first time point T1, the first to eighth MAC operators MAC0-MAC7 may perform a first sub-MAC operation of the first even MAC operation. To this end, a first column address signal CA0 may be transmitted to the even memory banks BK0, BK2, . . . , and BK14 at the first time point T1. When a first sub-MAC operation is completed, a second column address signal CA1 may be transmitted to the even memory banks BK0, BK2, . . . , and BK14, and the first to eighth MAC operators MAC0-MAC7 may perform a second sub-MAC operation of the first even MAC operation. When the second sub-MAC operation is completed, a third column address signal CA2 may be transmitted to the even memory banks BK0, BK2, . . . , and BK14, and the first to eighth MAC operators MAC0-MAC7 may perform a third sub-MAC operation of the first even MAC operation. At a third time point T3 when the third sub-MAC operation is completed, a fourth column address signal CA3 may be transmitted to the even memory banks BK0, BK2, . . . , and BK14, and the first to eighth MAC operators MAC0-MAC7 may perform a fourth sub-MAC operation of the first even MAC operation. A time interval between the first time point T1 at which the first sub-MAC operation of the first even MAC operation starts and the third time point T3 at which the fourth sub-MAC operation starts may be defined as a MAC operation time tMAC.

At a fifth time point T5 when a read to pre-charge delay time tRTP elapses from the third time point T3 when the fourth sub-MAC operation is started, the even memory banks BK0, BK2, . . . , and BK14 selected by a first bank address signal BA0 may start to perform a pre-charge operation. At a sixth time point T6 when a row pre-charge time tRP elapses from the fifth time point T5, the even memory banks BK0, BK2, . . . , and BK14 selected by the first bank address signal BK0 may start to perform an active operation. At a ninth time point T9 when an active-to-internal read delay time tRCD elapses from the sixth time point T6, the first to eighth MAC operators MAC0-MAC7 may perform a first sub-MAC operation of the second even MAC operation. To this end, a first column address signal CA0 may be transmitted to the even memory banks BK0, BK2, . . . , and BK14 at the ninth time point T9. When the first sub-MAC operation is completed, a second column address signal CA1 may be transmitted to the even memory banks BK0, BK2, . . . , and BK14, and the first to eighth MAC operators MAC0-MAC7 may perform a second sub-MAC operation of the second even MAC operation. When the second sub-MAC operation is completed, a third column address signal CA2 may be transmitted to the even memory banks BK0, BK2, . . . , and BK14, and the first to eighth MAC operators MAC0-MAC7 may perform a third sub-MAC operation of the second even MAC operation. At an eleventh time point T11 when the third sub-MAC operation is completed, the fourth column address signal CA3 may be transmitted to the even memory banks BK0, BK2, . . . , and BK14, and the first to eighth MAC operators MAC0-MAC7 may perform a fourth sub-MAC operation of the second even MAC operation. At a thirteenth time point T13 when the read to pre-charge delay time tRTP elapses from the eleventh time point T11, the even memory banks BK0, BK2, . . . , and BK14 selected by the first bank address signal BA0 may start to perform a pre-charge operation.

At a second time point T2 between the first time point T1 and the third time point T3 when the first sub-MAC operation and the fourth sub-MAC operation of the first even MAC operation in the first to eighth MAC operators MAC0-MAC7 start to be performed, respectively, the odd memory banks BK1, BK3, . . . , and BK15 selected by a second bank address signal BA1 may start to perform an active operation. At a fourth time point T4 when the active-to-internal read delay time tRCD elapses from the second time point T2, the first to eighth MAC operators MAC0-MAC7 may perform a first sub-MAC operation of a first odd MAC operation. To this end, a first column address signal CA0 may be transmitted to the odd memory banks BK1, BK3, . . . , and BK15 at the fourth time point T4. When the first sub-MAC operation is completed, a second column address signal CA1 may be transmitted to the odd memory banks BK1, BK3, . . . , and BK15, and the first to eighth MAC operators MAC0-MAC7 may perform a second sub-MAC operation of the first odd MAC operation. When the second sub-MAC operation is completed, a third column address signal CA2 may be transmitted to the odd memory banks BK1, BK3, . . . , and BK15, and the first to eighth MAC operators MAC0-MAC7 may perform a third sub-MAC operation of the first odd MAC operation. At a seventh time point T7 when the third sub-MAC operation is completed, a fourth column address signal CA3 may be transmitted to the odd memory banks BK1, BK3, . . . , and BK15, and the first to eighth MAC operators MAC0-MAC7 may perform a fourth sub-MAC operation of the first odd MAC operation.

At a tenth time point T10 when a row pre-charge time tRP elapses, the odd memory banks BK1, BK3, . . . , and BK15 selected by a second bank address signal BA1 may start to perform an active operation. At a twelfth time point T12 when the active-to-internal read delay time tRCD elapses from the tenth time point T10, a first column address signal CA0 may be transmitted to the even memory banks BK0, BK2, . . . , and BK14, and the first to eighth MAC operators MAC0-MAC7 may perform a first sub-MAC operation of the second odd MAC operation.

Subsequently, as illustrated in FIG. 38, when the first sub-MAC operation of the second odd MAC operation is completed, a second column address signal CA1 may be transmitted to the odd memory banks BK1, BK3, . . . , and BK15, and the first to eighth MAC operators MAC0-MAC7 may perform a second sub-MAC operation of the second odd MAC operation. When the second sub-MAC operation is completed, a third column address signal CA2 may be transmitted to the odd memory banks BK1, BK3, . . . , and BK15, and the first to eighth MAC operators MAC0-MAC7 may perform a third sub-MAC operation of the second odd MAC operation. At a fourteenth time point T14 when the third sub-MAC operation is completed, a fourth column address signal CA3 may be transmitted to the odd memory banks BK1, BK3, . . . , and BK15, and the first to eighth MAC operators MAC0-MAC7 may perform a fourth sub-MAC operation of the second odd MAC operation. At a fifteenth time point T15 when the read-to-pre-charge delay time tRTP elapses from the fourteenth time point T14, the odd memory banks BK1, BK3, . . . , and BK15 selected by a second bank address signal BA1 may start to perform a pre-charge operation.

As described with reference to FIGS. 37 and 38, the active operation of the even memory banks BK0, BK2, . . . , and BK14, the first even MAC operation of the first to eighth MAC operators MAC0-MAC7, the pre-charge operation of the even memory banks BK0, BK2, . . . , and BK14, the active operation of the even memory banks BK0, BK2, . . . , and BK14, the second even MAC operation of the first to eighth MAC operators MAC0-MAC7, and the pre-charge operation of the even memory banks BK0, BK2, . . . , and BK14 may be sequentially performed. Similarly, the active operation of the odd memory banks BK1, BK3, . . . , and BK15, the first odd MAC operation of the first to eighth MAC operators MAC0-MAC7, the pre-charge operation of the odd memory banks BK1, BK3, . . . , and BK15, the active operation of the odd memory banks BK1, BK3, . . . , and BK15, the second odd MAC operation of the first to eighth MAC operators MAC0-MAC7, and the pre-charge operation of the odd memory banks BK1, BK3, . . . , and BK15 may be sequentially performed.

The active operation on the even memory banks BK0, BK2, . . . , and BK14 may be started while the first to eighth MAC operators MAC0-MAC7 perform the odd MAC operations. Specifically, the even memory banks BK0, BK2, . . . , and BK14 may start to perform the active operation at the sixth time point T6 between the fourth time point T4 when the first to eighth MAC operators MAC0-MAC7 start to perform the first sub-MAC operation of the first odd MAC operation and the seventh time point T7 when the first to eighth MAC operators MAC0-MAC7 start to perform the fourth sub-MAC operation of the first odd MAC operation. Similarly, the active operation on the odd memory banks BK1, BK3, . . . , and BK15 may be performed while the first to eighth MAC operators MAC0-MAC7 perform the even MAC operations. Specifically, the odd memory banks BK1, BK3, . . . , and BK15 may perform the active operation within a time period between the first time point T1 and the fourth time point T4 when the first to eighth MAC operators MAC0-MAC7 perform the first sub-MAC operation to the fourth sub-MAC operation of the first even MAC operation. In addition, the odd memory banks BK1, BK3, . . . , and BK15 may perform the active operation during the ninth time point T9 to the twelfth time point T12 when the first to the eighth MAC operators MAC0-MAC7 perform the first sub-MAC operation to the fourth sub-MAC operation of the second even MAC operation.

The even memory banks BK0, BK2, . . . , and BK14 may perform the pre-charge operation while the first to eighth MAC operators MAC0-MAC7 perform the odd MAC operation. Specifically, the even memory banks BK0, BK2, . . . , and BK14 may perform a pre-charge operation within a time period between the fourth time point T4 and the seventh time point T7 when the first to eighth MAC operators MAC0-MAC7 start to perform the first sub-MAC operation to fourth sub-operation of the first odd MAC operation. In addition, the even memory banks BK0, BK2, . . . , and BK14 may perform the pre-charge operation within a time period between the twelfth time point T12 and the fourteenth time point T14 when the first to eighth MAC operators MAC0-MAC7 start to perform the first sub-MAC operation to the fourth sub-MAC operation of the second odd MAC operation. The pre-charge operation on the odd memory banks BK1, BK3, . . . , and BK15 may be started before the first to eighth MAC operators MAC0-MAC7 perform the even MAC operation and be completed before the even MAC operation is completed. Specifically, the odd memory banks BK1, BK3, . . . , and BK15 may start the pre-charge operation at the eighth time point T8 before the ninth time point T9 when the first to eighth MAC operators MAC0-MAC7 perform the first sub-MAC operation of the second even MAC operation, and may finish the pre-charge operation at the tenth time point T10 when the second sub-MAC operation of the second even MAC operation is being performed. That is, the pre-charge operation on the odd memory banks BK1, BK3, . . . , and BK15 may start to be performed before the time point when the active operation on the even memory banks BK0, BK2, . . . , and BK14 is completed.

The even MAC operation in the first to eighth MAC operators MAC0-MAC7 may be performed during the pre-charge operation and the active operation on the odd memory banks BK1 BK3, . . . , and BK15 are performed. Specifically, the first to eighth MAC operators MAC0-MAC7 may start to perform the first even MAC operation at the first time point T1 when the odd memory banks BK1, BK3, . . . , and BK15 are in an idle state, and complete the first even MAC operation by the fourth time point T4 when the active operation on the odd memory banks BK1, BK3, . . . , and BK15 is completed. In addition, the first to eighth MAC operators MAC0-MAC7 may start to perform the second even MAC operation at the ninth time point T9 when the odd memory banks BK1, BK3, . . . , and BK15 are in an idle state, and complete the second even MAC operation by the twelfth time point T12 when the active operation on the odd memory banks BK1, BK3, . . . , and BK15 is completed.

The odd MAC operation in the first to eighth MAC operators MAC0-MAC7 may be started after the even MAC operation is completed and may be performed during the pre-charge operation and the active operation of the even memory banks BK0, BK2, . . . , and BK14 are performed. Specifically, the first to eighth MAC operators MAC0-MAC7 may start to perform the first odd MAC operation at the fourth time point T4 when the first even MAC operation is completed and may complete the first odd MAC operation before the ninth time point T9 when the active operation on the even memory banks BK0, BK2, . . . , and BK14 is competed. In addition, the first to eighth MAC operators MAC0-MAC7 may start to perform the second odd MAC operation at the twelfth time point T12 when the second even MAC operation is completed.

Figure 39:
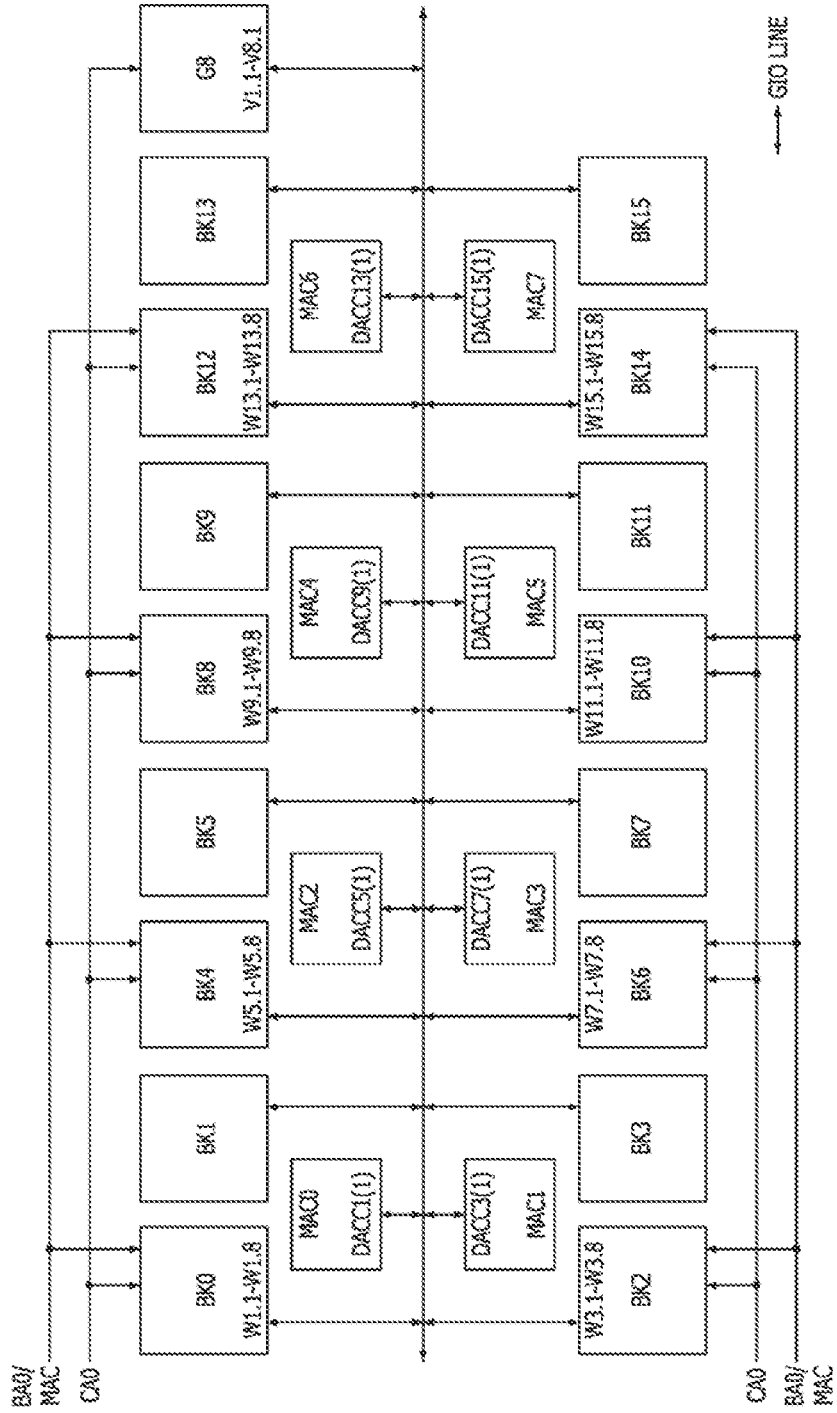
FIG. 39 is a diagram illustrating a first sub-MAC operation of a first even MAC operation in the PIM device of FIG. 31.

FIGS. 39 to 61 are diagrams illustrating the operations of the PIM device 600 described with reference to FIGS. 37 and 38. First, referring to FIG. 39 together with FIGS. 31 to 38, a command/address decoder (610 of FIG. 31) of the PIM device 600 may generate a MAC control signal MAC, a first bank address signal BA0, and a first column address signal CA0 at the first time point T1 to transmit them to the memory banks BK0-BK15. The first column address signal CA0 may also be transmitted to the global buffer GB. The even memory banks BK0, BK2, . . . , and BK14 selected by the first bank address signal BA0 may transmit a MAC clock signal to the first to eighth MAC operators MAC0-MAC7 in response to the MAC control signal MAC. The even memory banks BK0, BK2, . . . , and BK14 may transmit the weight data W1.1-W1.8, W3.1-W3.8, W5.1-W5.8, W7.1-W7.8, W9.1-W9.8, W11.1-W11.8, W13.1-W13.8, and W15.1-W15.8 of the first column to eighth column of the first row, third row, fifth row, seventh row, ninth row, eleventh row, thirteenth row, and fifteenth row of the weight matrix selected by the first column address signal CA0 to the first to eighth MAC operators MAC0-MAC7, respectively. The global buffer GB may transmit the vector data V1.1-V8.1 of the first row to the eighth row of the first column of the vector matrix selected by the first column address signal CA0 to the first to eighth MAC operators MAC0-MAC7. The first to eighth MAC operators MAC0-MAC7 may perform the first sub-MAC operation of the first even MAC operation using the weight data of the first column to the eighth column of the weight matrix and the vector data of the first row to the eighth row of the vector matrix. The first to eighth MAC operators MAC0-MAC7 may generate first first, third, . . . , and fifteenth accumulation data DACC1(1), DACC3(1), . . . , and DACC15(1) as a result of the first sub-MAC operation of the first even MAC operation.

Figure 40:
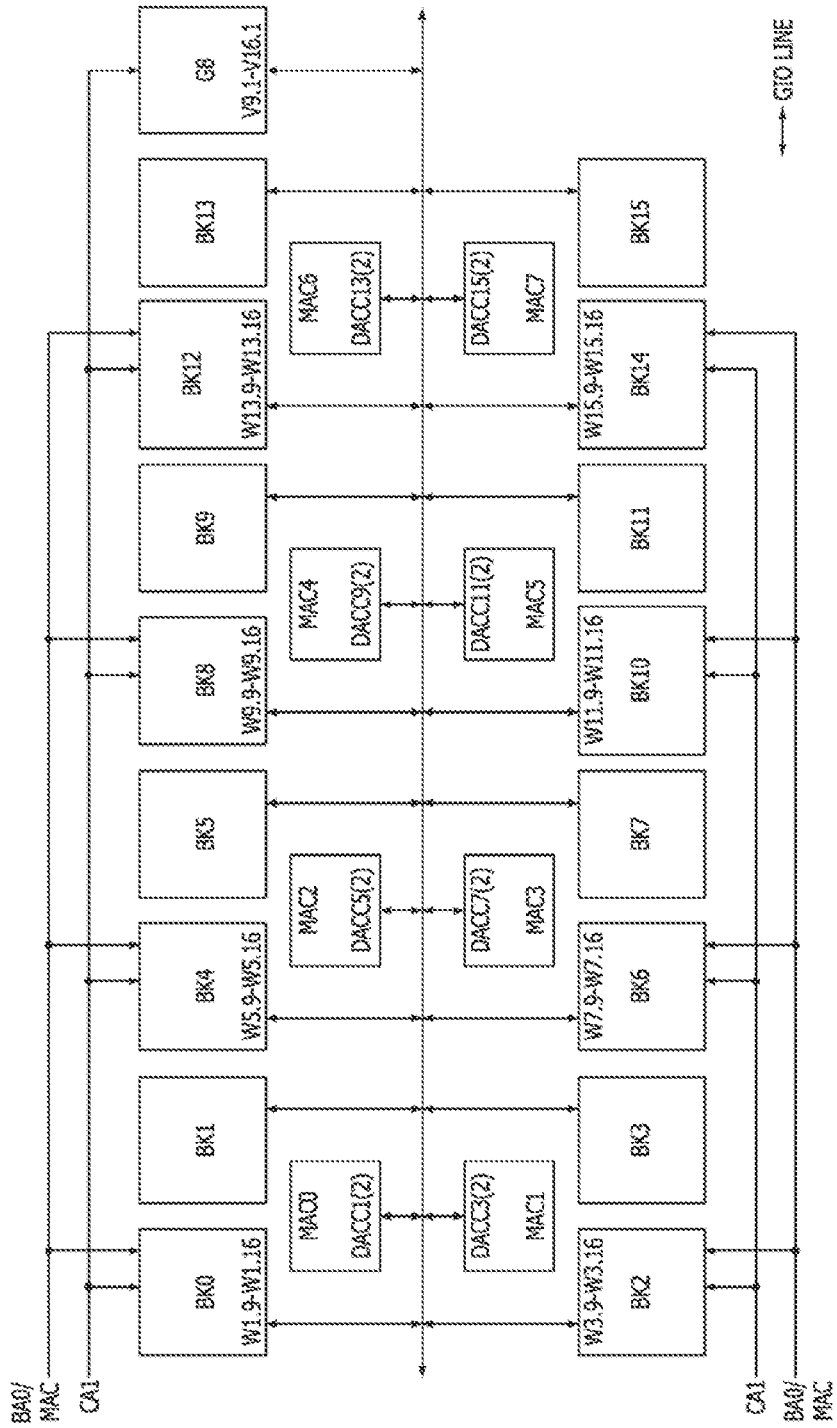
FIG. 40 is a diagram illustrating a second sub-MAC operation of the first even MAC operation in the PIM device of FIG. 31.

Next, referring to FIG. 40 together with FIGS. 31 to 38, the command/address decoder (610 of FIG. 31) of the PIM device 600 may generate a MAC control signal MAC, a first bank address signal BA0, and a second column address signal CA1 to the memory banks BK0-BK15 at a time point when the first sub-MAC operation of the first even MAC operation is completed. The second column address signal CA1 may also be transmitted to the global buffer GB. The even memory banks BK0, BK2, . . . , and BK14 selected by the first bank address signal BA0 may transmit a MAC clock signal to the first to eighth MAC operators MAC0-MAC7 in response to the MAC control signal MAC. The even memory banks BK0, BK2, . . . , and BK14 may transmit the weight data W1.9-W1.16, W3.9-W3.16, W5.9-W5.16, W7.9-W7.16, W9.9-W9.16, W11.9-W11.16, W13.9-W13.16, and W15.9-W15.16 of the ninth column to the sixteenth column of the first row, third row, fifth row, seventh row, ninth row, eleventh row, thirteenth row, and fifteenth row of the weight matrix selected by the second column address signal CA1 to the first to eighth MAC operators MAC0-MAC7, respectively. The global buffer GB may transmit the vector data V9.1-V16.1 of the ninth row to the sixteenth row of the first column of the vector matrix selected by the second column address signal CA1 to the first to eighth MAC operators MAC0-MAC7. The first to eighth MAC operators MAC0-MAC7 may perform the second sub-MAC operation of the first even MAC operation using the weight data of the ninth column to the sixteenth column of the weight matrix and the vector data of the ninth row to the sixteenth row of the vector matrix. The first to eighth MAC operators MAC0-MAC7 may generate second first, third, . . . , and fifteenth accumulation data DACC1(2), DACC3(2), . . . , and DACC15(2) as a result of the second sub-MAC operation of the first even MAC operation.

Figure 41:
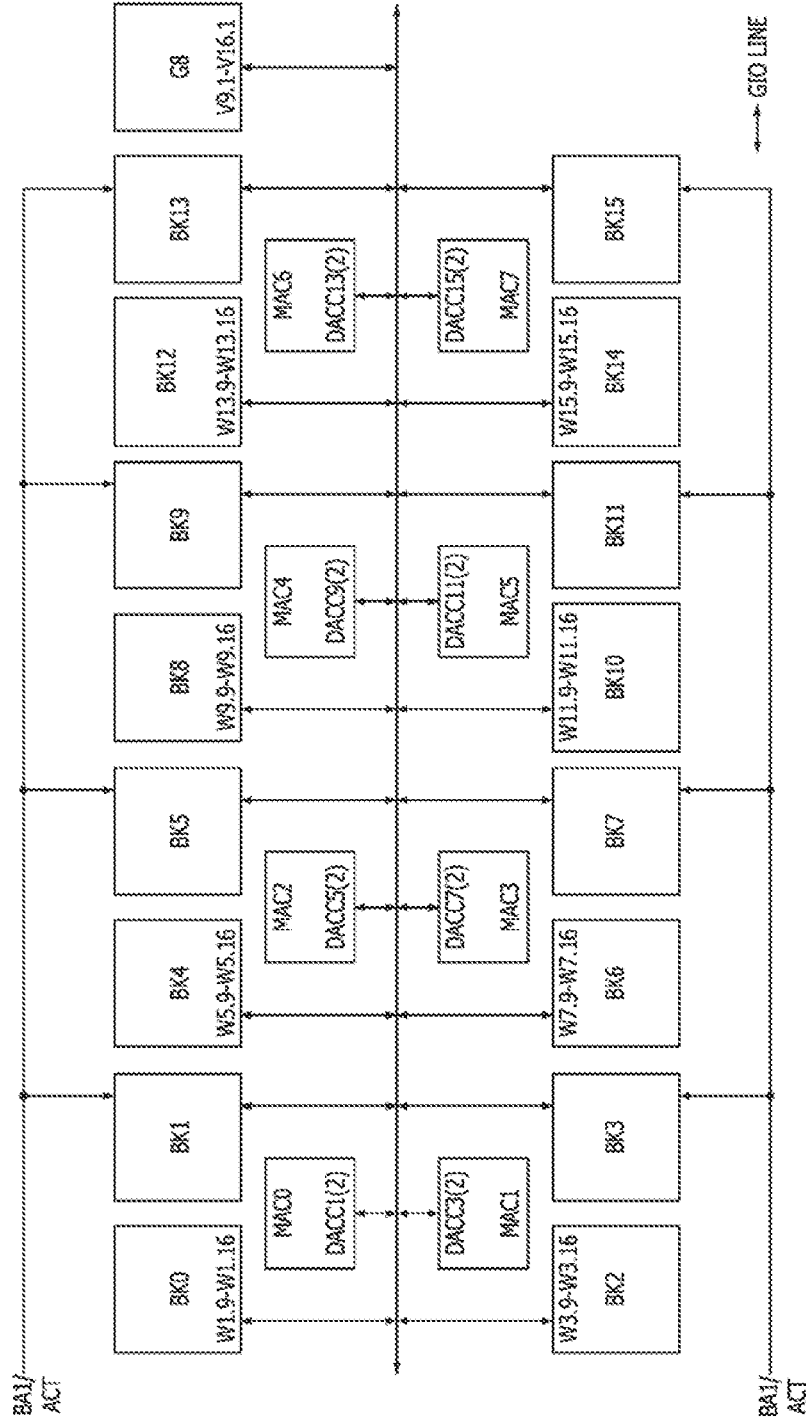
FIG. 41 is a diagram illustrating an active operation for a first odd MAC operation on even memory banks in the PIM device of FIG. 31.

Next, referring to FIG. 41 together with FIGS. 31 to 38, at the second time point T2 when the second sub-MAC operation of the first even MAC operation is being performed in the first to eighth MAC operators MAC0-MAC7, the command/address decoder (610 of FIG. 31) of the PIM device 600 may generate an active control signal ACT and a second bank address signal BA1 to transmit them to the memory banks BK0-BK15. Although not illustrated in FIG. 41, the command/address decoder 610 may transmit a first row address signal designating the first row (ROW0 in FIG. 34) together with the active control signal ACT to the memory banks BK0-BK15. At the second time point T2, the odd memory banks BK1, BK3, . . . , and BK15 selected by the second bank address signal BA1 may start to perform an active operation in response to the active control signal ACT. As described with reference to FIG. 37, the active operation on the odd memory banks BK1, BK3, . . . , and BK15 may be completed at the fourth time point T4 when the first even MAC operation is completed.

Figure 42:
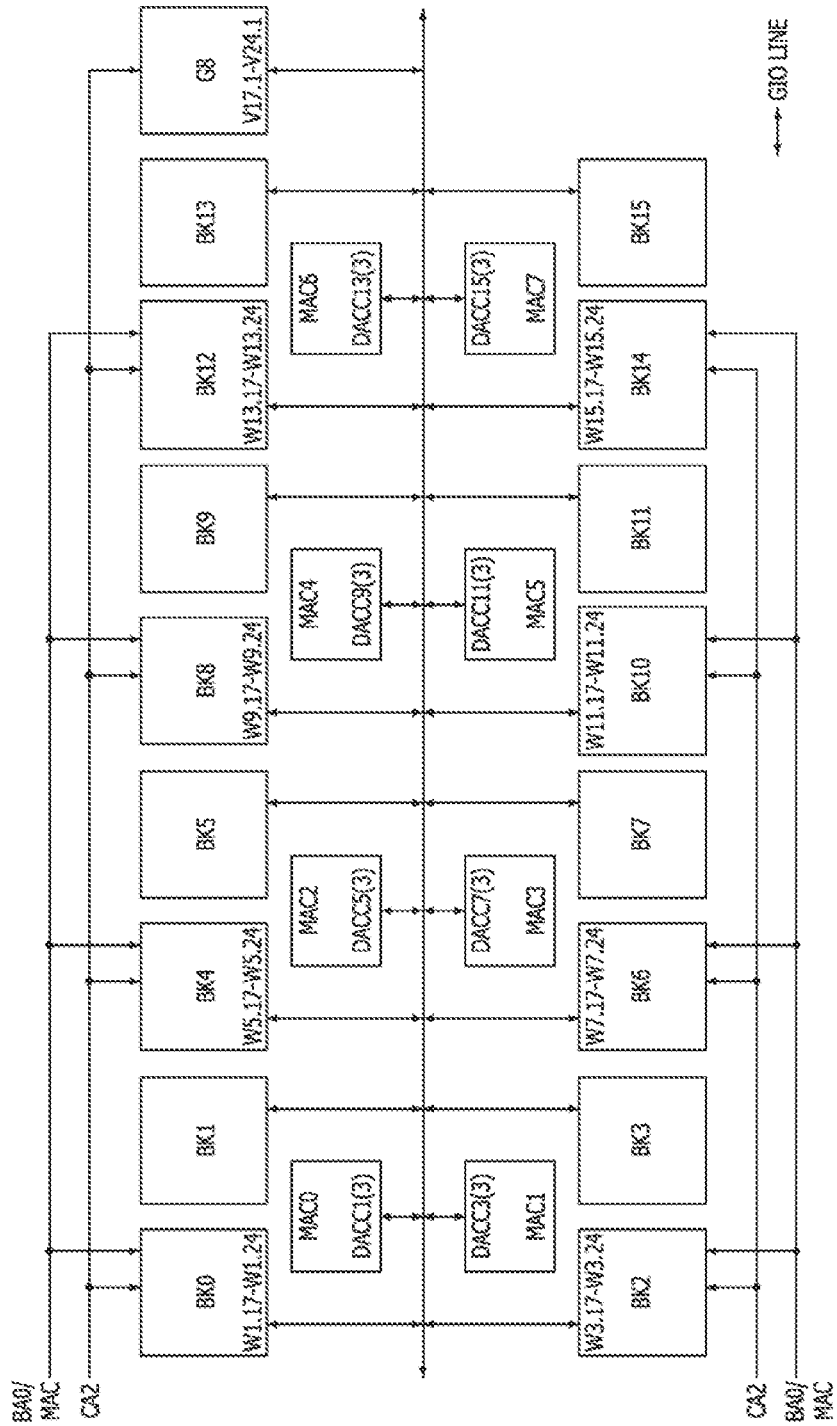
FIG. 42 is a diagram illustrating a third sub-MAC operation of the first even MAC operation in the PIM device of FIG. 31.

Next, referring to FIG. 42 together with FIGS. 31 to 38, at a time point when the second sub-MAC operation of the first even MAC operation is completed, the command/address decoder (610 of FIG. 31) of the PIM device 600 may generate a MAC control signal MAC, a first bank address signal BK0, and a third column address signal CA2 to transmit them to the memory banks BK0-BK15. The third column address signal CA2 may also be transmitted to the global buffer GB. The even memory banks BK0, BK2, . . . , and BK14 selected by the first bank address signal BA0 may transmit a MAC clock signal to the first to eighth MAC operators MAC0-MAC7 in response to the MAC control signal MAC. The even memory banks BK0, BK2, . . . , and BK14 may transmit the weight data W1.17-W1.24, W3.17-W3.24, W5.17-W5.24, W7.17-W7.24, W9.17-W9.24, W11.17-W11.24, W13.17-W13.24, and W15.17-W15.24 of the $17^{th}$ column to $24^{th}$ column of the first row, third row, fifth row, seventh row, ninth row, eleventh row, thirteenth row, and fifteenth row of the weight matrix selected by the third column address signal CA2 to the first to eighth MAC operators MAC0-MAC7, respectively. The global buffer GB may transmit the vector data V17.1-V24.1 of the $17^{th}$ row to the $24^{th}$ row of the vector matrix selected by the third column address signal CA2 to the first to eighth MAC operators MAC0-MAC7. The first to eighth MAC operators MAC0-MAC7 may perform a third sub-MAC operation of the first even MAC operation using the weight data of the $17^{th}$ column to the $24^{th}$ column of the weight matrix and the vector data of the $17^{th}$ row to the $24^{th}$ row of the vector matrix. The first to eighth MAC operators MAC0-MAC7 may generate third first, third, . . . , and fifteenth accumulation data DACC1(3), DACC3(3), . . . , and DACC15(3) as a result of the third sub-MAC operation of the first even MAC operation.

Figure 43:
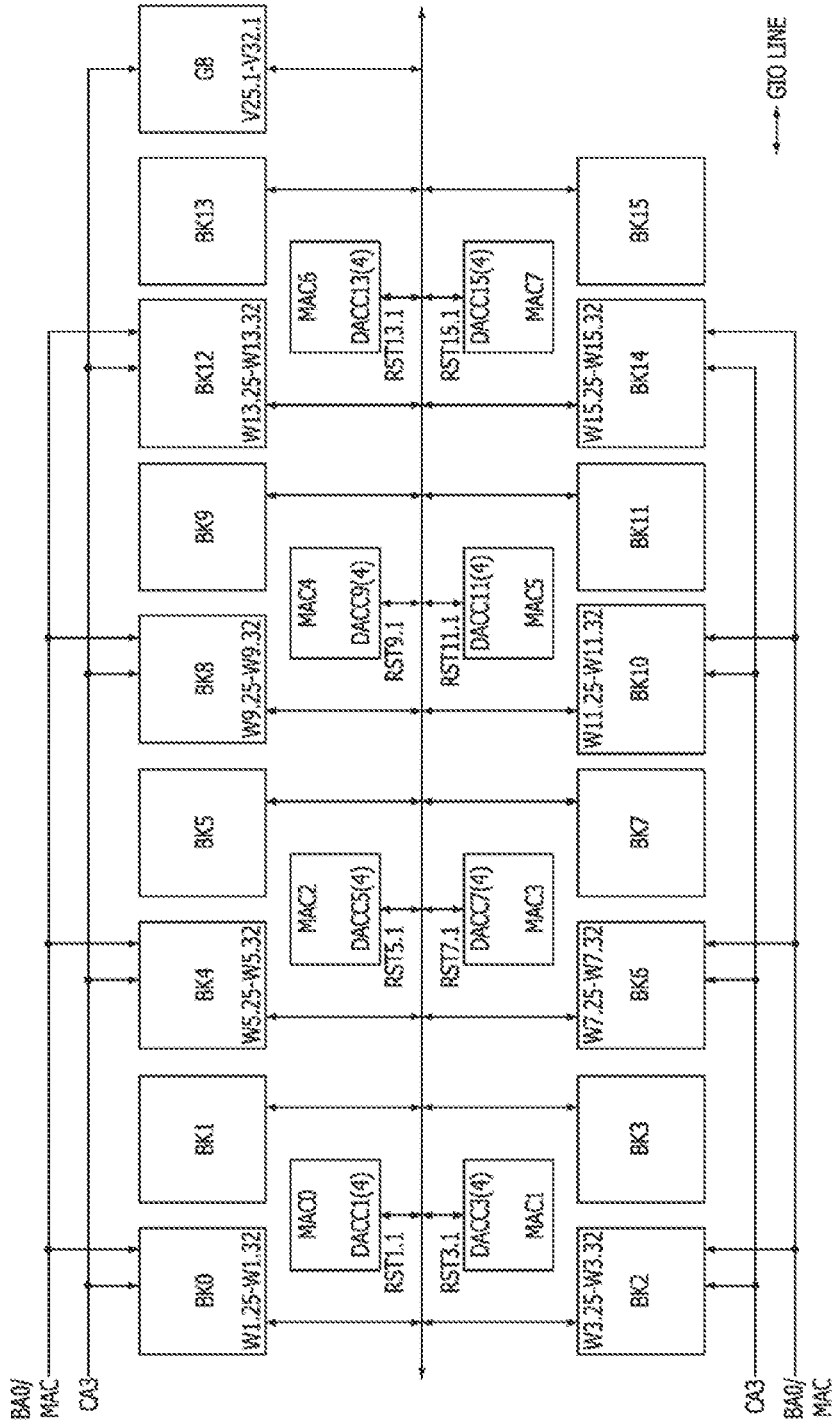
FIG. 43 is a diagram illustrating a fourth sub-MAC operation of the first even MAC operation in the PIM device of FIG. 31.

Next, referring to FIG. 43 together with FIGS. 31 to 38, at the third time point T3 when the third sub-MAC operation of the first even MAC operation is completed, the command/address decoder (610 of FIG. 31) of the PIM device 600 may generate a MAC control signal MAC, a first bank address signal BK0, and a fourth column address signal CA3 to transmit them to the memory banks BK0-BK15. The fourth column address signal CA3 may also be transmitted to the global buffer GB. The even memory banks BK0, BK2, . . . , and BK14 selected by the first bank address signal BA0 may transmit a MAC clock signal to the first to eighth MAC operators MAC0-MAC7, respectively, in response to the MAC control signal MAC. The even memory banks BK0, BK2, . . . , and BK14 may transmit the weight data W1.25-W1.32, W3.25-W3.32, W5.25-W5.32, W7.25-W7.32, W9.25-W9.32, W11.25-W11.32, W13.25-W13.32, and W15.25-W15.32 of the $25^{th}$ column to the $32^{nd}$ column of the first row, third row, fifth row, seventh row, ninth row, eleventh row, thirteenth row, and fifteenth row of the weight matrix selected by the fourth column address signal CA3 to the first to eighth MAC operators MAC0-MAC7, respectively. The global buffer GB may transmit the vector data V25.1-V32.1 of the $25^{th}$ row to the $32^{nd}$ row of the first column of the vector matrix selected by the fourth column address signal CA3 to the first to eighth MAC operators MAC0-MAC7. The first to eighth MAC operators MAC0-MAC7 may perform a fourth sub-MAC operation of the first even MAC operation using the weight data of the $25^{th}$ column to the $32^{nd}$ column of the weight matrix and the vector data of the $25^{th}$ row to the $32^{nd}$ row of the vector matrix. The first to eighth MAC operators MAC0-MAC7 may generate fourth first, third, . . . , and fifteenth accumulation data DACC1(4), DACC3(4), . . . , and DACC15(4) as a result of the fourth sub-MAC operation of the first even MAC operation. As all the first even MAC operation is completed, the fourth first, third, . . . , and fifteenth accumulation data DACC1(4), DACC3(4), . . . , and DACC15(4) may be output from the first to eighth MAC operators MAC0-MAC7 as MAC result data RST1.1, RST3.1, RST5.1, . . . , and RST15.1 of the first row, third row, fifth row, . . . , and the fifteenth row of a first column of a result matrix, respectively.

Figure 44:
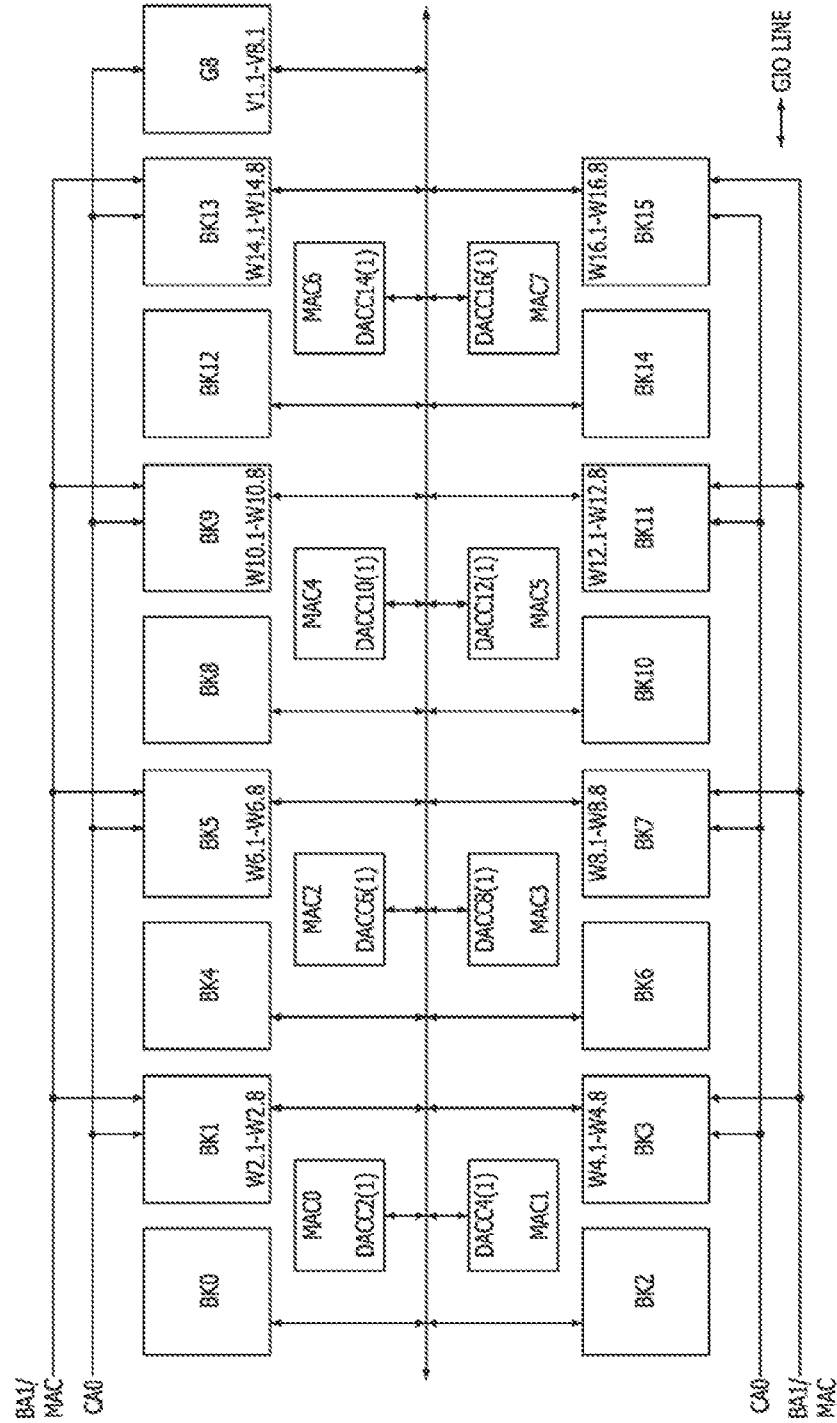
FIG. 44 is a diagram illustrating a first sub-MAC operation of a first odd MAC operation in the PIM device of FIG. 31.

Next, referring to FIG. 44 together with FIGS. 31 to 38, at the fourth time point T4 when the first even MAC operation is completed and the active operation on the odd memory banks BK1, BK3, . . . , and BK15 are also completed, the command/address decoder (610 of FIG. 31) of the PIM device 600 may generate a MAC control signal MAC, a second bank address signal BA1, and a first column address signal CA0 to transmit them to the memory banks BK0-BK15. The first column address signal CA0 may also be transmitted to the global buffer GB. The odd memory banks BK1, BK3, . . . , and BK15 selected by the second bank address signal BA1 may transmit a MAC clock signal to the first to eighth MAC operators MAC0-MAC7 in response to the MAC control signal MAC, respectively. The odd memory banks BK1, BK3, . . . , and BK15 may transmit the weight data W2.1-W2.8, W4.1-W4.8, W6.1-W6.8, W8.1-W8.8, W10.1-W10.8, W12.1-W12.8, W14.1-W14.8, and W16.1-W16.8 of the first column to the eighth column of the second row, fourth row, sixth row, eighth row, tenth row, twelfth row, fourteenth row, and sixteenth row of the weight matrix selected by the first column address signal CA0 to the first to eighth MAC operators MAC0-MAC7, respectively. The global buffer GB may transmit the vector data V1.1-V8.1 of the first row to the eighth row of the first column of the vector matrix selected by the first column address signal CA0 to the first to eighth MAC operators MAC0-MAC7. The first to eighth MAC operators MAC0-MAC7 may perform a first sub-MAC operation of the first odd MAC operation using the weight data of the first column to the eighth column of the weight matrix and the vector data of the first row to the eighth row of the vector matrix. The first to eighth MAC operators MAC0-MAC7 may generate first second, fourth, . . . , and sixteenth accumulation data DACC2(1), DACC4(1), . . . , and DACC16(1) as a result of the first sub-MAC operation of the first odd MAC operation.

Figure 45:
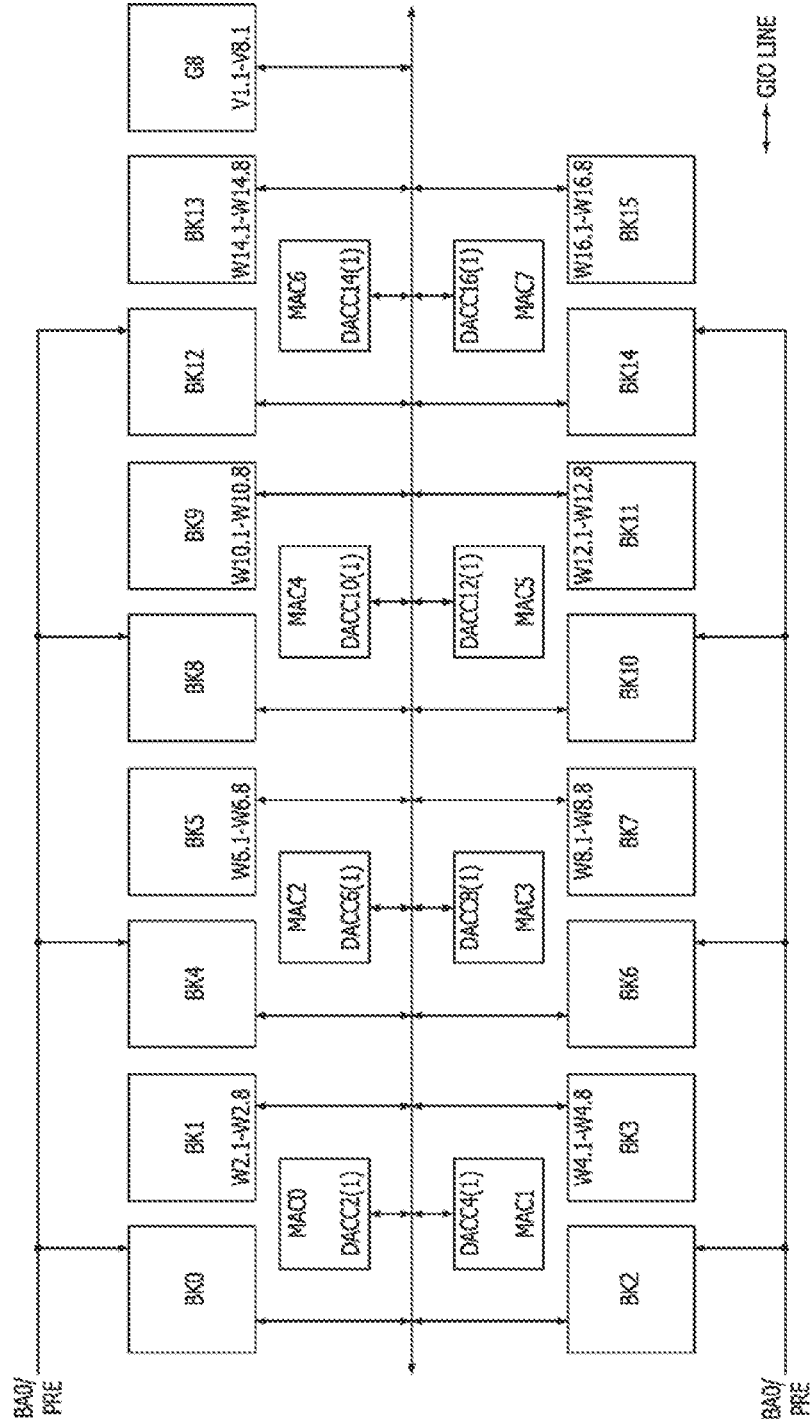
FIG. 45 is a diagram illustrating a pre-charge operation after completion of the first even MAC operation on the even memory banks in the PIM device of FIG. 31.

Next, referring to FIG. 45 together with FIGS. 31 to 38, at the fifth time point T5 when the first sub-MAC operation of the first odd MAC operation in the first to eighth MAC operators MAC0-MAC7 is being performed, the command/address decoder (610 of FIG. 31) of the PIM device 600 may generate a pre-charge control signal PRE and a first bank address signal BA0 to transmit them to the memory banks BK0-BK15. Although not illustrated in FIG. 45, the command/address decoder 610 may transmit a first row address signal designating a first row (ROW0 of FIG. 34) to the memory banks BK0-BK15 together with the pre-charge control signal PRE. At the fifth time point T5, the even memory banks BK0, BK2, . . . , and BK14 selected by the first bank address signal BA0 may start to perform a pre-charge operation in response to the pre-charge control signal PRE. As described with reference to FIG. 37, the pre-charge operation on the even memory banks BK0, BK2, . . . , and BK14 may be completed at the sixth time point T6 when the first odd MAC operation is in progress.

Figure 46:
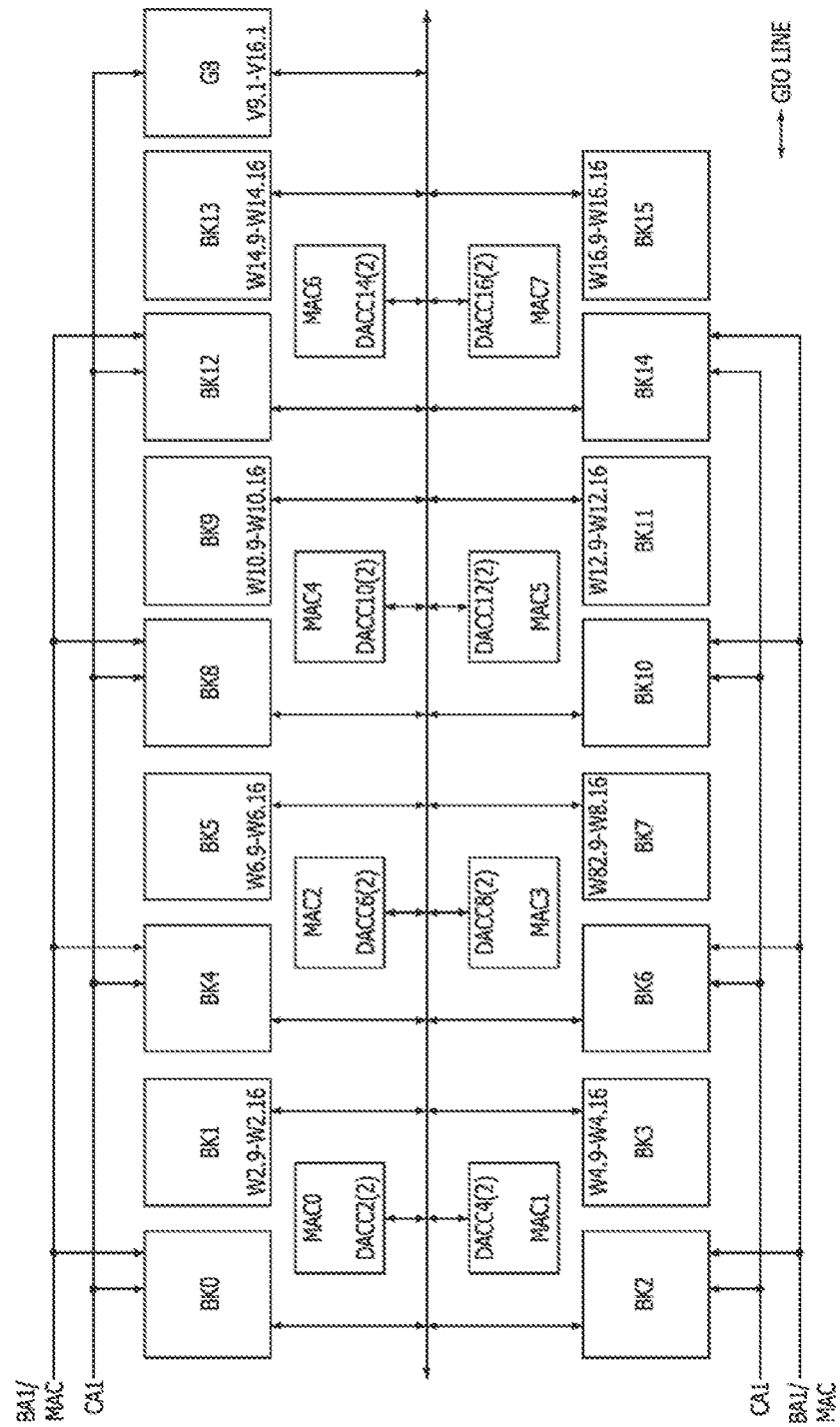
FIG. 46 is a diagram illustrating a second sub-MAC operation of the first odd MAC operation in the PIM device of FIG. 31.

Next, referring to FIG. 46 together with FIGS. 31 to 38, at a time point when the first sub-MAC operation of the first odd MAC operation is completed, the command/address decoder (610 of FIG. 31) of the PIM device 600 may generate a MAC control signal MAC, a second bank address signal BA1, and a second column address signal CA1 to transmit them to the memory banks BK0-BK15. The second column address signal CA1 may also be transmitted to the global buffer GB. The odd memory banks BK1, BK3, . . . , and BK15 selected by the second bank address signal BA1 may transmit a MAC clock signal to the first to eighth MAC operators MAC0-MAC7, respectively, in response to the MAC control signal MAC. The odd memory banks BK1, BK3, . . . , and BK15 may transmit the weight data W2.9-W2.16, W4.9-W4.16, W6.9-W6.16, W8.9-W8.16, W10.9-W10.16, W12.9-W12.16, W14.9-W14.16, and W16.9-W16.16 of the ninth column to the sixteenth column of the second row, fourth row, sixth row, eighth row, tenth row, twelfth row, fourteenth row, and sixteenth row of the weight matrix selected by the second column address signal CA1 to the first to eighth MAC operators MAC0-MAC7, respectively. The global buffer GB may transmit the vector data V9.1-V16.1 of the ninth row to the sixteenth row of the first column of the vector matrix selected by the second column address signal CA1 to the first to eighth MAC operators MAC0-MAC7. The first to eighth MAC operators MAC0-MAC7 may perform a second sub-MAC operation of the first odd MAC operation using the weight data of the ninth column to the sixteenth column of the weight matrix and the vector data of the ninth row to the sixteenth row of the vector matrix. The first to eighth MAC operators MAC0-MAC7 may generate second second, fourth, . . . , and sixteenth accumulation data DACC2(2), DACC4(2), . . . , DACC16(2) as a result of the second sub-MAC operation of the first odd MAC operation.

Figure 47:
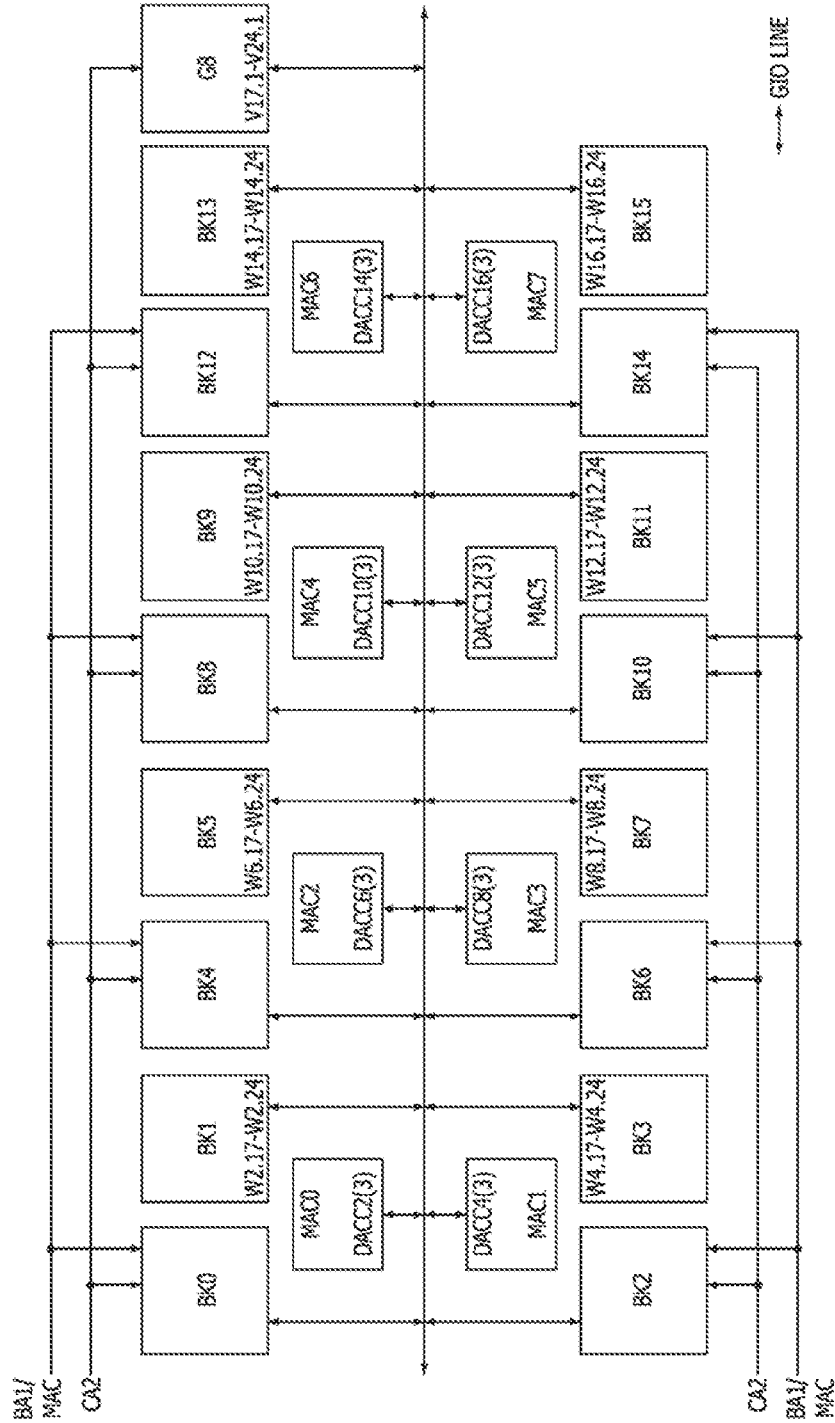
FIG. 47 is a diagram illustrating a third sub-MAC operation of the first odd MAC operation in the PIM device of FIG. 31.

Next, referring to FIG. 47 together with FIGS. 31 to 38, at a time point when the second sub-MAC operation of the first odd MAC operation is completed, the command/address decoder (610 of FIG. 31) of the PIM device 600 may generate a MAC control signal MAC, a second bank address signal BA1, and a third column address signal CA2 to transmit them to the memory banks BK0-BK15. The third column address signal CA2 may also be transmitted to the global buffer GB. The odd memory banks BK1, BK3, . . . , and BK15 selected by the second bank address signal BA1 may transmit a MAC clock signal to the first to eighth MAC operators MAC0-MAC7, respectively, in response to the MAC control signal MAC. The odd memory banks BK1, BK3, . . . , and BK15 may transmit the weight data W2.17-W2.24, W4.17-W4.24, W6.17-W6.24, W8.17-W8.24, W10.17-W10.24, W12.17-W12.24, W14.17-W14.24, and W16.17-W16.24 of the $17^{th}$ column to the $24^{th}$ column of the second row, fourth row, sixth row, eighth row, tenth row, twelfth row, fourteenth row, and sixteenth row of the weight matrix selected by the third column address signal CA2 to the first to eighth MAC operators MAC0-MAC7, respectively. The global buffer GB may transmit the vector data V17.1-V24.1 of the $17^{th}$ row to the $24^{th}$ row of the first column of the vector matrix selected by the third column address signal CA2 to the first to eighth MAC operators MAC0-MAC7. The first to eighth MAC operators MAC0-MAC7 may perform a third sub-MAC operation of the first odd MAC operation using the weight data of the $17^{th}$ column to the $24^{th}$ column of the weight matrix and the vector data of the $17^{th}$ row to the $24^{th}$ row of the vector matrix. The first to eighth MAC operators MAC0-MAC7 may generate third second, fourth, . . . , and sixteenth accumulation data DACC2(3), DACC4(3), . . . , and DACC16(3) as a result of the third sub-MAC operation of the first odd MAC operation.

Figure 48:
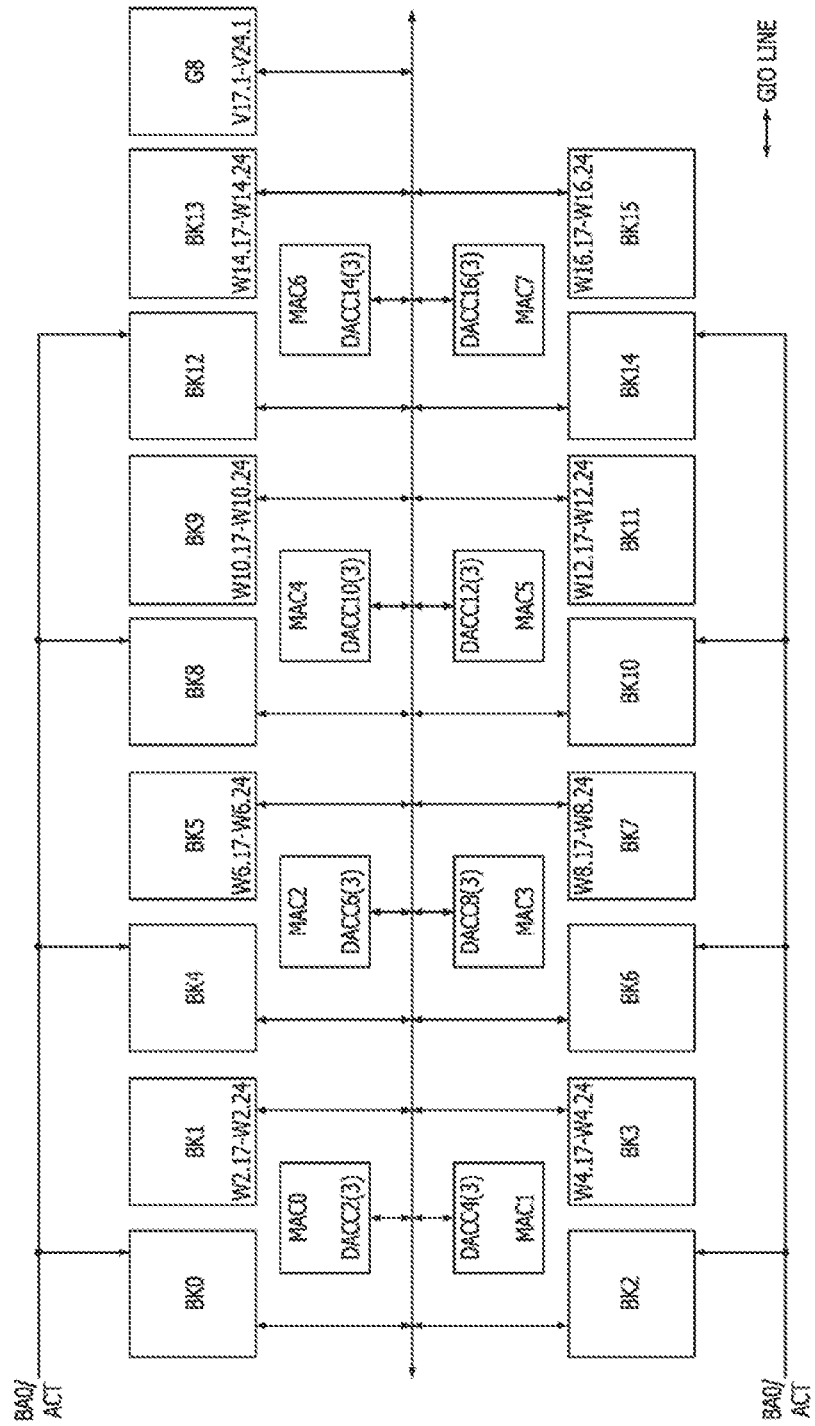
FIG. 48 is a diagram illustrating an active operation for a second even MAC operation on the even memory banks in the PIM device of FIG. 31.

Next, referring to FIG. 48 together with FIGS. 31 to 38, at the sixth time point T6 when the third sub-MAC operation of the first odd MAC operation in the first to eighth MAC operators MAC0-MAC7 is being performed, the command/address decoder (610 of FIG. 31) of the PIM device 600 may generate an active control signal ACT and a first bank address signal BA0 to transmit them to the memory banks BK0-BK15. Although not illustrated in FIG. 48, the command/address decoder 610 may transmit a second row address signal designating a second row (ROW1 of FIG. 34) to the memory banks BK0-BK15 together with the active control signal ACT. At the sixth time point T6, the even memory banks BK0, BK2, . . . , and BK14 selected by the first bank address signal BA0 may start to perform an active operation in response to the active control signal ACT. As described with reference to FIG. 37, the active operation on the even memory banks BK0, BK2, . . . , and BK14 may be completed at the ninth time point T9 after the first odd MAC operation is already completed.

Figure 49:
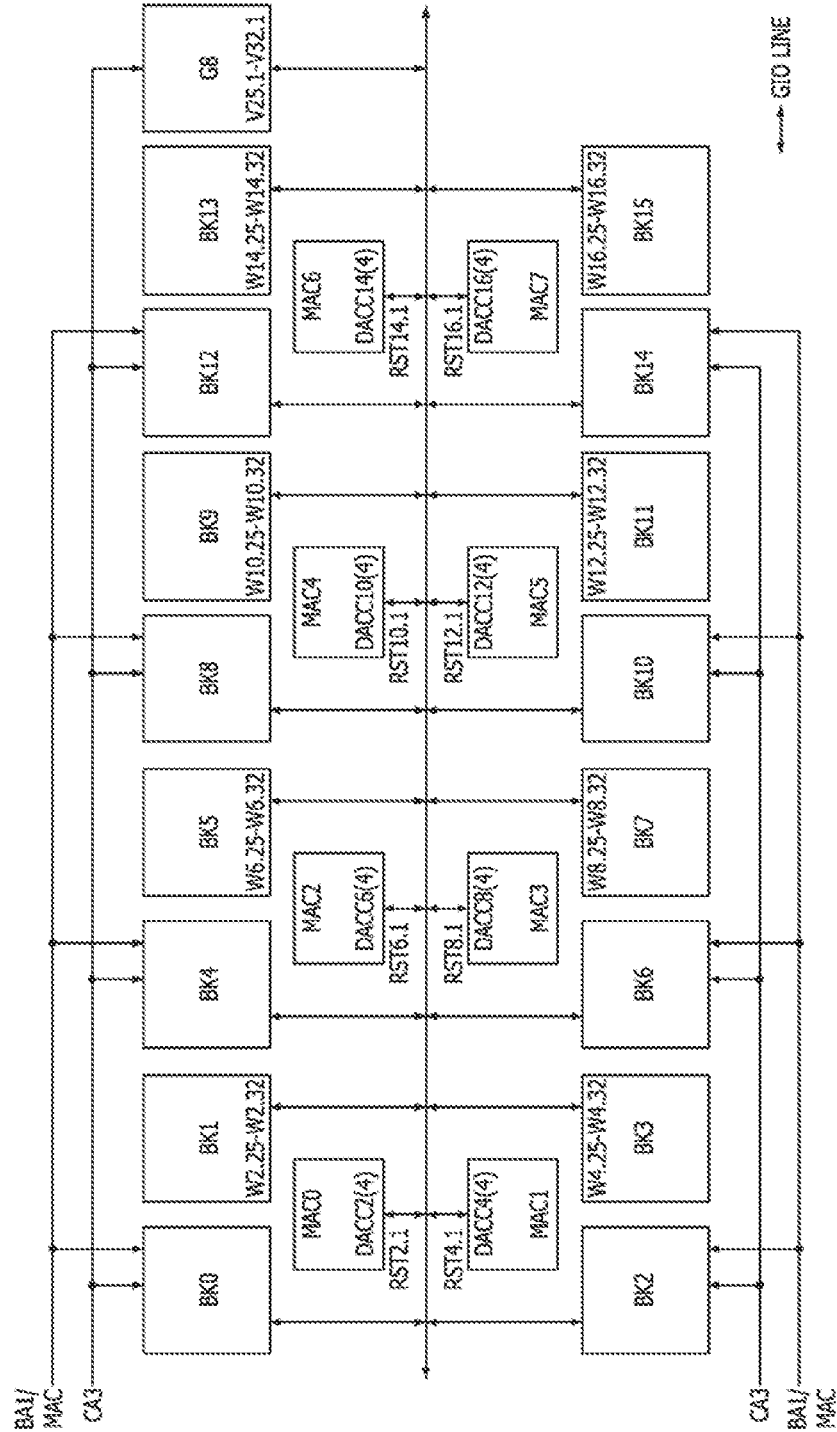
FIG. 49 is a diagram illustrating a fourth sub-MAC operation of the first odd MAC operation in the PIM device of FIG. 31.

Next, referring to FIG. 49 together with FIGS. 31 to 38, at the seventh time point T7 when the third sub-MAC operation of the first odd MAC operation is completed, the command/address decoder (610 of FIG. 31) of the PIM device 600 may generate a MAC control signal MAC, a second bank address signal BA1, and a fourth column address signal CA3 to transmit them to the memory banks BK0-BK15. The fourth column address signal CA3 may also be transmitted to the global buffer GB. The odd memory banks BK1, BK3, . . . , and BK15 selected by the second bank address signal BA1 may transmit a MAC clock signal to the first to eighth MAC operators MAC0-MAC7, respectively, in response to the MAC control signal MAC. The odd memory banks BK1, BK3, . . . , and BK15 may transmit the weight data W2.25-W2.32, W4.25-W4.32, W6.25-W6.32, W8.25-W8.32, W10.25-W10.32, W12.25-W12.32, W14.25-W14.32, and W16.25-W16.32 of the $25^{th}$ column to the $32^{nd}$ column of the second row, fourth row, sixth row, eighth row, tenth row, twelfth row, fourteenth row, and sixteenth row of the weight matrix selected by the fourth column address signal CA3 to the first to eighth MAC operators MAC0-MAC7, respectively. The global buffer GB may transmit the vector data V25.1-V32.1 of the $25^{th}$ row to the $32^{nd}$ row of the first column of the vector matrix selected by the fourth column address signal CA3 to the first to eighth MAC operators MAC0-MAC7. The first to eighth MAC operators MAC0-MAC7 may perform a fourth sub-MAC operation of the first odd MAC operation using the weight data of the $25^{th}$ column to the $32^{nd}$ column of the weight matrix and the vector data of the $25^{th}$ row to the $32^{nd}$ row of the vector matrix. The first to eighth MAC operators MAC0-MAC7 may generate fourth second, fourth, . . . , and sixteenth accumulation data DACC2(4), DACC4(4), . . . , and DACC16(4) as a result of the fourth sub-MAC operation of the first odd MAC operation. As all the first odd MAC operation is completed, the fourth second, fourth, . . . , and sixteenth accumulation data DACC2(4), DACC4(4), . . . , and DACC16(4) may be output from the first to eighth MAC operators MAC0-MAC7, respectively, as MAC result data RST2.1, RST4.1, RST6.1, . . . , RST16.1 of a second row, fourth row, sixth row, eighth row, tenth row, twelfth row, fourteenth row, and sixteenth row of the first column of the result matrix.

Figure 50:
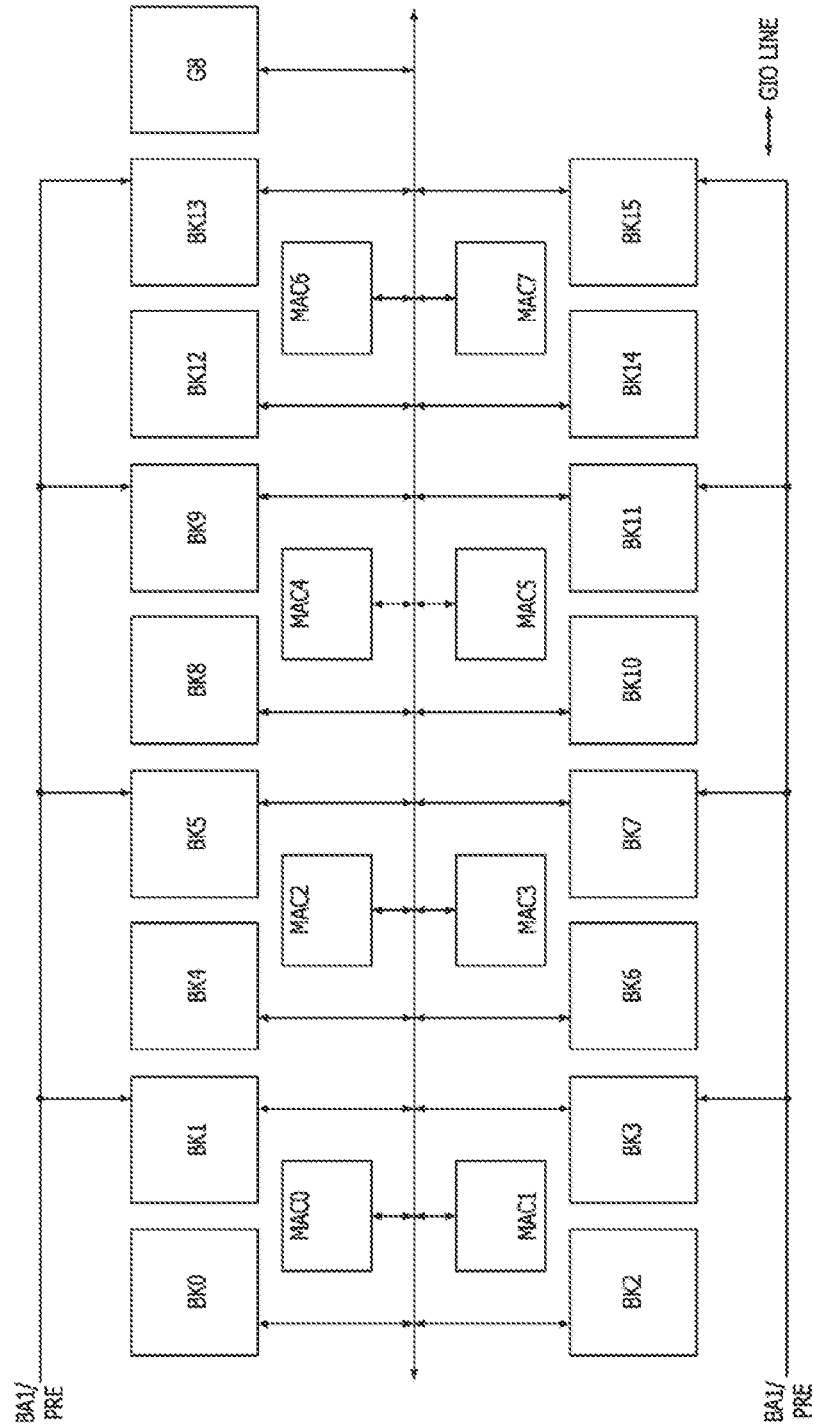
FIG. 50 is a diagram illustrating a pre-charge operation after completion of the first odd MAC operation on the odd memory banks in the PIM device of FIG. 31.

Next, referring to FIG. 50 together with FIGS. 31 to 38, at the eighth time point T8 after all the first odd MAC operation in the first to eighth MAC operators MAC0-MAC7 is completed, the command/address decoder (610 of FIG. 31) of the PIM device 600 may generate a pre-charge control signal PRE and a second bank address signal BA1 to transmit them to the memory banks BK0-BK15. Although not illustrated in FIG. 50, the command/address decoder 610 may transmit a first row address signal designating a first row (ROW0 of FIG. 34) to the memory banks BK0-BK15 together with the pre-charge control signal PRE. At the eighth time point T8, the odd memory banks BK1, BK3, . . . , and BK15 selected by the second bank address signal BA1 may start to perform a pre-charge operation in response to the pre-charge control signal PRE. As described with reference to FIG. 37, the pre-charge operation on the odd memory banks BK1, BK3, . . . , and BK15 may be completed at the tenth time point T10 while the second even MAC operation is in progress.

Figure 51:
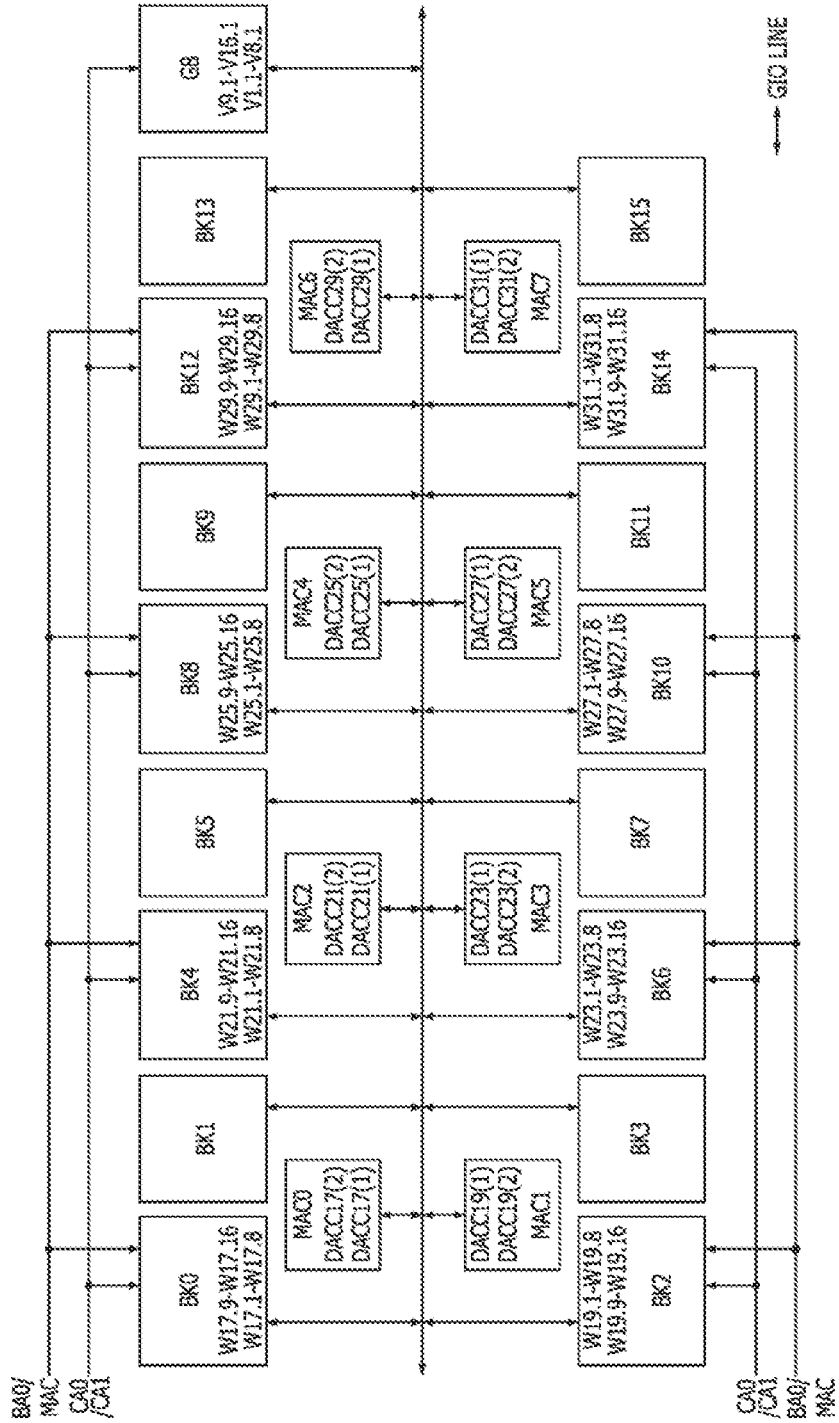
FIG. 51 is a diagram illustrating a first sub-MAC operation of a second even MAC operation in the PIM device of FIG. 31.

Next, referring to FIG. 51 together with FIGS. 31 to 38, at the ninth time point T9 when the active operation on the second row (ROW1 in FIG. 34) of the even memory banks BK0, BK2, . . . , and BK14 is completed and the pre-charge operation on the odd memory banks BK1, BK3, . . . , and BK15 is being performed, the first to eighth MAC operators MAC0-MAC7 may sequentially perform a first sub-MAC operation and a second sub-MAC operation of a second even MAC operation. The first sub-MAC operation of the second even MAC operation may be performed in the same manner as the first sub-MAC operation of the first even MAC operation described with reference to FIG. 39. For the first sub-MAC operation of the second even MAC operation, the even memory banks BK0, BK2, . . . , and BK14 may transmit the weight data W17.1-W17.8, W19.1-W19.8, W21.1-W21.8, W23.1-W23.8, W25.1-W25.8, W27.1-W27.8, W29.1-W29.8, and W31.1-W31.8 of the first column to the eighth column of the $17^{th}$ row, $19^{th}$ row, $21^{st}$ row, $23^{rd}$ row, $25^{th}$ row, $27^{th}$ row, $29^{th}$ row, and $31^{st}$ row of the weight matrix selected by a first column address signal CA0 to the first to eighth MAC operators MAC0-MAC7, respectively. The global buffer GB may transmit the vector data V1.1-V8.1 of the first row to the eighth row of the first column of the vector matrix selected by the first column address signal CA0 to the first to eighth MAC operators MAC0-MAC7. By the first sub-MAC operation of the second even MAC operation, the first to eighth MAC operators MAC0-MAC7 may generate first $17^{th}$, $19^{th}$, $21^{st}$, $23^{rd}$, $25^{th}$, $27^{th}$, and $31^{st}$ accumulation data DACC17(1), DACC19(1), and DACC31(1).

The second sub-MAC operation of the second even MAC operation may be performed in the same manner as the second sub-MAC operation of the first even MAC operation described with reference to FIG. 40. For the second sub-MAC operation of the second even MAC operation, the even memory banks BK0, BK2, . . . , and BK14 may transmit the weight data W17.9-W17.16, W19.9-W19.16, W21.9-W21.16, W23.9-W23.16, W25.9-W25.16, W27.9-W27.16, W29.9-W29.16, and W31.9-W31.16 of the ninth column to the sixteenth column of the $17^{th}$ row, $19^{th}$ row, $21^{st}$ row, $23^{rd}$ row, $25^{th}$ row, $27^{th}$ row, $29^{th}$ row, and $31^{st}$ row of the weight matrix selected by the second column address signal CA1 to the first to eighth MAC operators MAC0-MAC7, respectively. The global buffer GB may transmit the vector data V9.1-V16.1 of the ninth row to the sixteenth row of the first column of the vector matrix selected by the second column address signal CA1 to the first to eighth MAC operators MAC0-MAC7. By the second sub-MAC operation of the second even MAC operation, the first to eighth MAC operators MAC0-MAC7 may generate second $17^{th}$, $19^{th}$, $21^{st}$, $23^{rd}$, $25^{th}$, $27^{th}$, $29^{th}$, and $31^{st}$ accumulation data DACC17(2), DACC19(2), . . . , and DACC31(2).

Figure 52:
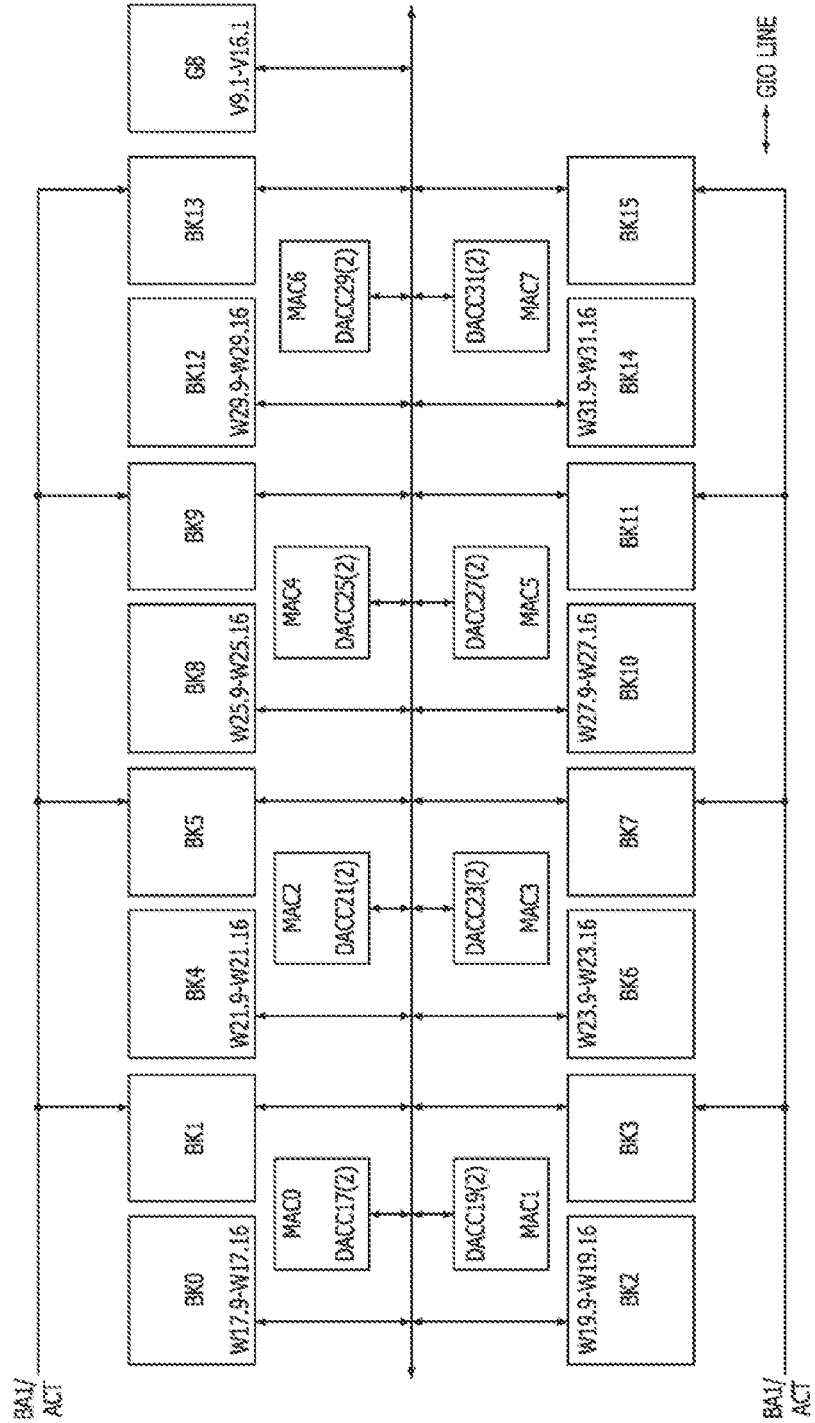
FIG. 52 is a diagram illustrating an active operation for a second odd MAC operation on the odd memory banks in the PIM device of FIG. 31.

Next, referring to FIG. 52 together with FIGS. 31 to 38, at the tenth time point T10 when the second sub-MAC operation of the second even MAC operation in the first to eighth MAC operators MAC0-MAC7 is being performed, the command/address decoder (610 of FIG. 31) of the PIM device 600 may generate an active control signal ACT and a second bank address signal BA1 to transmit them to the memory banks BK0-BK15. Although not illustrated in FIG. 52, the command/address decoder 610 may transmit a second row address signal designating a second row (ROW1 of FIG. 34) to the memory banks BK0-BK15 together with the active control signal ACT. At the tenth time point T10, the odd memory banks BK1, BK3, . . . , and BK15 selected by the second bank address signal BA1 may start to perform an active operation in response to the active control signal ACT. As described with reference to FIG. 37, the active operation on the odd memory banks BK1, BK3, . . . , and BK15 may be completed at the twelfth time point T12 when the second even MAC operation is completed.

Figure 53:
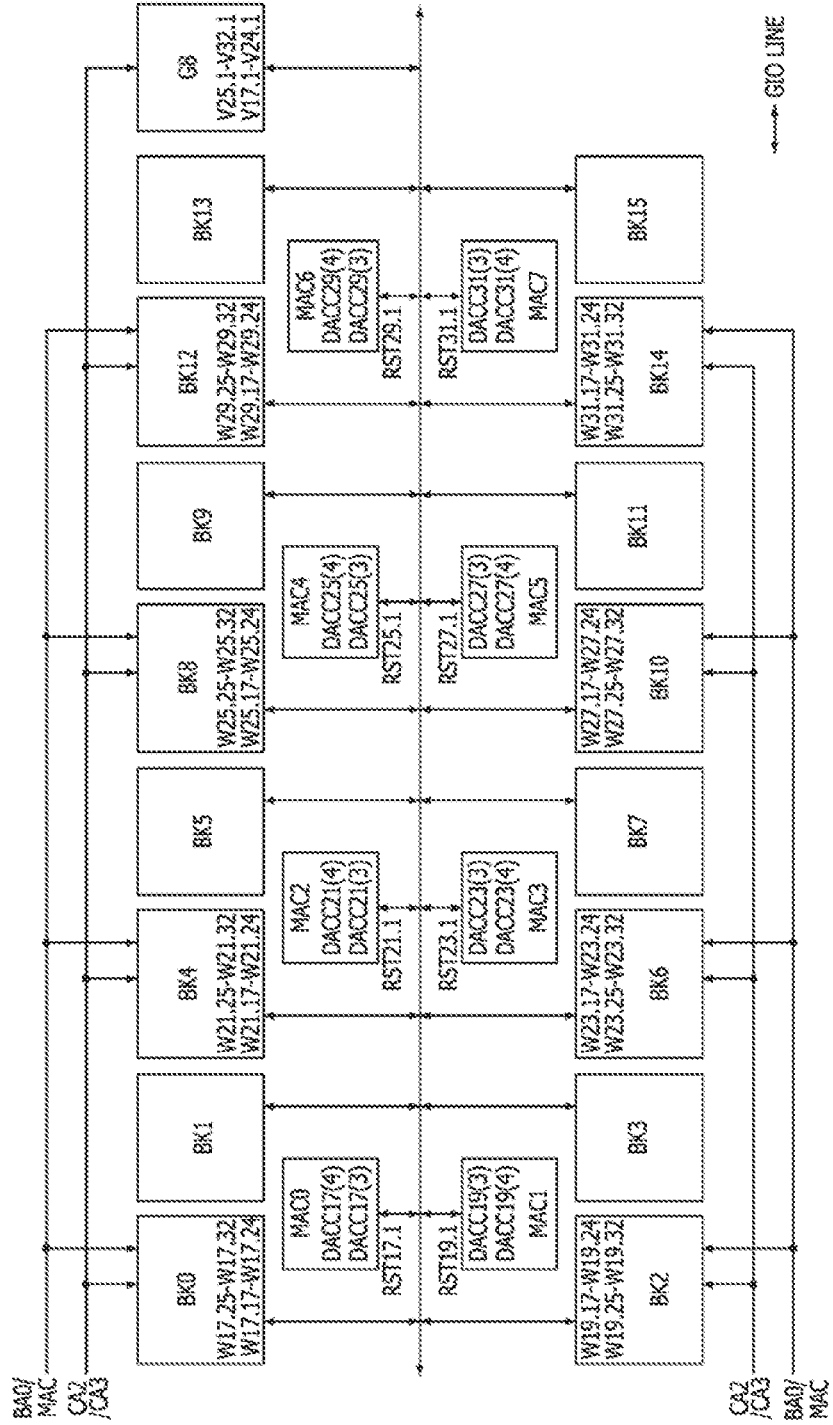
FIG. 53 is a diagram illustrating a second sub-MAC operation and a third sub-MAC operation of the second even MAC operation in the PIM device of FIG. 31.

Next, referring to FIG. 53 together with FIGS. 31 to 38, at a time point when an active operation on the second row (ROW1 of FIG. 34) of the even memory banks BK0, BK2, . . . , and BK14 is started and the second sub-MAC operation of the second even MAC operation is completed, the first to eighth MAC operators MAC0-MAC7 may sequentially perform a third sub-MAC operation and a fourth sub-MAC operation of the second even MAC operation. The third sub-MAC operation of the second even MAC operation may be performed in the same manner as the third sub-MAC operation of the first even MAC operation described with reference to FIG. 42. For the third sub-MAC operation of the second even MAC operation, the even memory banks BK0, BK2, . . . , and BK14 may transmit the weight data W17.17-W17.24, W19.17-W19.24, W21.17-W21.24, W23.17-W23.24, W25.17-W25.24, W27.17-W27.24, W29.17-W29.24, and W31.17-W31.24 of the $17^{th}$ column to the $24^{th}$ column of the $17^{th}$ row, $19^{th}$ row, $21^{st}$ row, $23^{rd}$ row, $25^{th}$ row, $27^{th}$ row, $29^{th}$ row, and $31^{st}$ row of the weight matrix selected by the third column address signal CA2 to the first to eighth MAC operators MAC0-MAC7, respectively. The global buffer GB may transmit the vector data V17.1-V24.1 of the $17^{th}$ row to the $24^{th}$ row of the first column of the vector matrix selected by the third column address signal CA2 to the first to eighth MAC operators MAC0-MAC7. By the third sub-MAC operation of the second even MAC operation, the first to eighth MAC operators MAC0-MAC7 may generate third $17^{th}$, $19^{th}$, . . . , and $31^{st}$ accumulation data DACC17(3), DACC19(3), . . . , and DACC31(3).

The fourth sub-MAC operation of the second even MAC operation may be performed in the same manner as the fourth sub-MAC operation of the first even MAC operation described with reference to FIG. 43. For the fourth sub-MAC operation of the second even MAC operation, the even memory banks BK0, BK2, . . . , and BK14 may transmit the weight data W17.25-W17.32, W19.25-W19.32, W21.25-W21.32, W23.25-W23.32, W25.25-W25.32, W27.25-W27.32, W29.25-W29.32, and W31.25-W31.32 of the $25^{th}$ column to the $32^{nd}$ column of the $17^{th}$ row, 19th row, $21^{st}$ row, $23^{rd}$, row, $25^{th}$ row, $27^{th}$ row, $29^{th}$ row, row, and $31^{st}$ row of the weight matrix selected by the fourth column address signal CA3 to the first to eighth MAC operators MAC0-MAC7, respectively. The global buffer GB may transmit the vector data V25.1-V32.1 of the $25^{th}$ row to the $32^{nd}$ row of the first column of the vector matrix selected by the fourth column address signal CA3 to the first to eighth MAC operators MAC0-MAC7. By the fourth sub-MAC operation of the second even MAC operation, the first to eighth MAC operators MAC0-MAC7 may generate fourth 17th, 19th and $31^{st}$ accumulation data DACC17(4), DACC19(4), . . . , and DACC31(4). As all the second even MAC operations is completed, the fourth $17^{th}$, $19^{th}$, . . . , and $31^{st}$ accumulation data DACC17(4), DACC19(4), . . . , and DACC31(4) may be output from the first to eighth MAC operators MAC0-MAC7 as MAC result data RST17.1, RST19.1, RST21.1, . . . , and RST31.1 of the $17^{th}$ row, $19^{th}$ row, $21^{st}$ row, $23^{rd}$ row, $25^{th}$ row, $27^{th}$ row, $29^{th}$ row, and $31^{st}$ row of the result data, respectively.

Figure 54:
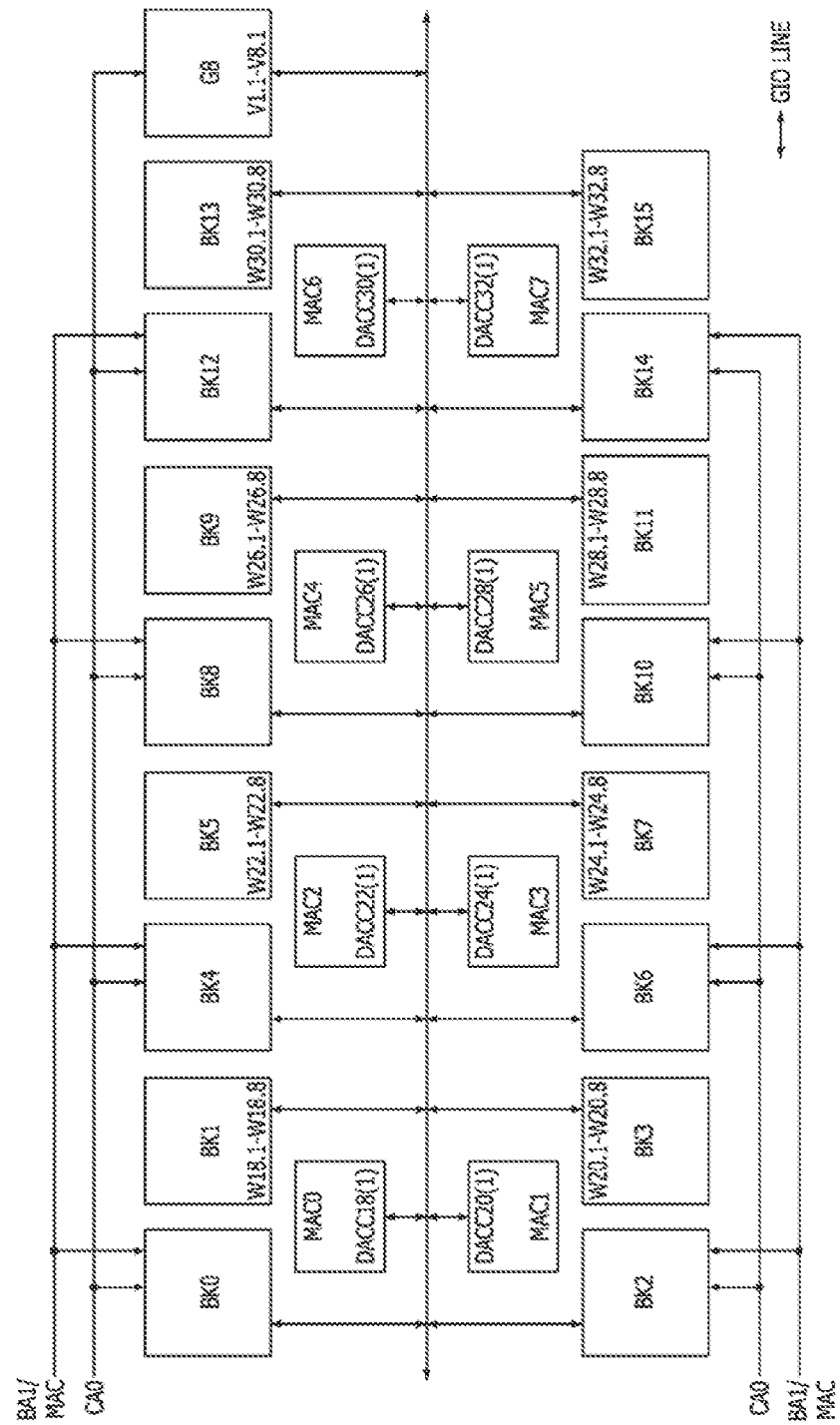
FIG. 54 is a diagram illustrating a first sub-MAC operation of the second odd MAC operation in the PIM device of FIG. 31.

Next, referring to FIG. 54 together with FIGS. 31 to 38, at the twelfth time point T12 when the second even MAC operation is completed and the active operation on the odd memory banks BK1, BK3, . . . , and BK15 is completed, the first to eighth MAC operators MAC0-MAC7 may perform a first sub-MAC operation of a second odd MAC operation. The first sub-MAC operation of the second odd MAC operation may be performed in the same manner as the first sub-MAC operation of the first odd MAC operation described with reference to FIG. 44. For the first sub-MAC operation of the second odd MAC operation, the odd memory banks BK1, BK3, . . . , and BK15 may transmit the weight data W18.1-W18.8, W20.1-W20.8, W22.1-W22.8, W24.1-W24.8, W26.1-W26.8, W28.1-W28.8, W30.1-W30.8, and W32.1-W32.8 of the first column to the eighth column of the $18^{th}$ row, $20^{th}$ row, $22^{nd}$ row, $24^{th}$ row, $26^{th}$ row, $28^{th}$ row, $30^{th}$ row, and $32^{nd}$ row of the weight matrix selected by the first column address signal CA0 to the first to eighth MAC operators MAC0-MAC7, respectively. The global buffer GB may transmit the vector data V1.1-V8.1 of the first row to the eighth row of the first column of the vector matrix selected by the first column address signal CA0 to the first to eighth MAC operators MAC0-MAC7. By the first sub-MAC operation of the second odd MAC operation, the first to eighth MAC operators MAC0-MAC7 may generate first $18^{th}$, $20^{th}$, . . . , and $32^{nd}$ accumulation data DACC18(1), DACC20(1), . . . , and DACC32(1).

Figure 55:
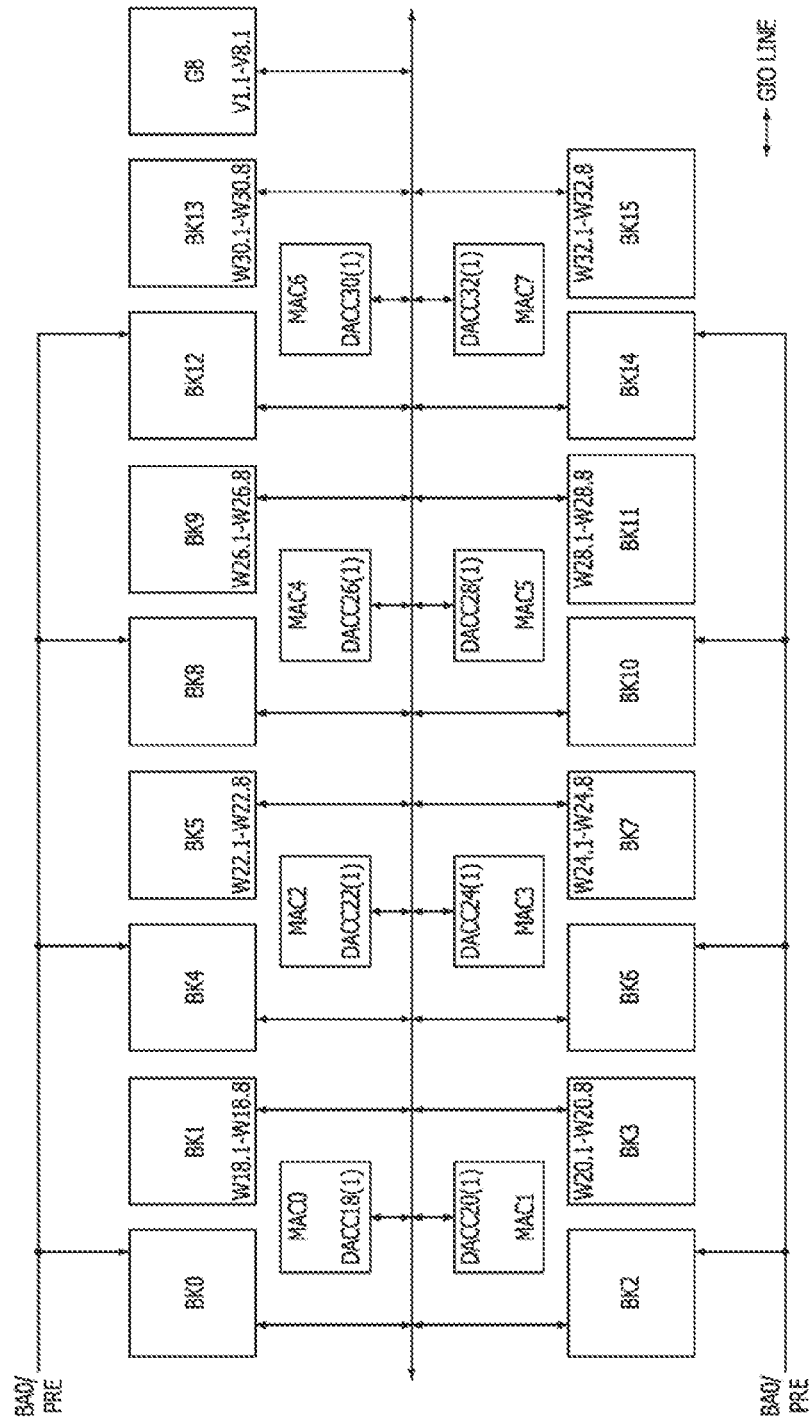
FIG. 55 is a diagram illustrating a pre-charge operation after completion of the second even MAC operation on the even memory banks in the PIM device of FIG. 31.

Next, referring to FIG. 55 together with FIGS. 31 to 38, at the thirteenth time point T13 when the first sub-MAC operation of the second odd MAC operation in the first to eighth MAC operators MAC0-MAC7 is being performed, the command/address decoder (610 of FIG. 31) of the PIM device 600 may generate a pre-charge control signal PRE and a first bank address signal BA0 to transmit them to the memory banks BK0-BK15. Although not illustrated in FIG. 55, the command/address decoder 610 may transmit a second row address signal designating a second row (ROW1 of FIG. 34) to the memory banks BK0-BK15 together with the pre-charge control signal PRE. At the thirteenth time point T13, the even memory banks BK0, BK2, . . . , and BK14 selected by the first bank address signal BA0 may start to perform a pre-charge operation in response to the pre-charge control signal PRE.

Figure 56:
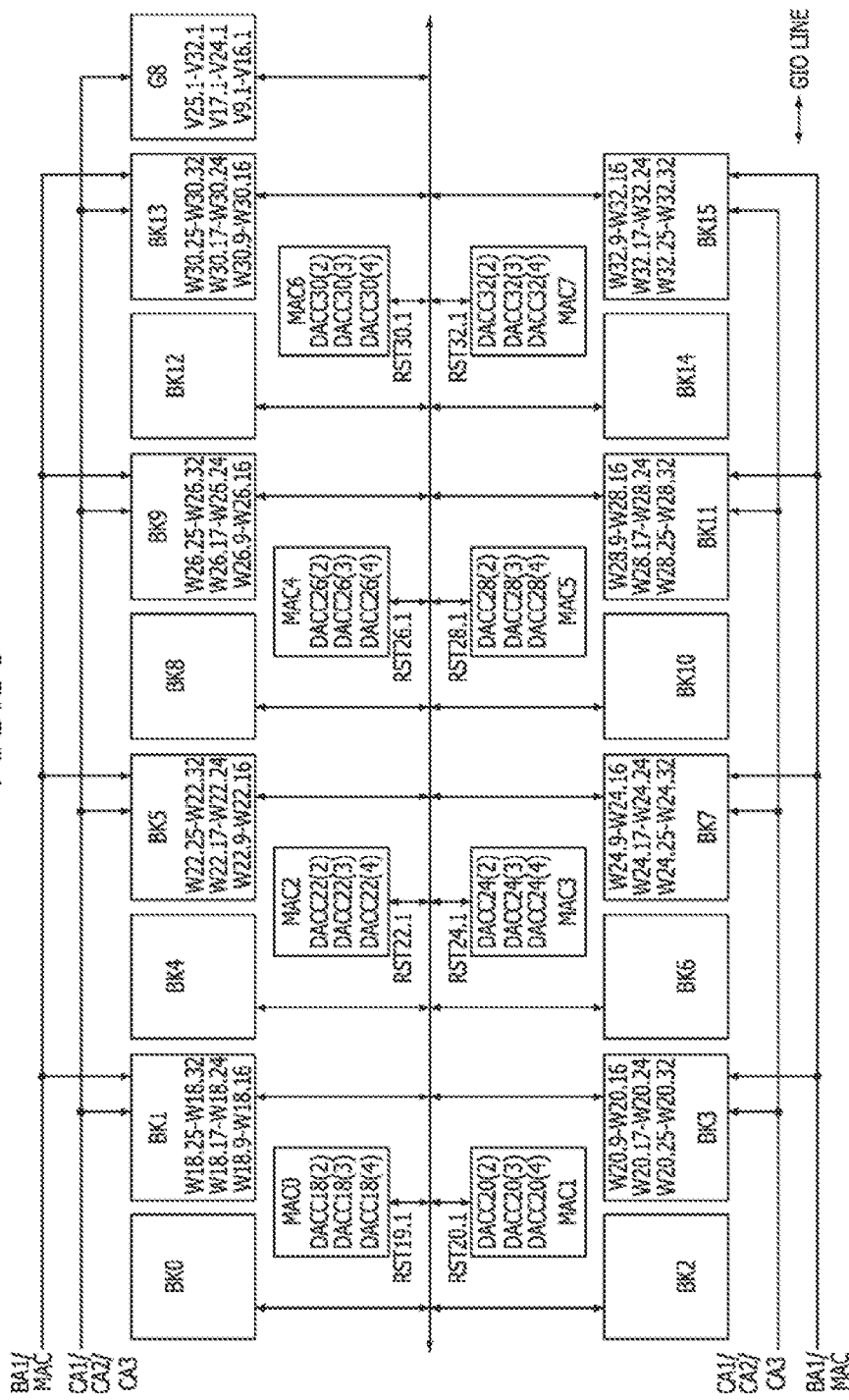
FIG. 56 is a diagram illustrating a second sub-MAC operation, a third sub-MAC operation, and a fourth sub-MAC operation of the second odd MAC operation in the PIM device of FIG. 31.

Next, referring to FIG. 56 together with FIGS. 31 to 38, at a time point when the first sub-MAC operation of the second odd MAC operation is completed, the first to eighth MAC operators MAC0-MAC7 may sequentially perform second to fourth sub-MAC operations of the second odd MAC operation. The second sub-MAC operation of the second odd MAC operation may be performed in the same manner as the second sub-MAC operation of the first odd MAC operation described with reference to FIG. 46. For the second sub-MAC operation of the second odd MAC operation, the odd memory banks BK1, BK3, . . . , and BK15 may transmit the weight data W18.9-W18.16, W20.9-W20.16, W22.9-W22.16, W24.9-W24.16, W26.9-W26.16, W28.9-W28.16, W30.9-W30.16, and W32.9-W32.16 of the ninth column to the sixteenth column of the $18^{th}$ row, $20^{th}$ row, $22^{nd}$ row, $24^{th}$ row, $26^{th}$ row, $28^{th}$ row, $30^{th}$ row, and $32^{nd}$ row of the weight matrix selected by the second column address signal CA1 to the first to eighth MAC operators MAC0-MAC7, respectively. The global buffer GB may transmit the vector data V9.1-V16.1 of the ninth row to the sixteenth row of the first column of the vector matrix selected by the second column address signal CA1 to the first to eighth MAC operators MAC0-MAC7. By the second sub-MAC operation of the second odd MAC operation, the first to eighth MAC operators MAC0-MAC7 may generate second $18^{th}$, $20^{th}$, . . . , and $32^{nd}$ accumulation data DACC18(2), DACC20(2), . . . , and DACC32(2).

The third sub-MAC operation of the second odd MAC operation may be performed in the same manner as the third sub-MAC operation of the first odd MAC operation described with reference to FIG. 47. For the third sub-MAC operation of the second odd MAC operation, the odd memory banks BK1, BK3, . . . , and BK15 may transmit the weight data W18.17-W18.24, W20.17-W20.24, W22.17-W22.24, W24.17-W24.24, W26.17-W26.24, W28.17-W28.24, W30.17-W30.24, and W32.17-W32.24 of the $17^{th}$ column to the $24^{th}$ column of the $18^{th}$ row, $20^{th}$ row, $22^{nd}$ row, $24^{th}$ row, $26^{th}$ row, $28^{th}$ row, $30^{th}$ row, and $32^{nd}$ row of the weight matrix selected by the third column address signal CA2 to the first to eighth MAC operators MAC0-MAC7, respectively. The global buffer GB may transmit the vector data V17.1-V24.1 of the $17^{th}$ row to the $24^{th}$ row of the first column of the vector matrix selected by the third column address signal CA2 to the first to eighth MAC operators MAC0-MAC7. By the third sub-MAC operation of the second odd MAC operation, the first to eighth MAC operators MAC0-MAC7 may generate third $18^{th}$, $20^{th}$, . . . , and $32^{nd}$ accumulation data DACC18(3), DACC20(3), . . . , and DACC32(3).

The fourth sub-MAC operation of the second odd MAC operation may be performed in the same manner as the fourth sub-MAC operation of the first odd MAC operation described with reference to FIG. 49. For the fourth sub-MAC operation of the second odd MAC operation, the odd memory banks BK1, BK3, . . . , and BK15 may transmit the weight data W18.25-W18.32, W20.25-W20.32, W22.25-W22.32, W24.25-W24.32, W26.25-W26.32, W28.25-W28.32, W30.25-W30.32, and W32.25-W32.32 of the $25^{th}$ column to the $32^{nd}$ column of the $18^{th}$ row, $20^{th}$ row, $22^{nd}$ row, $24^{th}$ row, $26^{th}$ row, $28^{th}$ row, $30^{th}$ row, and $32^{st}$ row of the weight matrix selected by the fourth column address signal CA3 to the first to eighth MAC operators MAC0-MAC7, respectively. The global buffer GB may transmit the vector data V25.1-V32.1 of the $25^{th}$ row to the $32^{nd}$ row of the first column of the vector matrix selected by the fourth column address signal CA3 to the first to eighth MAC operators MAC0-MAC7. By the fourth sub-MAC operation of the second odd MAC operation, the first to eighth MAC operators MAC0-MAC7 may generate fourth $18^{th}$, $20^{th}$, . . . , and $32^{nd}$ accumulation data DACC18(4), DACC20(4), . . . , and DACC32(4). As all the second odd MAC operation is completed, the fourth $18^{th}$, $20^{th}$, . . . , and $32^{nd}$ accumulation data DACC18(4), DACC20(4), . . . , and DACC32(4) may be output from the first to eighth MAC operators MAC0-MAC7 as MAC result data RST18.1, RST20.1, RST22.1, . . . , and RST32.1 of the $18^{th}$ row, $20^{th}$ row, $22^{nd}$ row, . . . , and $32^{nd}$ row of the result matrix, respectively.

Figure 57:
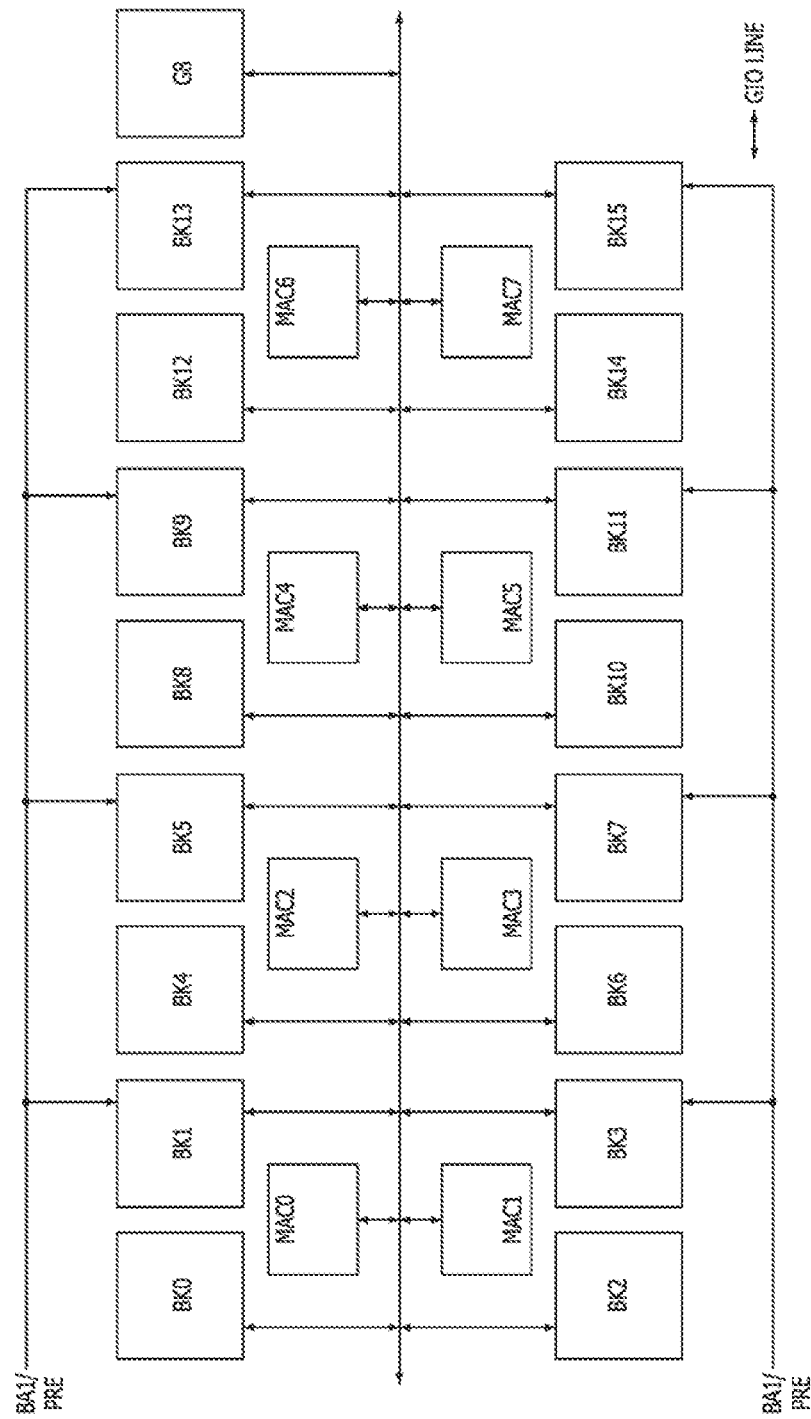
FIG. 57 is a diagram illustrating a pre-charge operation after completion of the second odd MAC operation on the odd memory banks in the PIM device of FIG. 31.

Next, referring to FIG. 57 together with FIGS. 31 to 38, at the fifteenth time point T15 after the fourth sub-MAC operation of the second odd MAC operation in the first to eighth MAC operators MAC0-MAC7 is completed, the command/address decoder (610 of FIG. 31) of the PIM device 600 may generate a pre-charge control signal PRE and a second bank address signal BA1 to transmit them to the memory banks BK0-BK15. Although not illustrated in FIG. 57, the command/address decoder 610 may transmit a second row address signal designating the second row (ROW1 of FIG. 34) to the memory banks BK0-BK15 together with the pre-charge control signal PRE. At the fifteenth time point T15, the odd memory banks BK1, BK3, . . . , and BK15 selected by the second bank address signal BA1 may start to perform a pre-charge operation in response to the pre-charge control signal PRE.

Figure 58:
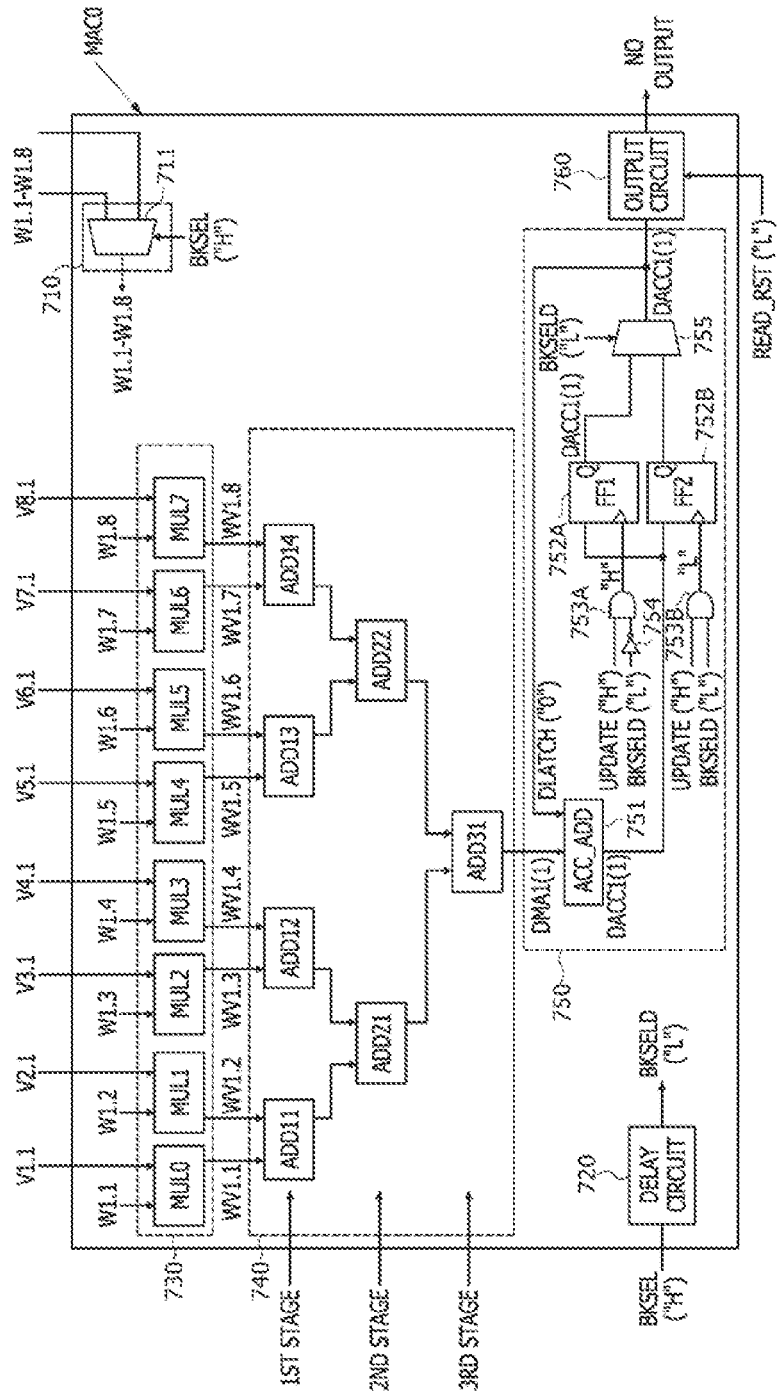
FIG. 58 is a diagram illustrating an operation of a first MAC operator performing the first sub-MAC operation of the first even MAC operation in the PIM device of FIG. 31.

FIG. 58 is a diagram illustrating an operation of the first MAC operator MAC0 performing the first sub-MAC operation of the first even MAC operation in the PIM device 600 of FIG. 31. The description of this example may be equally applied to second to eighth MAC operators MAC1-MAC7. In addition, the same method may be applied to the first sub-MAC operation of the second even MAC operation of the first MAC operator MAC0. Referring to FIG. 58, the command/address decoder (610 of FIG. 31) of the PIM device 600 may generate an update control signal UPDATE of a logic "high" H level to transmit the same to the first MAC operator MAC0. In addition, the command/address decoder (610 of FIG. 31) may generate a bank selection control signal BKSEL of a logic "high" H level to transmit the same to the first MAC operator MAC0. A first selector 711 of the first MAC operator MAC0 may transmit the weight data W1.1-W1.8 of the first column to the eighth column of the first row of the weight matrix, transmitted from the first even memory bank (BK0 of FIG. 31) in response to the bank selection control signal BKSEL of a logic "high" H level. The global buffer (GB of FIG. 31) may transmit the vector data V1.1-V1.8 of the first row to the eighth row of the first column of the vector matrix. A multiplication circuit 730 may perform multiplication operations on the weight data W1.1-W1.8 and the vector data V1.1-V1.8 to output first to eighth multiplication data WV1.1-WV1.8 of a first row. An addition circuit 740 may perform an addition operation on the first to eighth multiplication data WV1.1-WV1.8 of the first row to output first multiplication addition data DMA1(1) of a first row.

A delay circuit 720 that has received the bank selection control signal BKSEL of a logic "high" H level may transmit a bank selection delay control signal BKSELD of a logic "low" L level to an inverter 754, a second AND gate 753B, and a selection terminal of a second selector 755 of an accumulation circuit 750. An accumulative adder 751 of the accumulation circuit 750 may perform an addition operation on the first multiplication addition data DMA1(1) of the first row and latch data DLATCH to output first accumulation data DACC1(1) of a first row. Here, since the latch data DLATCH is "0", so that the first accumulation data DACC1(1) of the first row may be the same as the first multiplication addition data DMA1(1) of the first row. The first accumulation data DACC1 (1) of the first row output from the accumulative adder 751 may be input to an input terminal of a first latch circuit 752A and an input terminal of a second latch circuit 752B.

Since the bank selection delay control signal BKSELD is in a logic "low" L level, the first AND gate 753A and the second AND gate 753b may output a logic "high" H signal and a logic "low" L signal, respectively. Accordingly, the first latch circuit 752A may transmit the first accumulation data DACC1(1) of the first row to the first input terminal of the second selector 755 through an output terminal Q. The second selector 755 may output the first accumulation data DACC1(1) of the first row in response to the bank selection delay control signal BKSELD of a logic "low" L level. The first accumulation data DACC1(1) of the first row output from the second selector 755 may be transmitted to an output circuit 760. In addition, the first accumulation data DACC1 (1) of the first row output from the second selector 755 may be used as the latch data DLATCH in the next second sub-MAC operation. Because the first even MAC operation is not completed, the output circuit 760 might not output data in response to a MAC result data read signal READ_RST of a logic "low" L level.

Figure 59:
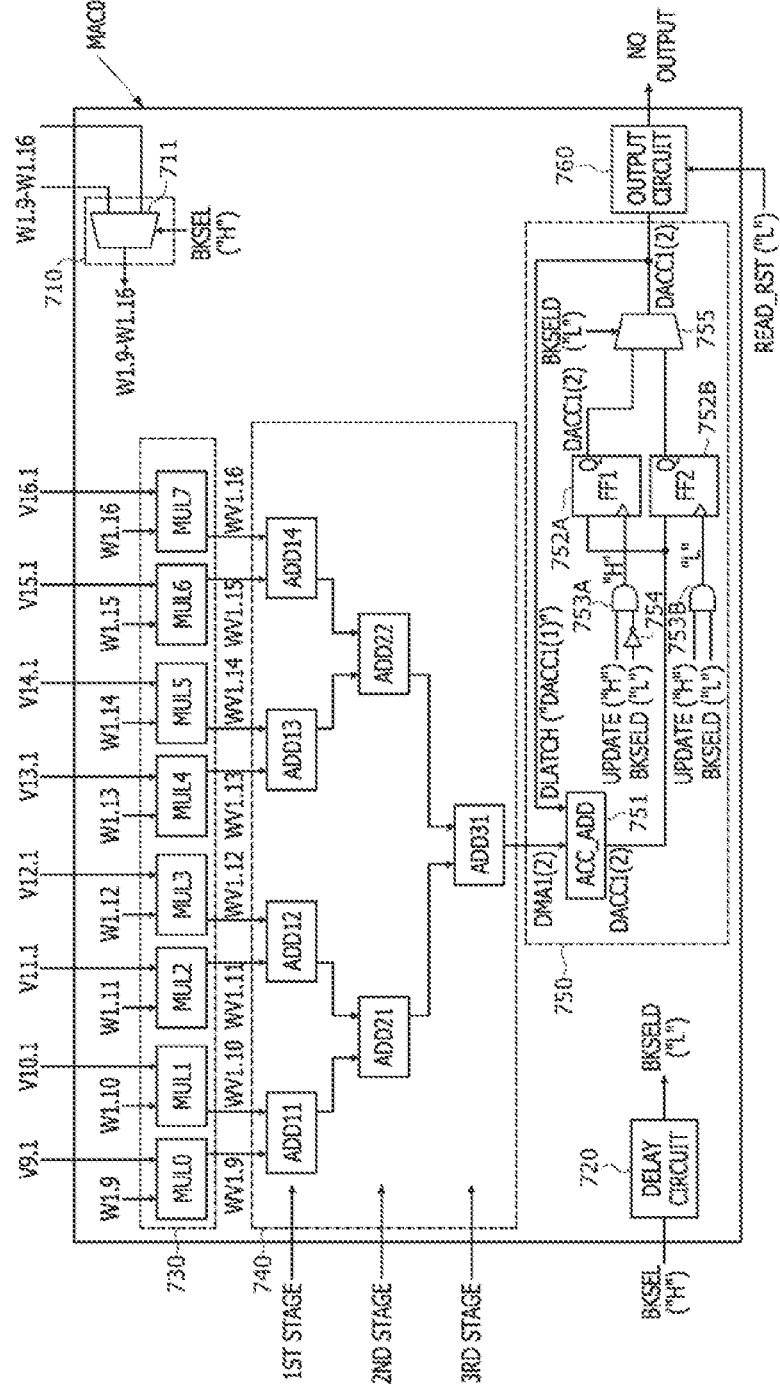
FIG. 59 is a diagram illustrating an operation of the first MAC operator performing the second sub-MAC operation of the first even MAC operation in the PIM device of FIG. 31.

FIG. 59 is a diagram illustrating an operation of the first MAC operator MAC0 performing the second sub-MAC operation of the first even MAC operation in the PIM device 600 of FIG. 31. The description of this example may be equally applied to the second to eighth MAC operators MAC1-MAC7. In addition, the same method may be applied to the second sub-MAC operation of the second even MAC operation of the first MAC operator MAC0. Referring to FIG. 59, the first selector 711 of the first MAC operator MAC0 may transmit the weight data W1.9-W1.16 of the ninth column to the sixteenth column of the first row of the weight matrix transmitted from the first even memory bank (BK0 of FIG. 31) to the multiplication circuit 730, in response to the bank selection control signal BKSEL of a logic "high" H level. The global buffer (GB of FIG. 31) may transmit the vector data V9.1-V16.1 of the ninth row to the sixteenth row of the first column of the vector matrix to the multiplication circuit 730. The multiplication circuit 730 may perform a multiplication operation on the weight data W1.9-W1.16 and the vector data V9.1-V16.1 to output ninth to sixteenth multiplication data WV1.9-WV1.16 of the first row. The addition circuit 740 may perform an addition operation on the ninth to sixteenth multiplication data WV1.9-WV1.16 of the first row to output second multiplication addition data DMA1(2) of a second row.

The delay circuit 720 that has received the bank selection control signal BKSEL of a logic "high" H level may transmit a bank selection delay control signal BKSELD of a logic "low" L level to the inverter 754, the second AND gate 753B, and the selection terminal of the second selector 755 of the accumulation circuit 750. The accumulative adder 751 of the accumulation circuit 750 may perform an addition operation on the second multiplication addition data DMA1(2) of the first row and latch data DLATCH to output second accumulation data DACC1(2) of the first row. Since the latch data DLATCH is the first accumulation data DACC1(1) of the first row, the second accumulation data DACC1(2) of the first row may be data obtained by adding the first multiplication addition data DMA1(1) of the first row and the second multiplication addition data DMA1(2) of the first row. The second accumulation data DACC1(2) of the first row output from the accumulative adder 751 may be input to the input terminal of the first latch circuit 752A and the input terminal of the second latch circuit 752B.

Since the bank selection delay control signal BKSELD is in a logic "low" L level, the first AND gate 753A and the second AND gate 753b may output a logic "high" H signal and a logic "low" L signal, respectively. Accordingly, the first latch circuit 752A may transmit the second accumulation data DACC1(2) of the first row to the first input terminal of the second selector 755 through the output terminal Q. The second selector 755 may output the second accumulation data DACC1(2) of the first row in response to the bank selection delay control signal BKSELD of a logic "low" L level. The second accumulation data DACC1(2) of the first row output from the second selector 755 may be transmitted to the output circuit 760. In addition, the second accumulation data DACC1(2) of the first row output from the second selector 755 may be used as the latch data DLATCH in the next third sub-MAC operation. Because the first even MAC operation is not completed, the output circuit 760 might not output data in response to the MAC result data read signal READ_RST of a logic "low" L level.

Figure 60:
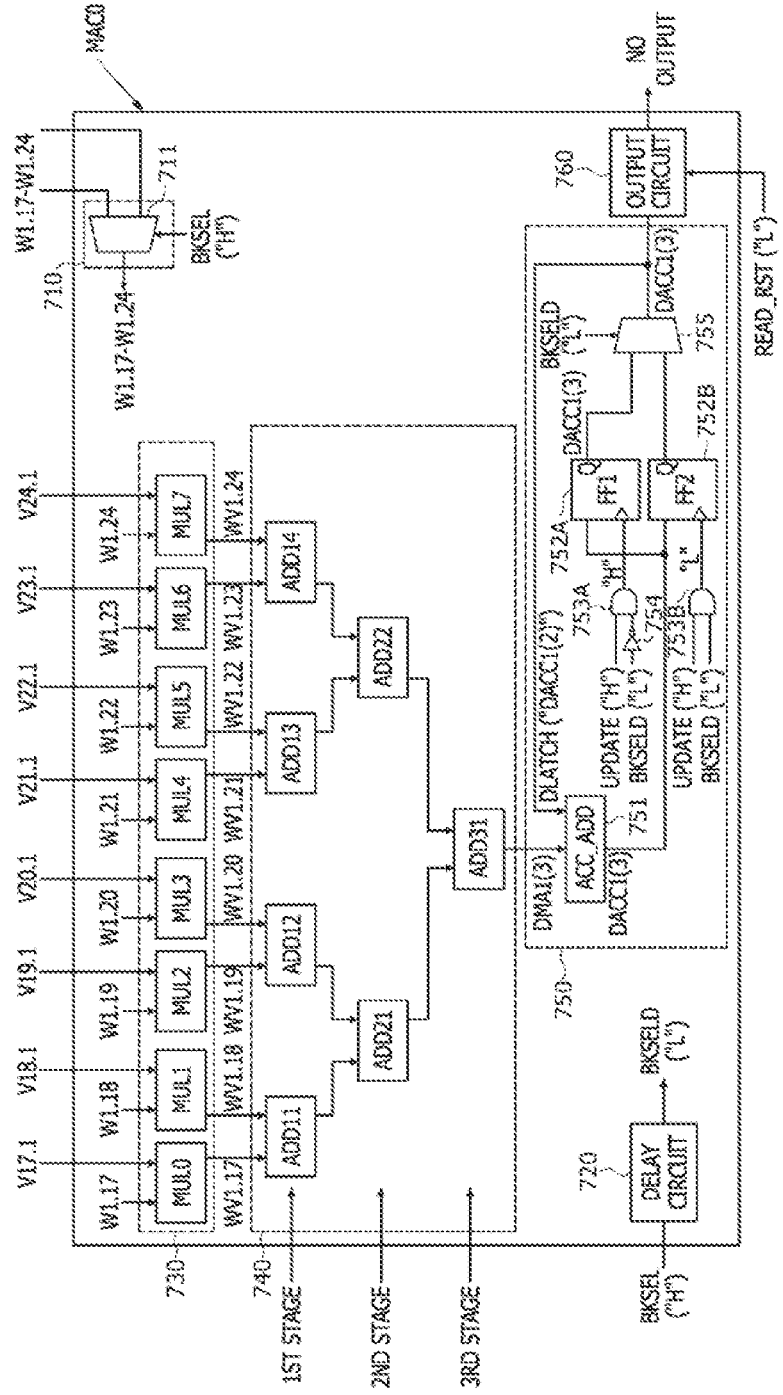
FIG. 60 is a diagram illustrating an operation of the first MAC operator performing the third-sub-MAC operation of the first even MAC operation in the PIM device of FIG. 31.

FIG. 60 is a diagram illustrating an operation of the first MAC operator MAC0 performing the third sub-MAC operation of the first even MAC operation in the PIM device 600 of FIG. 31. The description of this example may be equally applied to the second to eighth MAC operators MAC1-MAC7. In addition, the same method may be applied to the third sub-MAC operation of the second even MAC operation of the first MAC operator MAC0. Referring to FIG. 60, the first selector 711 of the first MAC operator MAC0 may transmit the weight data W1.17-W1.24 of the $17^{th}$ column to the $24^{th}$ column of the first row of the weight matrix transmitted from the first even memory bank (BK0 of FIG. 31) to the multiplication circuit 730, in response to the bank selection control signal BKSEL of a logic "high" H level. The global buffer (GB of FIG. 31) may transmit the vector data V17.1-V24.1 of the $17^{th}$ row to the $24^{th}$ row of the first column of the vector matrix to the multiplication circuit 730. The multiplication circuit 730 may perform a multiplication operation on the weight data W1.17-W1.24 and the vector data V17.1-V24.1 to output $17^{th}$ to $24^{th}$ multiplication data WV1.17-WV1.24 of the first row. The addition circuit 740 may perform an addition operation on the $17^{th}$ to $24^{th}$ multiplication data WV1.17-WV1.24 of the first row to output third multiplication addition data DMA1(3) of the first row.

The delay circuit 720 that has received the bank selection control signal BKSEL of a logic "high" H level may transmit a bank selection delay control signal BKSELD of a logic "low" L level to the inverter 754, the second AND gate 753B, and the selection terminal of the second selector 755 of the accumulation circuit 750. The accumulative adder 751 of the accumulation circuit 750 may perform an addition operation on the third multiplication addition data DMA1(3) of the first row and latch data DLATCH to output third accumulation data DACC1(3) of the first row. Since the latch data DLATCH is the second accumulation data DACC1(2) of the first row, the third accumulation data DACC1(3) of the first row may be data obtained by adding the first multiplication addition data DMA1(1) of the first row, the second multiplication addition data DMA1(2) of the first row, and the third multiplication addition data DMA1(3) of the first row. The third accumulation data DACC1(3) of the first row output from the accumulative adder 751 may be input to the input terminal of the first latch circuit 752A and the input terminal of the second latch circuit 752B.

Since the bank selection delay control signal BKSELD is in a logic "low" L level, the first AND gate 753A and the second AND gate 753b may output a logic "high" H signal and a logic "low" L signal, respectively. Accordingly, the first latch circuit 752A may transmit the third accumulation data DACC1(3) of the first row to the first input terminal of the second selector 755 through the output terminal Q. The second selector 755 may output the third accumulation data DACC1(3) of the first row in response to the bank selection delay control signal BKSELD of a logic "low" L level. The third accumulation data DACC1(3) of the first row output from the second selector 755 may be transmitted to the output circuit 760. In addition, the third accumulation data DACC1(3) of the first row output from the second selector 755 may be used as the latch data DLATCH in the next fourth sub-MAC operation. Because the first even MAC operation is not completed, the output circuit 760 might not output data in response to a MAC result data read signal READ_RST of a logic "low" L level.

Figure 61:
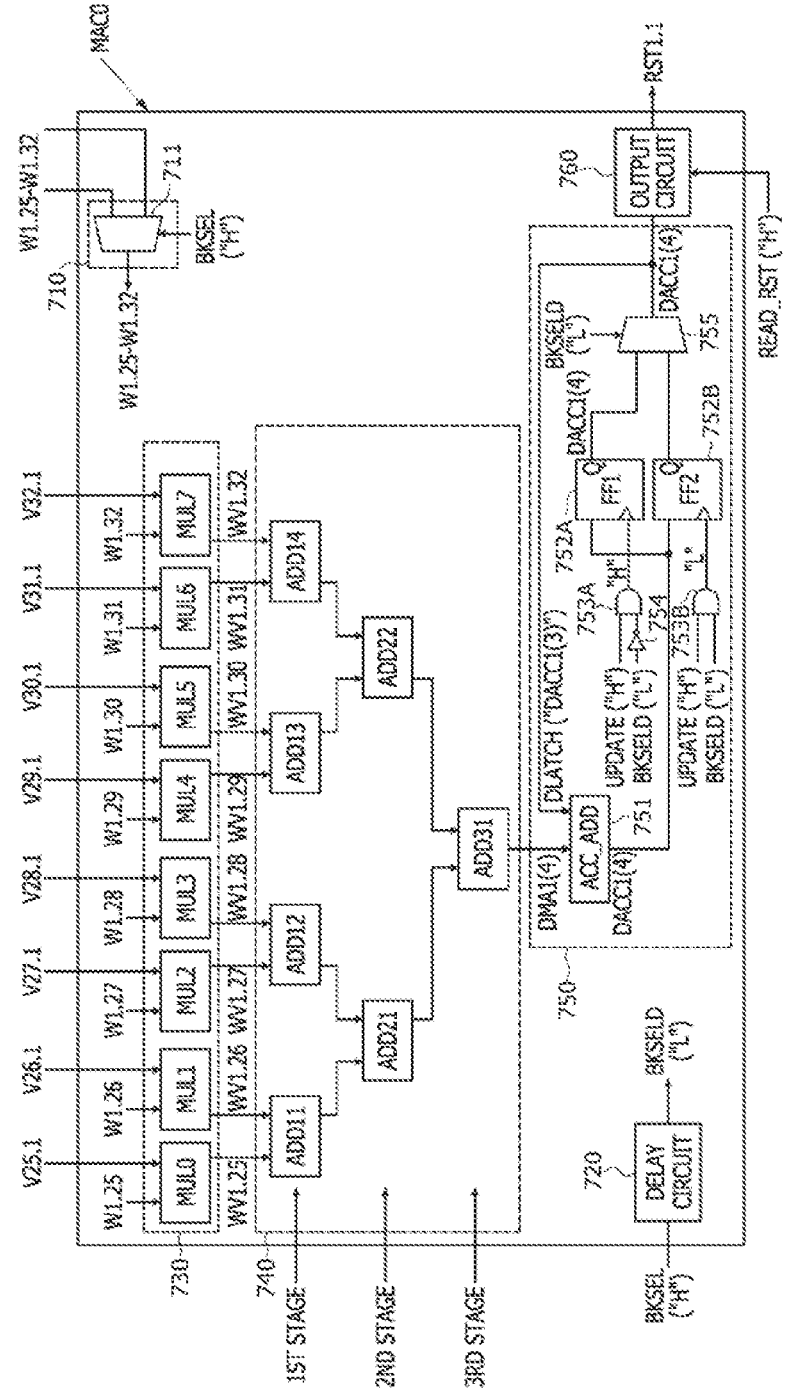
FIG. 61 is a diagram illustrating an operation of the first MAC operator performing the fourth-sub-MAC operation of the first even MAC operation in the PIM device of FIG. 31.

FIG. 61 is a diagram illustrating an operation of the first MAC operator MAC0 performing the fourth sub-MAC operation of the first even MAC operation in the PIM device 600 of FIG. 31. The description of this example may be equally applied to the second to eighth MAC operators MAC1-MAC7. In addition, the same method may be applied to the fourth sub-MAC operation of the second even MAC operation of the first MAC operator MAC0. Referring to FIG. 61, the first selector 711 of the first MAC operator MAC0 may transmit the weight data W1.25-W1.32 of the $25^{th}$ column to the $32^{nd}$ column of the first row of the weight matrix transmitted from the first even memory bank (BK0 of FIG. 31) to the multiplication circuit 730, in response to the bank selection control signal BKSEL of a logic "high" H level. The global buffer (GB of FIG. 31) may transmit the vector data V25.1-V32.1 of the $25^{th}$ row to the $32^{nd}$ row of the first column of the vector matrix to the multiplication circuit 730. The multiplication circuit 730 may perform a multiplication operation on the weight data W1.25-W1.32 and the vector data V25.1-V32.1 to output $25^{th}$ to $32^{nd}$ multiplication data WV1.25-WV1.32 of the first row. The addition circuit 740 may perform an addition operation on the $25^{th}$ to $32^{nd}$ multiplication data WV1.25-WV1.32 of the first row to output fourth multiplication addition data DMA1(4) of the first row.

The delay circuit 720 that has received the bank selection control signal BKSEL of a logic "high" H level may transmit a bank selection delay control signal BKSELD of a logic "low" L level to the inverter 754, the second AND gate 753B, and the selection terminal of the second selector 755 of the accumulation circuit 750. The accumulative adder 751 of the accumulation circuit 750 may perform an addition operation on the fourth multiplication addition data DMA1(4) of the first row and latch data DLATCH to output fourth accumulation data DACC1(4) of the first row. Since the latch data DLATCH is the third accumulation data DACC1(3) of the first row, the fourth accumulation data DACC1(4) of the first row may be data obtained by adding all the first multiplication addition data DMA1(1) of the first row, the second multiplication addition data DMA1(2) of the first row, the third multiplication addition data DMA1(3) of the first row, and the fourth multiplication addition data DMA1(4) of the first row. The fourth accumulation data DACC1(4) of the first row output from the accumulative adder 751 may be input to the input terminal of the first latch circuit 752A and the input terminal of the second latch circuit 752B.

Since the bank selection delay control signal BKSELD is in a logic "low" L level, the first AND gate 753A and the second AND gate 753b may output a logic "high" H signal and a logic "low" L signal, respectively. Accordingly, the first latch circuit 752A may transmit the fourth accumulation data DACC1(4) of the first row to the first input terminal of the second selector 755 through the output terminal Q. The second selector 755 may output the fourth accumulation data DACC1(4) of the first row in response to the bank selection delay control signal BKSELD of a logic "low" L level. The fourth accumulation data DACC1(4) of the first row output from the second selector 755 may be transmitted to the output circuit 760. The first even MAC operation is completed, so that the first latch circuit 752A may be reset. In addition, the output circuit 760 may output the fourth accumulation data DACC1(4) of the first row as MAC result data RST1.1 of a first row of the result matrix in response to the MAC result data read signal READ_RST of a logic "high" H level.

Figure 62:
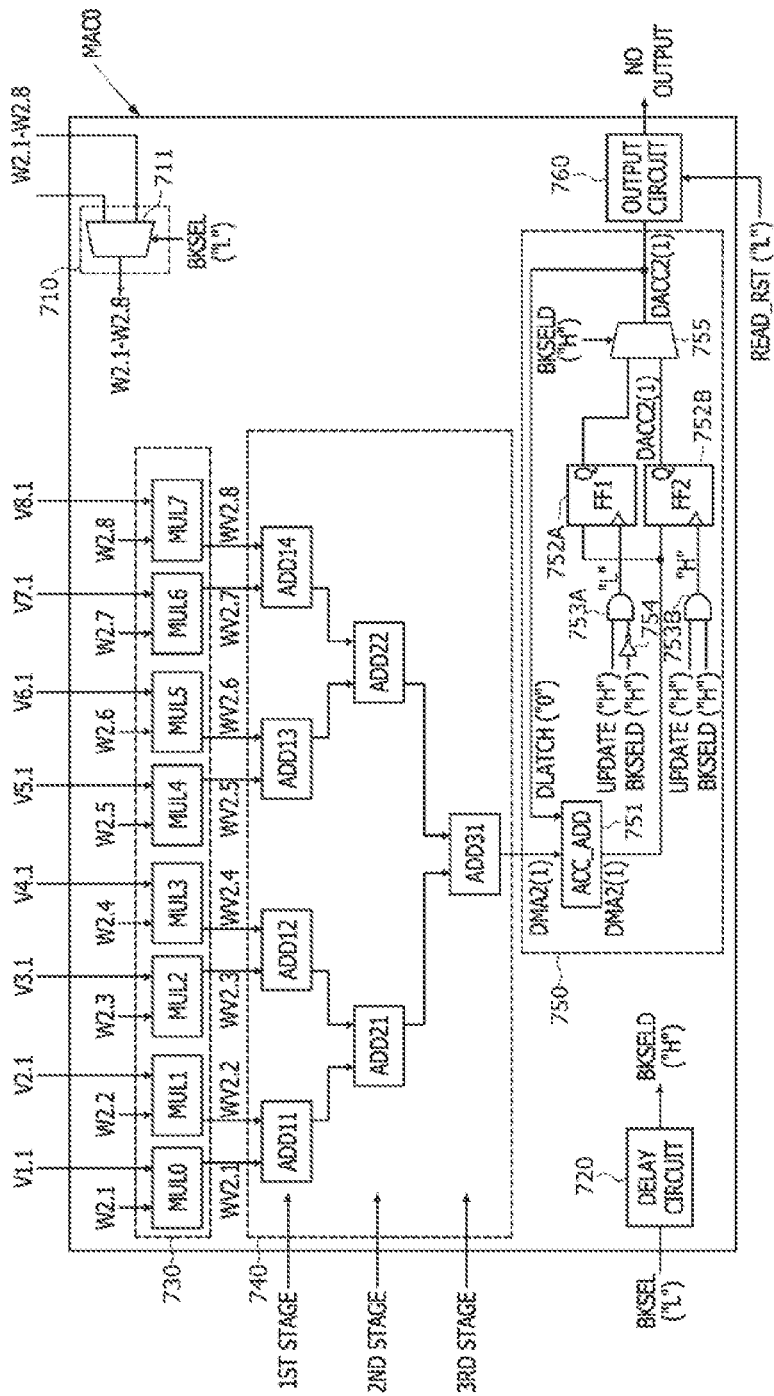
FIG. 62 is a diagram illustrating an operation of the first MAC operator performing the first sub-MAC operation of the first odd MAC operation in the PIM device of FIG. 31.

FIG. 62 is a diagram illustrating an operation of the first MAC operator MAC0 performing the first sub-MAC operation of the first odd MAC operation in the PIM device 600 of FIG. 31. The description of this example may be equally applied to the second to eighth MAC operators MAC1-MAC7. In addition, the same method may be applied to the first sub-MAC operation of the second odd MAC operation of the first MAC operator MAC0. Referring to FIG. 62, the command/address decoder (610 of FIG. 31) of the PIM device 600 may generate an update control signal UPDATE of a logic "high" H level to transmit the same to the first MAC operator MAC0. In addition, the command/address decoder (610 of FIG. 31) may generate a bank selection control signal BKSEL of a logic "low" L level to transmit the same to the first MAC operator MAC0. The first selector 711 of the first MAC operator MAC0 may transmit the weight data W2.1-W2.8 of the first column to the eighth column of the second row of the weight matrix transmitted from the first odd memory bank (BK1 of FIG. 31) to the multiplication circuit 730 in response to the bank selection control signal BKSEL of a logic "low" L level. The global buffer (GB of FIG. 31) may transmit the vector data V1.1-V8.1 of the first row to the eighth row of the first column of the vector matrix to the multiplication circuit 730. The multiplication circuit 730 may perform a multiplication operation on the weight data W2.1-W2.8 and the vector data V1.1-V8.1 to output first to eighth multiplication data WV2.1-WV2.8 of a second row. The addition circuit 740 may perform an addition operation on the first to eighth multiplication data WV2.1-WV2.8 of the second row to output first multiplication addition data DMA2(1) of a second row.

The delay circuit 720 that has received the bank selection control signal BKSEL of a logic "low" L level may transmit a bank selection delay control signal BKSELD of a logic "high" H level to the inverter 754, the second AND gate 753B, and the selection terminal of the second selector 755 of the accumulation circuit 750. The accumulative adder 751 of the accumulation circuit 750 may perform an addition operation on the first multiplication addition data DMA2(1)

of the second row and latch data DLATCH to output first accumulation data DACC2(1) of a second row. Here, since the latch data DLATCH is "0", the first accumulation data DACC2(1) of the second row may be the same as the first multiplication addition data DMA2(1) of the second row. The first accumulation data DACC2(1) of the second row output from the accumulative adder 751 may be input to the input terminal of the first latch circuit 752A and the input terminal of the second latch circuit 752B.

Since the bank selection delay control signal BKSELD is in a logic "high" H level, the first AND gate 753A and the second AND gate 753b may output a logic "low" L signal and a logic "high" H signal, respectively. Accordingly, the second latch circuit 752B may transmit the first accumulation data DACC2(1) of the second row to the second input terminal of the second selector 755 through the output terminal Q. The second selector 755 may output the first accumulation data DACC2(1) of the second row in response to the bank selection delay control signal BKSELD of a logic "high" H level. The first accumulation data DACC2(1) of the second row output from the second selector 755 may be transmitted to the output circuit 760. In addition, the first accumulation data DACC2(1) of the second row output from the second selector 755 may be used as latch data DLATCH in the next second sub-MAC operation. Because the first odd MAC operation is not completed, the output circuit 760 might not output data in response to a MAC result data read signal READ_RST of a logic "low" level L.

Figure 63:
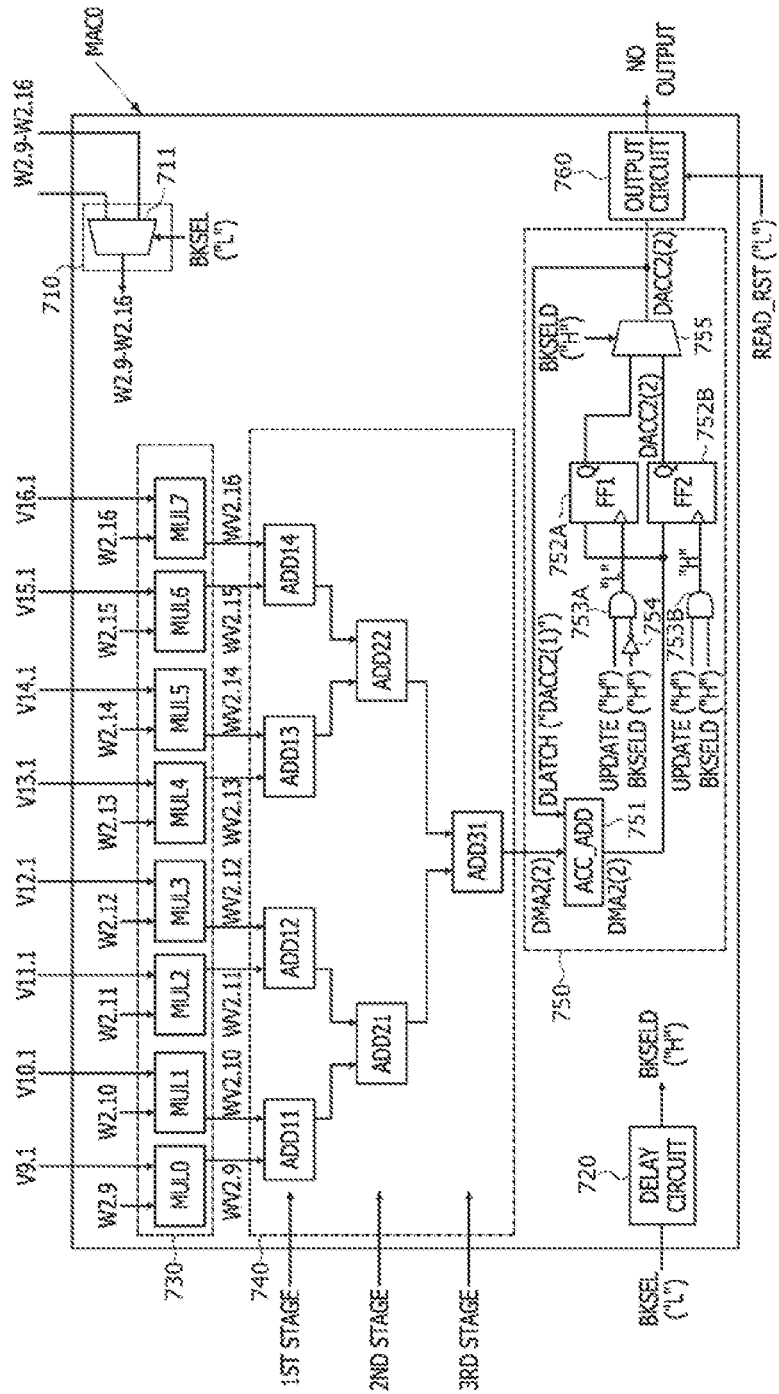
FIG. 63 is a diagram illustrating an operation of the first MAC operator performing the second sub-MAC operation of the first odd MAC operation in the PIM device of FIG. 31.

FIG. 63 is a diagram illustrating an operation of the first MAC operator performing the second sub-MAC operation of the first odd MAC operation in the PIM device of FIG. 31. The description of this example may be equally applied to the second to eighth MAC operators MAC1-MAC7. In addition, the same method may be applied to the second sub-MAC operation of the second odd MAC operation of the first MAC operator MAC0. Referring to FIG. 63, the first selector 711 of the first MAC operator MAC0 may transmit the weight data W2.9-W2.16 of the ninth column to the sixteenth column of the second row of the weight matrix transmitted from the first odd memory bank (BK1 of FIG. 31) to the multiplication circuit 730, in response to a bank selection control signal BKSEL of a logic "low" L level. The global buffer (GB of FIG. 31) may transmit the vector data V9.1-V16.1 of the ninth row to the sixteenth row of the first column of the vector matrix to the multiplication circuit 730. The multiplication circuit 730 may perform a multiplication operation on the weight data W2.9-W2.16 and the vector data V9.1-V16.1 to output ninth to sixteenth multiplication data WV2.9-WV2.16 of the second row. The addition circuit 740 may perform an addition operation on the ninth to sixteenth multiplication data WV2.9-WV2.16 of the second row to output second multiplication addition data DMA2(2) of the second row.

The delay circuit 720 that has received the bank selection control signal BKSEL of a logic "low" L level may transmit a bank selection delay control signal BKSELD of a logic "high" H level to the inverter 754, the second AND gate 753B, and the selection terminal of the second selector 755 of the accumulation circuit 750. The accumulative adder 751 of the accumulation circuit 750 may perform an addition operation on the second multiplication addition data DMA2(2) of the second row and latch data DLATCH to output second accumulation data DACC2(2) of the second row. Since the latch data DLATCH is the first accumulation data DACC2(1) of the second row, the second accumulation data DACC2(2) of the second row may be data obtained by adding the first multiplication addition data DMA2(1) of the first row and the second multiplication addition data DMA2(2) of the second row. The second accumulation data DACC2(2) of the second row output from the accumulative adder 751 may be input to the input terminal of the first latch circuit 752A and the input terminal of the second latch circuit 752B.

Since the bank selection delay control signal BKSELD is in a logic "high" H level, the first AND gate 753A and the second AND gate 753b may output a logic "low" L signal and a logic "high" H signal, respectively. Accordingly, the second latch circuit 752B may transmit the first accumulation data DACC2(1) of the second row to the second input terminal of the second selector 755 through the output terminal 2. The second selector 755 may output the second accumulation data DACC2(2) of the second row in response to the bank selection delay control signal BKSELD of a logic "high" H level. The second accumulation data DACC2(2) of the second row output from the second selector 755 may be transmitted to the output circuit 760. In addition, the second accumulation data DACC2(2) of the second row output from the second selector 755 may be used as latch data DLATCH in the next third sub-MAC operation. Because the first odd MAC operation is not completed, the output circuit 760 might not output data in response to a MAC result data read signal READ_RST of a logic "low" level L.

Figure 64:
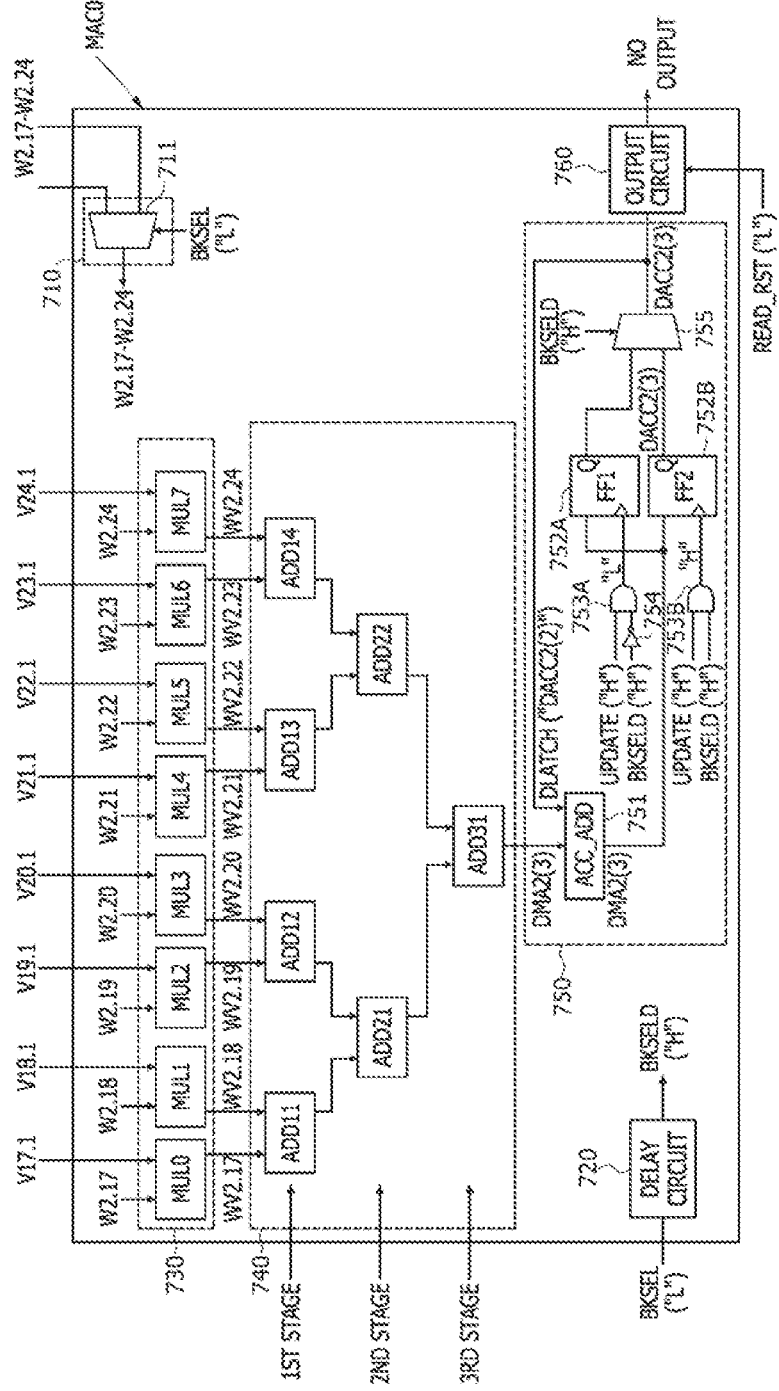
FIG. 64 is a diagram illustrating an operation of the first MAC operator performing the third-sub-MAC operation of the first odd MAC operation in the PIM device of FIG. 31.

FIG. 64 is a diagram illustrating an operation of the first MAC operator MAC0 performing the third sub-MAC operation of the first odd MAC operation in the PIM device 600 of FIG. 31. The description of this example may be equally applied to the second to eighth MAC operators MAC1-MAC7. In addition, the same method may be applied to the third sub-MAC operation of the second odd MAC operation of the first MAC operator MAC0. Referring to FIG. 64, the first selector 711 of the first MAC operator MAC0 may transmit the weight data W2.17-W2.24 of the $17^{th}$ column to the $24^{th}$ column of the second row of the weight matrix transmitted from the first odd memory bank (BK1 of FIG. 31) to the multiplication circuit 730, in response to a bank selection control signal BKSEL of a logic "low" L level. The global buffer (GB of FIG. 31) may transmit the vector data V17.1-V24.1 of the $17^{th}$ row to the $24^{th}$ row of the first column of the vector matrix to the multiplication circuit 730. The multiplication circuit 730 may perform a multiplication operation on the weight data W2.17-W2.24 and the vector data V17.1-V24.1 to output $17^{th}$ to $24^{th}$ multiplication data WV2.17-WV2.24 of the second row. The addition circuit 740 may perform an addition operation on the $17^{th}$ to $24^{th}$ multiplication data WV2.17-WV2.24 of the second row to output third multiplication addition data DMA2(3) of the second row.

The delay circuit 720 that has received a bank selection control signal BKSEL of a logic "low" L level may transmit a bank selection delay control signal BKSELD of a logic "high" H level to the inverter 754, the second AND gate 753B, and the selection terminal of the second selector 755 of the accumulation circuit 750. The accumulative adder 751 of the accumulation circuit 750 may perform an addition operation on the third multiplication addition data DMA2(3) of the second row and latch data DLATCH to output third accumulation data DACC2(3) of the second row. Since the latch data DLATCH is the second accumulation data DACC2(2) of the second row, the third accumulation data DACC2(3) of the second row may be data obtained by adding the first multiplication addition data DMA2(1) of the second row, the second multiplication addition data DMA2(2) of the second row, and the third multiplication addition data DMA2(3) of the second row. The third accumulation data DACC2(3) of the second row output from the accumulative adder 751 may be input to the input terminal of the first latch circuit 752A and the input terminal of the second latch circuit 752B.

Since the bank selection delay control signal BKSELD is in a logic "high" H level, the first AND gate 753A and the second AND gate 753b may output a logic "low" L signal and a logic "high" H signal, respectively. Accordingly, the second latch circuit 752B may transmit the third accumulation data DACC2(3) of the second row to the second input terminal of the second selector 755 through the output terminal Q. The second selector 755 may output the third accumulation data DACC2(3) of the second row in response to the bank selection delay control signal BKSELD of a logic "high" H level. The third accumulation data DACC2(3) of the second row output from the second selector 755 may be transmitted to the output circuit 760. In addition, the third accumulation data DACC2(3) of the second row output from the second selector 755 may be used as latch data DLATCH in the next fourth sub-MAC operation. Because the first odd MAC operation is not completed, the output circuit 760 might not output data in response to a MAC result data read signal READ_RST of the logic "low" L level.

Figure 65:
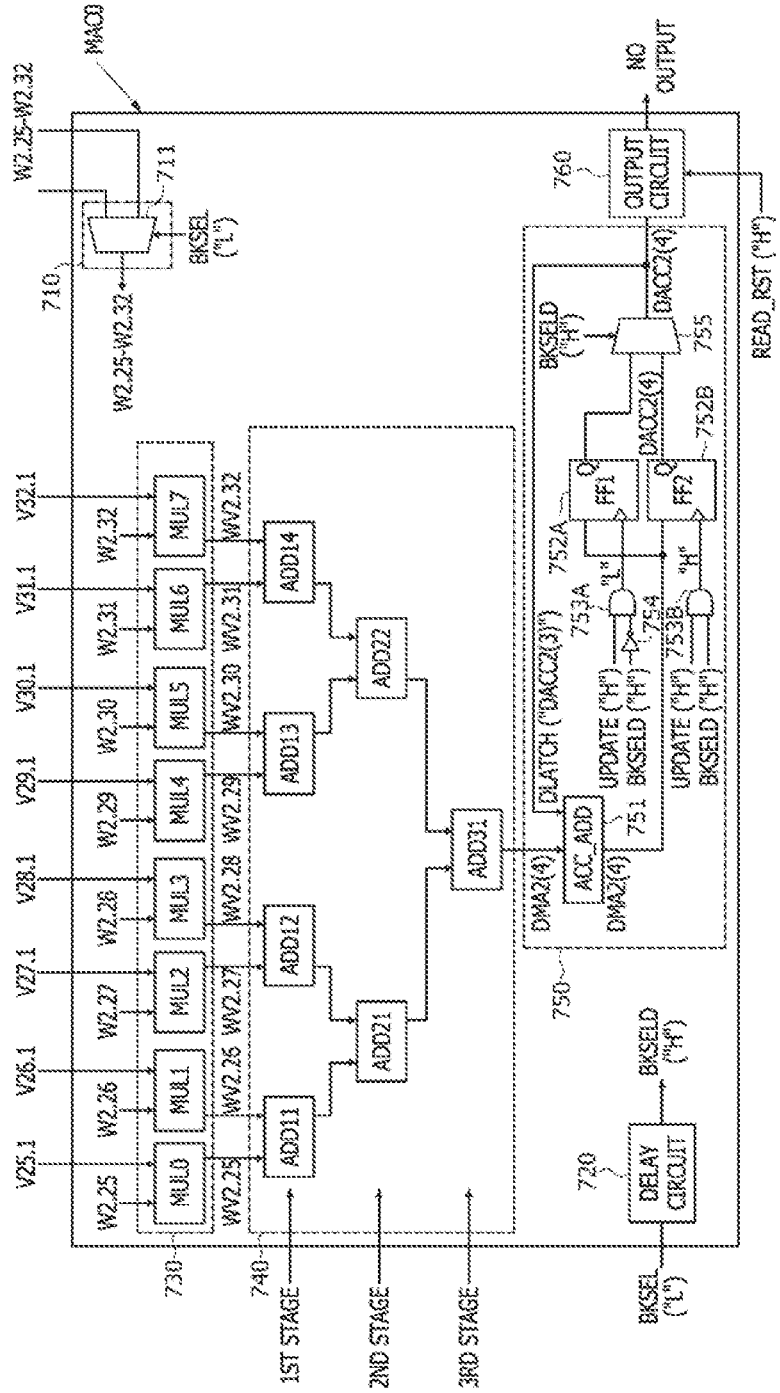
FIG. 65 is a diagram illustrating an operation of the first MAC operator performing the fourth-sub-MAC operation of the first odd MAC operation in the PIM device of FIG. 31.

FIG. 65 is a diagram illustrating an operation of the first MAC operator MAC0 performing the fourth sub-MAC operation of the first odd MAC operation in the PIM device 600 of FIG. 31. The description of this example may be equally applied to the second to eighth MAC operators MAC1-MAC7. In addition, the same method may be applied to the fourth sub-MAC operation of the second odd MAC operation of the first MAC operator MAC0. Referring to FIG. 65, the first selector 711 of the first MAC operator MAC0 may transmit the weight data W2.25-W2.32 of the $25^{th}$ column to the $32^{nd}$ column of the second row of the weight matrix transmitted from the first odd memory bank (BK1 of FIG. 31) to the multiplication circuit 730 in response to a bank selection control signal BKSEL of a logic "low" L level. The global buffer (GB of FIG. 31) may transmit the vector data V25.1-V32.1 of the $25^{th}$ row to the $32^{nd}$ row of the first column of the vector matrix to the multiplication circuit 730. The multiplication circuit 730 may perform a multiplication operation on the weight data W2.25-W2.32 and the vector data V25.1-V32.1 to output $25^{th}$ to $32^{nd}$ multiplication data WV2.25-WV2.32 of the second row. The addition circuit 740 may perform an addition operation on the $25^{th}$ to $32^{nd}$ multiplication data WV2.25-WV2.32 of the second row to output fourth multiplication addition data DMA2(4) of the second row.

The delay circuit 720 that has received the bank selection control signal BKSEL of a logic "low" L level may transmit a bank selection delay control signal BKSELD of a logic "high" H level to the inverter 754, the second AND gate 753B, and the selection terminal of the second selector 755 of the accumulation circuit 750. The accumulative adder 751 of the accumulation circuit 750 may perform an addition operation on the fourth multiplication addition data DMA2(4) of the second row and latch data DLATCH to output fourth accumulation data DACC2(4) of the second row. Since the latch data DLATCH is the third accumulation data DACC2(3) of the second row, the fourth accumulation data DACC2(4) of the second row may be data obtained by adding all the first multiplication addition data DMA2(1) of the second row, the second multiplication addition data DMA2(2) of the second row, the third multiplication addition data DMA2(3) of the second row, and the fourth multiplication addition data DMA2(4) of the second row. The fourth accumulation data DACC2(4) of the second row output from the accumulative adder 751 may be input to the input terminal of the first latch circuit 752A and the input terminal of the second latch circuit 752B.

Since the bank selection delay control signal BKSELD is in a logic "high" H level, the first AND gate 753A and the second AND gate 753b may output a logic "low" L signal and a logic "high" H signal, respectively. Accordingly, the first latch circuit 752A may transmit the fourth accumulation data DACC2(4) of the second row to the second input terminal of the second selector 755 through the output terminal Q. The second selector 755 may output the fourth accumulation data DACC2(4) of the second row in response to the bank selection delay control signal BKSELD of a logic "high" H level. The fourth accumulation data DACC2(4) of the second row output from the second selector 755 may be transmitted to the output circuit 760. The first odd MAC operation is completed, so that the second latch circuit 752B may be reset. In addition, the output circuit 760 may output the fourth accumulation data DACC2(4) of the second row as MAC result data RST2.1 of a second row of the result matrix in response to a MAC result data read signal READ_RST of a logic "high" H level.

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

What is claimed is:

1. A processing-in-memory (PIM) device comprising:
   a plurality of memory banks including a plurality of even memory banks and a plurality of odd memory banks; and
   a plurality of multiplication and accumulation (MAC) operators including a first MAC operator configured to be shared by a first even memory bank among the plurality of even memory banks and a first odd memory bank among the plurality of odd memory banks,
   wherein the first MAC operator is configured to alternately perform an even MAC operation and an odd MAC operation, and
   wherein the first MAC operator is configured to:
   perform the even MAC operations using even weight data provided from the first even memory bank, and
   perform the odd MAC operations using odd weight data provided from the first odd memory bank.

2. The PIM device of claim 1, wherein the first MAC operator is configured to:
   sequentially perform a plurality of sub-even MAC operations to perform each of the even MAC operations, and sequentially perform a plurality of sub-odd MAC operations to perform each of the odd MAC operations.

3. The PIM device of claim 2,
wherein the first even memory bank sequentially performs an active operation on the first even memory bank, the even MAC operations, and a pre-charge operation on the first even memory bank, and
wherein the first odd memory bank sequentially performs an active operation on the first odd memory bank, the odd MAC operations, and a pre-charge operation on the first odd memory bank.

4. The PIM device of claim 3,
wherein the active operation on the first even memory bank starts to be performed while the first MAC operator performs the odd MAC operations, and
wherein the active operation on the first odd memory bank is performed while the first MAC operator performs the even MAC operations.

5. The PIM device of claim 3,
wherein the pre-charge operation on the first even memory bank is performed while the first MAC operator performs the odd MAC operations, and
wherein the pre-charge operation on the first odd memory bank is started before the first MAC operator performs the even MAC operation and is completed before the even MAC operation is completed.

6. The PIM device of claim 5, wherein the pre-charge operation on the first odd memory bank is started before the active operation on the first even memory bank is completed.

7. The PIM device of claim 3, wherein the first MAC operator is configured to:
perform each of the even MAC operations while the pre-charge operation and the active operation on the first odd memory bank are performed, and
perform each of the odd MAC operations while the even MAC operation is completed and the pre-charge operation and the active operation on the first even memory bank are performed.

8. The PIM device of claim 2, further comprising a global buffer configured to provide vector data in common to the plurality of MAC operators.

9. The PIM device of claim 8, wherein the first MAC operator comprises:
a multiplication circuit configured to perform a multiplication operation on the even weight data and the vector data or a multiplication operation on the odd weight data and the vector data to output multiplication data;
an addition circuit configured to perform an addition operation on the multiplication data to output multiplication addition data; and
an accumulation circuit configured to perform an accumulation operation on the multiplication addition data and latch data to generate and latch accumulation data and provides the latched accumulation data as the latch data.

10. The PIM device of claim 9, wherein the first MAC operator further comprises a first selector having a first input terminal, a second input terminal, a selection terminal, and an output terminal,
wherein the first selector is configured to:
receive the even weight data from the first even memory bank through the first input terminal,
receive the odd weight data from the first odd memory bank through the second input terminal,
receive a bank selection control signal through the selection terminal, and
transmit the even weight data or the odd weight data to the multiplication circuit through the output terminal according to a logic level of the bank selection control signal.

11. The PIM device of claim 10, wherein the bank selection control signal has a logic value of logic "high" while the even MAC operation is performed, and has a logic value of logic "low" while the odd MAC operation is performed.

12. The PIM device of claim 9, wherein the accumulation circuit comprises:
an accumulative adder configured to perform an accumulation operation on the multiplication addition data and the latch data to output the accumulation data;
an even latch circuit configured to latch even accumulation data output from the accumulative adder in the even MAC operation using the even weight data;
an odd latch circuit configured to latch odd accumulation data output from the accumulative adder in the odd MAC operation using the odd weight data; and
a selector configured to receive the even accumulation data and the odd accumulation data and configured to output one of the even accumulation data and the odd accumulation data in response to a bank selection delay control signal, wherein the selector feeds back output data to the accumulative adder as the latch data.

13. The PIM device of claim 12, further comprising a delay circuit configured to receive the bank selection control signal as an input signal and configured to delay the bank selection control signal to output the bank selection delay control signal as an output signal after a delay time elapses.

14. The PIM device of claim 13, wherein the delay time in the delay circuit is set to a duration for the first MAC operator to complete performance of the even MAC operation.

15. The PIM device of claim 13, wherein the bank selection control signal has a logic value of logic "high" while the even MAC operation is performed, and has a logic value of logic "low" while the odd MAC operation is performed.

16. The PIM device of claim 15, wherein the bank selection delay control signal has a logic value of logic "low" while the even MAC operation is performed, and has a logic value of logic "high" while the odd MAC operation is performed.

17. The PIM device of claim 16, wherein the accumulation circuit further comprises:
a first AND gate configured to perform a first AND operation on the inverted bank selection delay control signal having an inverted logic level of the bank selection delay control signal and an update signal, and configured to transmit a first signal generated as a result of the first AND operation to a clock terminal of the first latch circuit; and
a second AND gate configured to perform a second AND operation on the bank selection delay control signal and the update signal, and configured to transmit a second signal generated as a result of the second AND operation to a clock terminal of the second latch circuit.

18. The PIM device of claim 17, wherein the update signal maintains a logic value of logic "high" while the even MAC operation and the odd MAC operation are performed.

19. The PIM device of claim 16, wherein the selector is configured to:
output the even accumulation data transmitted from the first latch circuit when the bank selection delay control signal is in a logic "low" level, and output the odd accumulation data transmitted from the second latch circuit when the bank selection delay control signal is in a logic "high" level.

20. A processing-in-memory (PIM) device comprising:
an even memory bank configured to store even weight data;
an odd memory bank configured to store odd weight data;
a global buffer configured to store vector data; and
a multiplication and accumulation (MAC) operator configured to be shared by the even memory bank and the odd memory bank to alternately perform an even MAC operation and an odd MAC operation,
wherein the even MAC operation is performed using the even weight data and the vector data while performing a pre-charge operation and an active operation on the odd memory bank, and
wherein the odd MAC operation is started after the even MAC operation is completed, and is performed using the odd weight data and the vector data while the pre-charge operation and the active operation of the even memory bank are performed.

* * * * *